United States Patent [19]

Uekita et al.

[11] Patent Number: 4,910,293

[45] Date of Patent: * Mar. 20, 1990

[54] LANGMUIR-BLODGETT FILMS OF POLYMERS HAVING PENDENT $C_{10}$–$C_{30}$ HYDROCARBON GROUPS

[75] Inventors: Masakazu Uekita; Hiroshi Awaji, both of Kobe, Japan

[73] Assignee: Kanegafuchi Kagaku Kogyo Kabushiki Kaisha, Osaka, Japan

[*] Notice: The portion of the term of this patent subsequent to Apr. 18, 2006 has been disclaimed.

[21] Appl. No.: 256,159

[22] Filed: Oct. 11, 1988

Related U.S. Application Data

[63] Continuation of Ser. No. 932,543, Nov. 19, 1986, abandoned.

[30] Foreign Application Priority Data

| Nov. 20, 1985 | [JP] | Japan | 60-262122 |
| Dec. 16, 1985 | [JP] | Japan | 60-284145 |
| Sep. 10, 1986 | [JP] | Japan | 61-214891 |
| Sep. 10, 1986 | [JP] | Japan | 61-214892 |
| Sep. 26, 1986 | [JP] | Japan | 61-228578 |
| Sep. 26, 1986 | [JP] | Japan | 61-228579 |

[51] Int. Cl.⁴ .................. B05D 1/20; B29C 41/00; C08G 73/10

[52] U.S. Cl. .................. 528/353; 528/26; 528/125; 528/128; 528/171–173; 528/176; 528/183–188; 528/206; 528/208; 528/220; 528/226; 528/228; 528/229; 528/271; 528/272; 528/288–296; 528/308; 528/335; 528/337; 528/341; 528/342; 528/348; 528/350; 528/352; 428/458; 428/473.5; 428/474.4; 428/475.5; 428/480; 264/212; 264/216; 264/298; 264/331.14; 264/331.19; 264/331.21; 427/402; 427/407.2; 427/409; 427/412.3; 427/430.1; 427/434.3; 427/435; 427/443.2

[58] Field of Search ........ 528/26, 125, 128, 171–173, 528/176, 183–188, 206, 208, 220, 226, 228, 229, 271, 272, 288–296, 308, 335, 337, 341, 342, 348, 350, 352, 353; 428/458, 473.5, 474.4, 475.5, 480

[56] References Cited

U.S. PATENT DOCUMENTS 3,551,383 12/1970 Fang ..................... 528/73

FOREIGN PATENT DOCUMENTS 54-145794 11/1979 Japan.
55-30207 8/1980 Japan.

OTHER PUBLICATIONS

Chemical Abstracts, vol. 100, No. 10, 5th Mar. 1984, p. 10, Abstract No. 68897m, Columbus, Ohio, U.S.; A. I. Volozhin et al.

Chemical Abstracts, vol. 102, No. 26, 1st Jul. 1985, p. 6, Abstract No. 221283w, Columbus, Ohio, U.S.; L. Minnema et al.

Alan K. Engel, Tomoko Yoden, Kohei Sanui, and Naoya Ogata, J. Am. Chem. Soc. (1985), 107, 8308–8310.

M. Suzuki, M. Kakimoto, T. Konishi, Y. Imai, M. Iwamoto and T. Hino, Chemistry Letters (1986), 395–398.

M. Kakimoto, M. Suzuki, T. Konishi, Y. Imai, M. Iwamoto and T. Hino, Chemistry Letters (1986), 823–826.

Alan K. Engel, Tomoko Yoden, Kohei Sanui and Naoya Ogata, Polymeric Materials Science and Engineering, 54 (1986), 119–123.

P. S. Vincett and G. G. Roberts, Thin Solid Films, 68 (1980), 135–171.

Primary Examiner—John Kight
Assistant Examiner—Frederick Krass
Attorney, Agent, or Firm—Armstrong, Nikaido, Marmelstein, Kubovcik & Murray

[57] ABSTRACT

An amphiphilic high polymer comprises a linear recurring unit containing at least divalent organic group ($R_1$) having at least two carbon atoms, at least divalent organic group ($R_2$) having at least two carbon atoms, and at least one $C_{10-30}$ hydrocarbon-containing group ($R_3$) which may have one or more substituent groups, said organic groups $R_1$ and $R_2$ being connected to each other by a divalent connecting group, and said hydrocarbon-containing group $R_3$ being boned to said recurring unit by a covalent bond, and the method for producing the same comprises polycondensating a combination of monomers containing $R_1$ and $R_2$.

12 Claims, 33 Drawing Sheets

LANGMUIR-BLODGETT FILMS OF POLYMERS HAVING PENDENT $C_{10}$–$C_{30}$ HYDROCARBON GROUPS

This application is a continuation of application Ser. No. 932,543 filed Nov. 19, 1986 now abandoned.

BACKGROUND OF THE INVENTION

1. Field of the Invention

This invention relates to an amphiphilic high polymer, in particular, a modified amphiphilic high polymer which can be formed into film by Langmuir-Blodgett technique, and a process for producing the same.

2. Description of the Prior Art

It was found by Langmuir and Blodgett in 1930s that fatty acids having ca. 16 to 22 carbon atoms can form a monomolecular film on the surface of water and such a film can be built up or laminated on a substrate. However, it is only recent years that investigation of their technical application was started.

Outline of investigations hitherto made has been reviewed in "Kotai Butsuri (Physics of Solids)," 17 (12), p.45 (1982); "Thin Solid Film," 68, No. 1 (1980); ibid., 99, Nos. 1, 2 and 3 (1983); G. L. Gains, "Insoluble Monolayers at Liquid-gas Interface," Interscience Publishers, N.Y. (1966); etc. However, conventional Langmuir-Blodgett films (hereinafter referred to as "LB film") of saturated straight chain carboxylic acids are not satisfactory in such points as heat resistance and mechanical strength and, therefore, could not be put into practical use as they are.

In order to rectify the above disadvantages, investigation have been made on polymetric films of saturated fatty acids, such as ω-tricosenic acid, ω-heptadecenic acid and α-octadecylacrylic acid; and unsaturated esters of fatty acids, such as vinyl stearate, octadecyl acrylate; as well as derivatives of diacetylene. Those films, however, are not sufficiently heat-resistant and have only poor electrical properties. It is also known that some hydrophilic group-containing polymers, such as polyacrylic acids, polyvinyl alcohols, polyethyl acrylates and polypeptides, also have film-forming properties. However, none of them are suited as a material for LB films, and no investigations have been made on modification of polymers to be used, in particular, as a material for LB films.

On the other hand, heat-resistant films have been produced from polyimides. However, polyimide films prepared by the spin coat method or the like usually have a thickness greater than 1 μm, or at best 1,000 Å. It is therefore very difficult to produce a heat-resistant film having a thickness of 1,000 Å or less and, at the same time, free from pin holes.

SUMMARY OF THE INVENTION

It is an object of this invention to make it possible to form films in accordance with Langmuir-Blodgett technique, by means of modification of high polymers which could hardly be formed into a film by Langmuir-Blodgett technique.

It is another object of this invention to provide an amphiphilic high polymer suited for forming a polymeric LB film having a thickness hardly attainable by conventional process and having improved characteristics in heat and chemical resistances, as well as in physical properties, such as adhesiveness.

It is a further object of this invention to provide a process for producing such a high polymer.

According to this invention, there is provided an amphiphilic high polymer, which comprises a linear recurring unit containing at least divalent organic group ($R_1$) having at least two carbon atoms, and at least divalent organic group ($R_2$) having at least two carbon atoms, and contains at least one $C_{10-30}$ hydrocarbon-containing group ($R_3$) which may have one or more substituent groups, said organic groups $R_1$ and $R_2$ being connected to each other by a divalent connecting group, and said hydrocarbon-containing groups $R_3$ being bonded to said recurring unit by a covalent bond.

BRIEF DESCRIPTION OF THE DRAWINGS

Also.

DETAILED DESCRIPTION OF THE INVENTION

Figure 1:
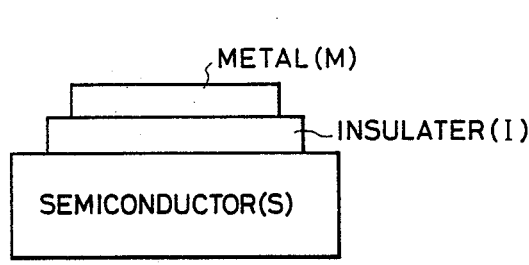
FIGS. 1 through 7 are the schematic diagrams of the representative devices of MIS structure.

To be more specific, the high polymer of this invention comprises as a basic skeleton a linear recurring unit represented by one of the following formulae.

$$+A-R_1-AB-R_2-B+ \quad (1)$$

$$+A-R_1-BA-R_2-B+ \quad (2)$$

$$+B-R_1-BA-R_2-A+ \quad (3)$$

wherein $R_1$ represents an organic group having a valency of at least two and containing at least two carbon atoms, and $R_2$ represents an organic group having a valency of at least two and containing at least two carbon atoms, at least one of the groups $R_1$ and $R_2$ being preferably a group comprising a benzenoid structure containing at least 6 carbon atoms.

In the above formulae (1) to (3), AB and BA represent a divalent connecting group formed by a reaction between acidic group A and basic group B wherein both groups contain hetero atoms such as O, N, S, P and B. As examples of such groups, mention may be made of the followings:

A: —COOR (R represents alkyl group or hydrogen atom), —COX (X represents Cl or Br), —NCO, —NCS, —CN, —CONHR, —SO$_2$NHR, etc.

B: —NHR, —OR, —SR, —X, etc.

AB:

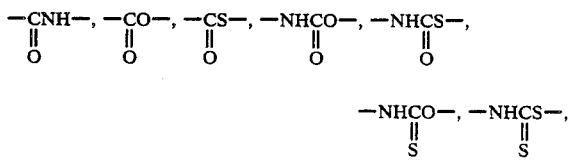

BA:

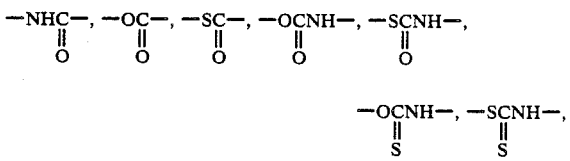

The amphiphilic high polymer of this invention is modified by introducing into any of the recurring unit (1) to (3) at least one, preferably two, covalently bonded hydrocarbon-containing groups $R_3$ containing 10 to 30, preferably 16 to 22 carbon atoms, in order to make it possible to form a thin film in accordance with Langmuir-Blodgett technique.

Such a modification can be effected by:

[I] Substituting one or more atoms contained in AB and/or BA groups of said linear recurring unit (1), (2) or (3) by one or more $R_3$ groups;

[II] Directly substituting $R_1$ and/or $R_2$ groups by one or more $R_3$ groups; or

[III] Introducing one or more $R_3$ groups into $R_1$ and/or $R_2$ through the substituent which is not involved in the formation of the linear recurring structure.

It is a matter of course that the above modification methods [I], [II] and [III] can be applied in combination. In the case where more than one $R_3$ groups are introduced into one recurring unit, the $R_3$ groups can be either the same or different.

The above modification methods will be further explained hereinbelow.

As specific examples of [I], mention may be made of the followings:

| AB | BA |
|---|---|
|  | |
|  | |
|  | |

-continued

| AB | BA |
|---|---|
| 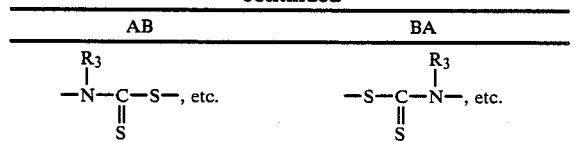 | |

In the modification method [I] shown above, hydrogen atom attached to the nitrogen atom contained in group AB or BA is substituted by $R_3$ groups.

In the modification method [II], $R_3$ is directly introduced into $R_1$ and/or $R_2$ to form, for example, recurring units as shown below.

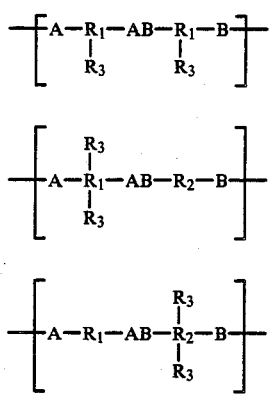

(1)'

(1)''

(1)'''

The above-described modification method [III] comprises much more possibilities. To be more specific, in the case of [III], at least one of the groups $R_1$ and $R_2$ must be an organic group having a valency of at least three, and one or more substitutional groups $R_3$ are introduced into group $R_1$ or $R_2$ through the substituent which is not involved for the formation of the recurring structure. As examples of combinations of $R_1$ and $R_2$ where $R_1$ has a valency equal to, or greater than, that of $R_2$, and both of them have a valency not greater than 6, mention may be made of the followings:

| | Valence of $R_1$ | Valence of $R_2$ |
|---|---|---|
| ① | 3 | 2 |
| ② | 4 | 2 |
| ③ | 5 | 2 |
| ④ | 6 | 2 |
| ⑤ | 3 | 3 |
| ⑥ | 4 | 3 |
| ⑦ | 5 | 3 |
| ⑧ | 6 | 3 |
| ⑨ | 4 | 4 |
| ⑩ | 5 | 4 |
| ⑪ | 6 | 4 |
| ⑫ | 5 | 5 |
| ⑬ | 6 | 5 |
| ⑭ | 6 | 6 |

Of the above combinations, those comprising $R_1$ and $R_2$ groups having a valency of up to 4 can be particularly preferable, although the valencies of the groups are not limited thereto.

Specific examples of linear recurring units comprising combinations of $R_1$ and $R_2$ groups having the following valencies are shown hereinbelow:

$R_1=3, R_2=2$ $R_1=4, R_2=2$ $R_1=3, R_2=3$ $R_1=4, R_2=3$ $R_1=4, R_2=4$

When $R_1$ is trivalent and $R_2$ is divalent:

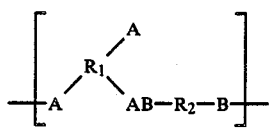 (4)

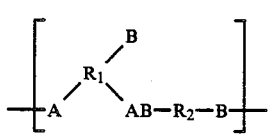 (5)

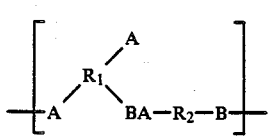 (6)

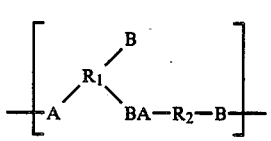 (7)

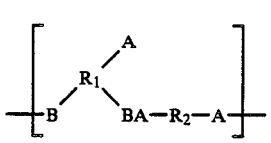 (8)

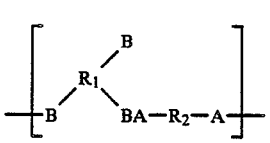 (9)

When $R_1$ is tetravalent and $R_2$ is divalent:

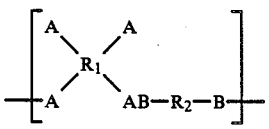 (10)

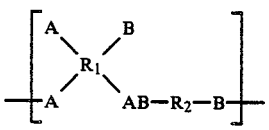 (11)

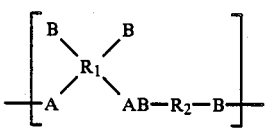 (12)

-continued
(13) 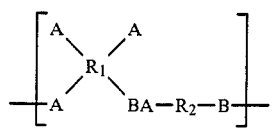
(14) 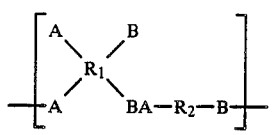
(15) 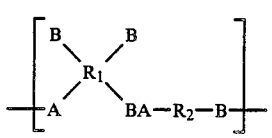
(16) 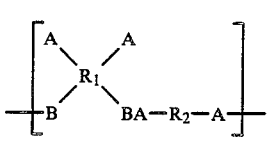
(17) 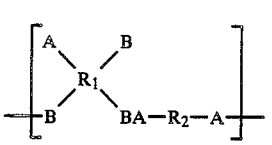
(18) 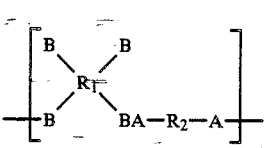
When $R_1$ and $R_2$ are trivalent:
(19) 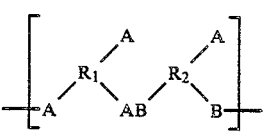
(20) 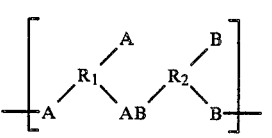
(21) 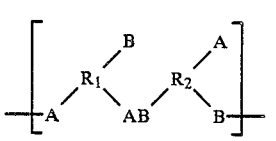
(22) 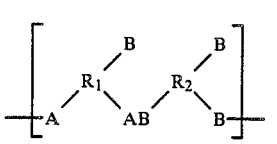
(23) 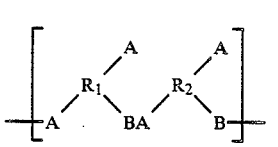
-continued
(24) 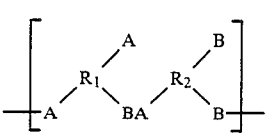
(25) 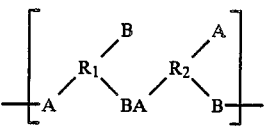
(26) 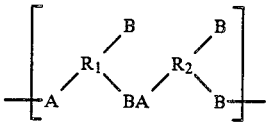
(27) 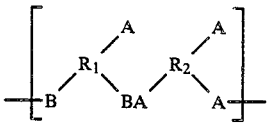
(28) 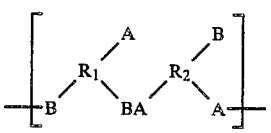
(29) 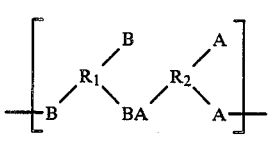
(30) 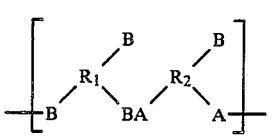
When $R_1$ is tetravalent and $R_2$ is trivalent:
(31) 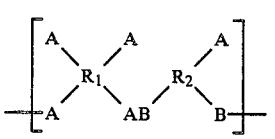
(32) 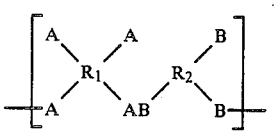
(33) 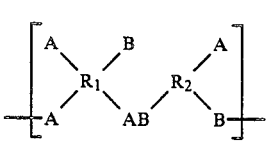

-continued
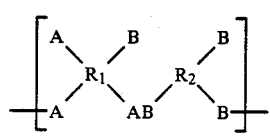 (34)
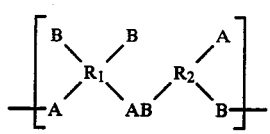 (35)
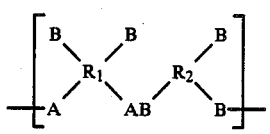 (36)
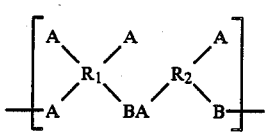 (37)
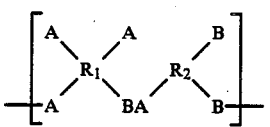 (38)
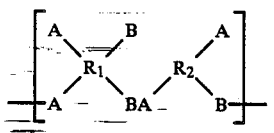 (39)
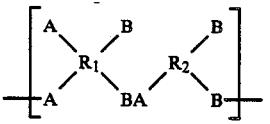 (40)
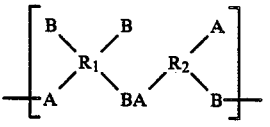 (41)
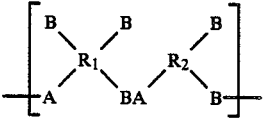 (42)
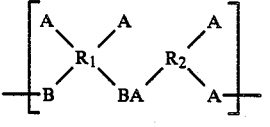 (43)
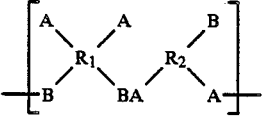 (44)
-continued
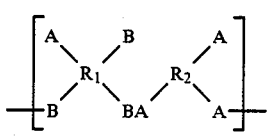 (45)
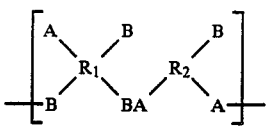 (46)
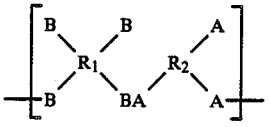 (47)
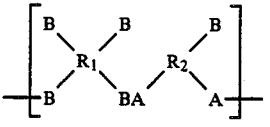 (48)
When $R_1$ and $R_2$ are tetravalent:
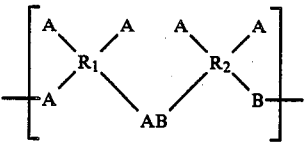 (49)
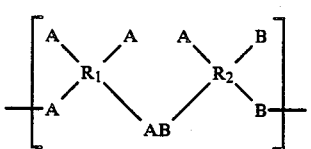 (50)
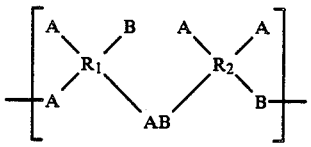 (51)
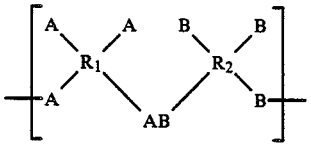 (52)
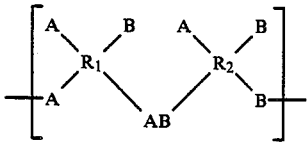 (53)
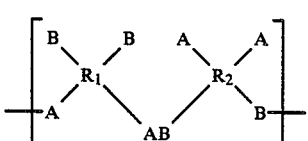 (54)

-continued
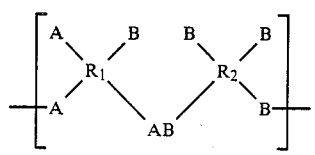 (55)
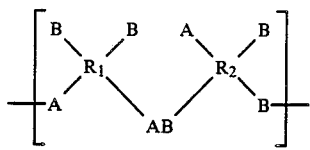 (56)
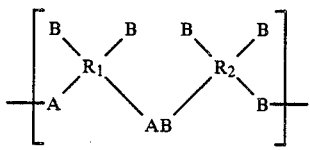 (57)
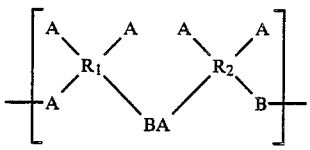 (58)
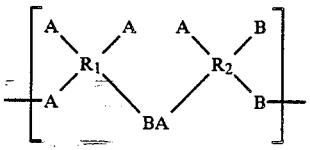 (59)
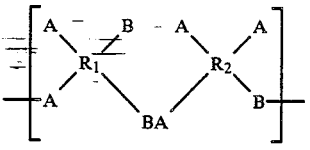 (60)
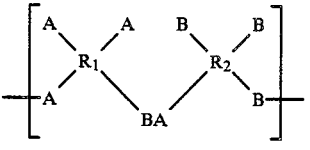 (61)
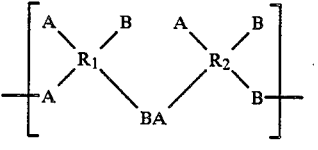 (62)
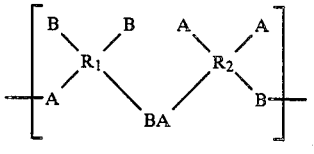 (63)
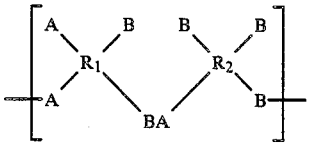 (64)
-continued
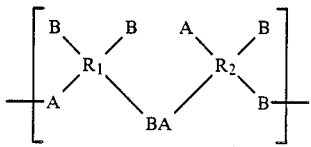 (65)
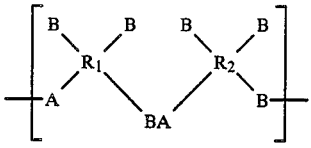 (66)
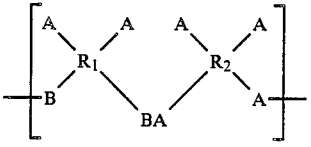 (67)
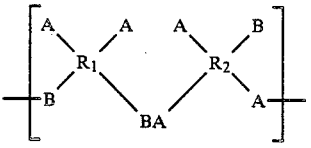 (68)
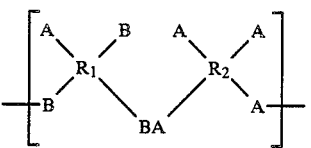 (69)
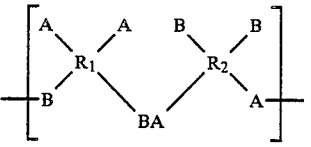 (70)
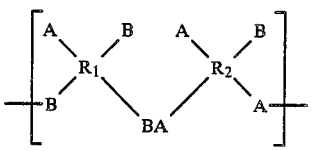 (71)
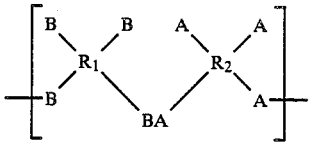 (72)
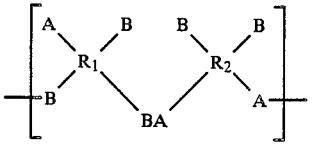 (73)
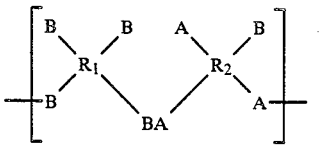 (74)

-continued

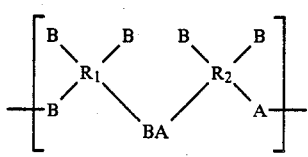
(75)

In the above formulae (4) to (75), there are groups A and B not involved in the formation of the recurring structure. In the modification method [III] mentioned hereinabove, $R_3$ is introduced into such groups, for example, by substituting atoms or groups contained in A by such groups as —COOR$_3$, —CONHR$_3$, —NHCOOR$_3$ and —NHCSOR$_3$, or by substituting atoms or groups contained in B by such groups as —NHR$_3$, —OR$_3$ and —SR$_3$.

Explanations will be given hereinbelow on $R_1$ and $R_2$. $R_1$ is a group having a valency of at least 2 and containing at least 2, preferably 5 to 20, carbon atoms. It may be an aromatic group; an aliphatic group; an alicyclic group; a group in which an aromatic group is combined with an aliphatic group; a group in which one of the above-mentioned groups is combined with a monovalent group having 1 to 30 carbon atoms selected from the group consisting of an aliphatic group, an alicyclic group, an aromatic group and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups comprising a benzenoid structure having at least 6 carbon atoms can be preferred as $R_1$ or $R_2$, with regard to heat resistance, chemical resistance, physical properties, etc.

The term "benzenoid structure" refers herein to the structure of carbocyclic compounds as contained in ordinary aromatic compounds, as contrasted with quinoid structures.

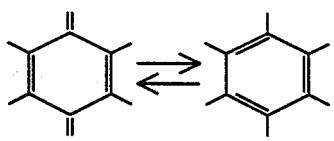

p-Quinoid

As specific examples of $R_1$ and $R_2$, mention may be made of the followings:

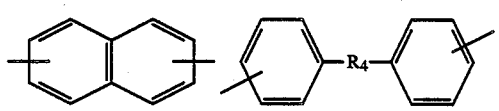

wherein $R_4$ represents

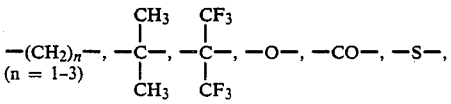

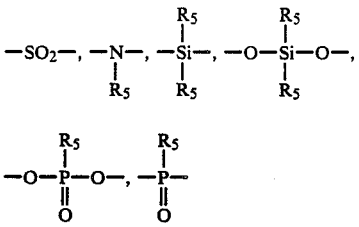

(in which $R_5$ represents an alkyl group or an aryl group).

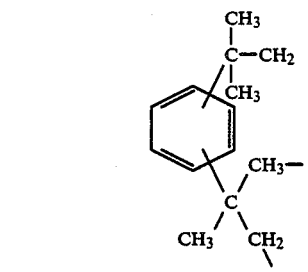

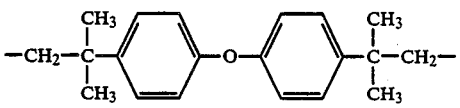

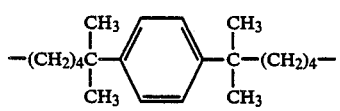

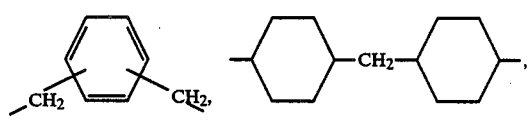

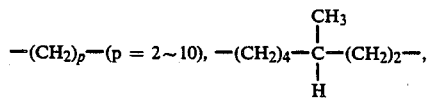

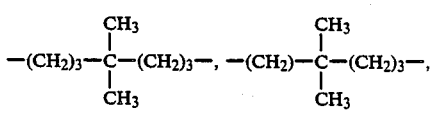

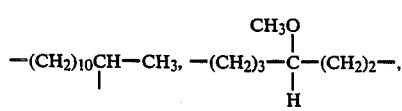

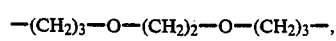

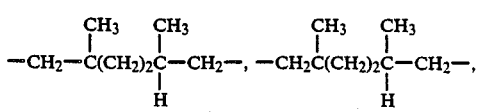

-continued $-(CH_2)_3-\underset{\underset{CH_3}{|}}{\overset{\overset{CH_3}{|}}{Si}}-O-\underset{\underset{CH_3}{|}}{\overset{\overset{CH_3}{|}}{Si}}-(CH_2)_3-,$ $-(CH_2)_4-\underset{\underset{CH_3}{|}}{\overset{\overset{CH_3}{|}}{Si}}-O-\underset{\underset{CH_3}{|}}{\overset{\overset{CH_3}{|}}{Si}}-(CH_2)_3-,$ $-(CH_2)_3-\underset{\underset{C_6H_5}{|}}{\overset{\overset{C_6H_5}{|}}{Si}}-O-\underset{\underset{C_6H_5}{|}}{\overset{\overset{C_6H_5}{|}}{Si}}-(CH_2)_3-,$

[tolyl-Si(CH₃)₂-O-Si(CH₃)₂-tolyl structure], $-(CH_2)_3-\underset{\underset{C_6H_5}{|}}{\overset{\overset{CH_3}{|}}{Si}}-O-\underset{\underset{C_6H_5}{|}}{\overset{\overset{CH_3}{|}}{Si}}-(CH_2)_3-,$ $-(CH_2)_3-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-(CH_2)_3-,$ $-(CH_2)_3-\underset{\underset{CH_3}{|}}{\overset{\overset{CH_3}{|}}{Si}}-O-(\underset{\underset{CH_3}{|}}{\overset{\overset{CH_3}{|}}{Si}}-O)_n-\underset{\underset{CH_3}{|}}{\overset{\overset{CH_3}{|}}{Si}}-(CH_2)_3-,$ n = 2~15

[benzene and naphthalene structures],

[biphenyl and diaryl-R₄ structures], (R₄ is as defined before)

[benzene and naphthalene structures],

[biphenyl and diaryl-R₄ structures], (R₄ is as defined before)

-continued

[isopropylidene and cyclopentyl structures],

[perylene structure]

As more preferred examples of $R_1$ and $R_2$, mention may be made of the followings:

[benzene and biphenyl structures],

[naphthalene and diaryl-R₄ structures],

[substituted benzene and naphthalene structures],

[biphenyl structure],

[biphenyl and diaryl-R₄ structures],

[diaryl-R₄ and benzene structures],

[naphthalene and biphenyl structures],

[naphthalene and diaryl-R₄ structures].

(R₄ is as defined before)

$R_3$ may be a hydrocarbon containing group having 1 to 30, preferably 16 to 22, carbon atoms.

A preferred example thereof is a monovalent group selected from an aliphatic group, a connecting group of alicyclic group and aliphatic group, a connecting group of aromatic group and aliphatic group, or substituents thereof. As specific examples of $R_3$, mention may be made of the followings:

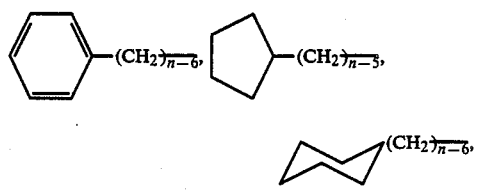

(in which $l+m=n-5$, n is an integer of 10 to 30, preferably 16 to 22).

These groups may be substituted with substitutional groups, such as a halogen atom, a nitro group, an amino group, a cyano group, a methoxyl group and an acetoxyl group and the like, however these are not critical. Fluorine can be preferable as a substituent in some cases since it is capable of imparting stronger hydrophobicity to the polymer than hydrogen.

In other words, alkyl groups having a shorter chain can be employed when fluorine atoms are contained therein. For example, in the case of $C_8F_{17}(CH_2)_k-$, $k=2$ will be sufficient to obtain a high polymer capable of forming a film.

Specific examples of high polymers employable in the film forming process of this invention will become apparent by applying the examples of $R_1$, $R_2$, $R_3$, A, B, AB and BA, as well as the modes of substitution of $R_3$, to formulae (1) to (75). Although no copolymers are included in formulae (1) to (75), it is a matter of course that copolymeric derivatives and mixtures thereof are included within the scope of this invention.

Furthermore, although it is not indispensable, the high polymer of the present invention may be substituted by groups containing 1 to 9 carbon atoms according to the processes of [I], [II] or [III].

There are no particular limitations on the molecular weight of the high polymer of this invention. A film can be formed in accordance with the film-forming process of this invention even when its molecular weight is relative small. In such a case, however, it may not be possible to attain good heat resistance, mechanical strength and chemical resistance. On the other hand, an excessively high molecular weight is undesirable since it may become difficult to form a film because of increase in viscosity.

Accordingly, a weight average molecular weight of from ca. 2,000 to 300,000, in particular, from ca. 10,000 to 150,000, can be preferable.

Specific examples which can be advantageous in costs and easiness of synthesizing monomers and polymers, are shown below. However, these are not restrictive.

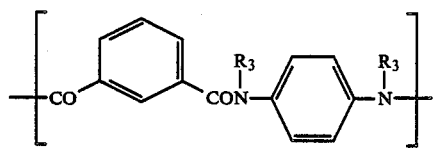 (76)

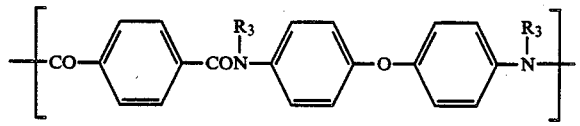 (77)

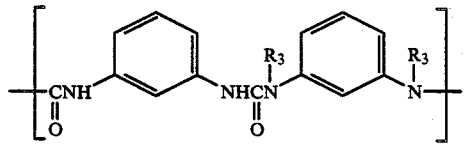 (78)

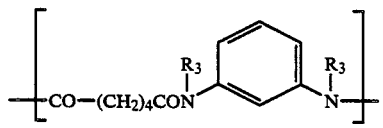 (79)

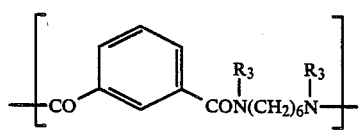 (80)

-continued
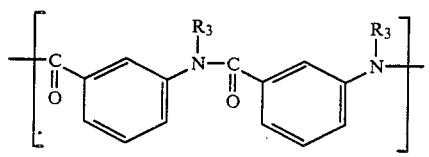 (81)
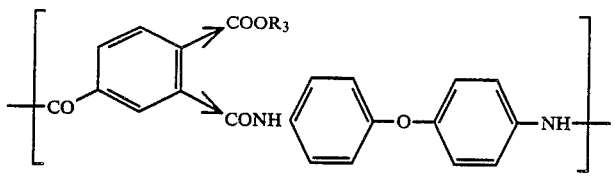 (82)
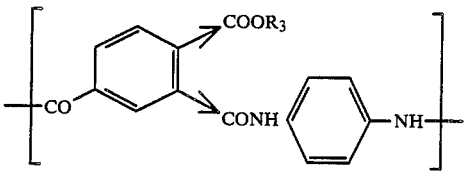 (83)
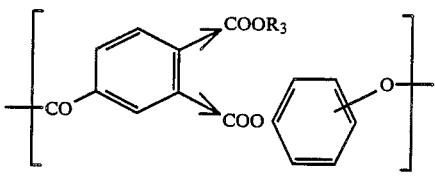 (84)
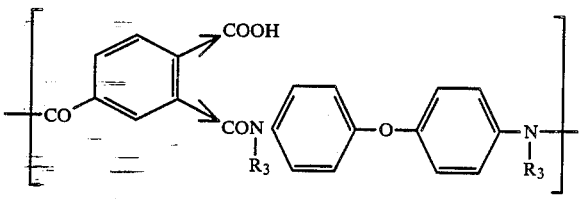 (85)
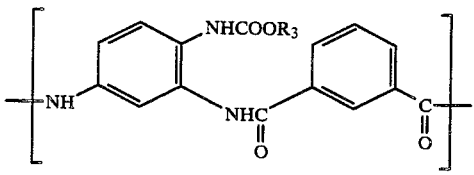 (86)
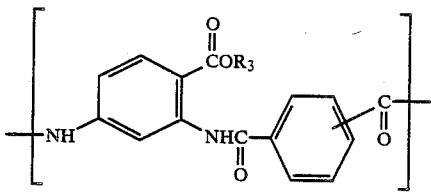 (87)
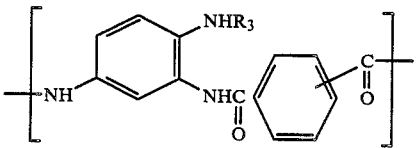 (88)
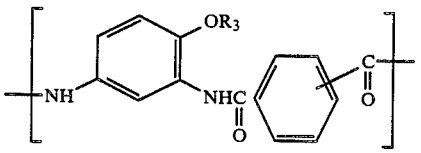 (89)

-continued
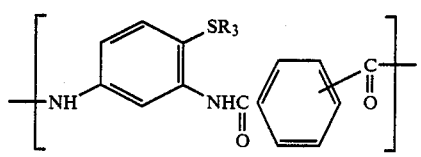 (90)
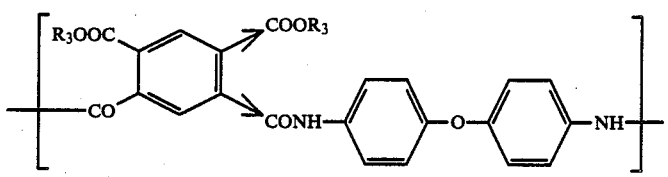 (91)
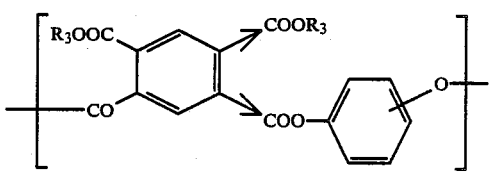 (92)
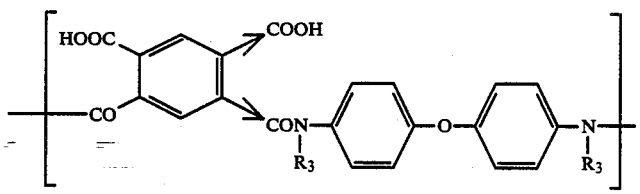 (93)
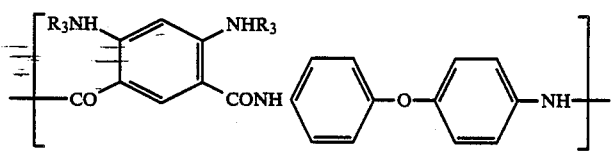 (94)
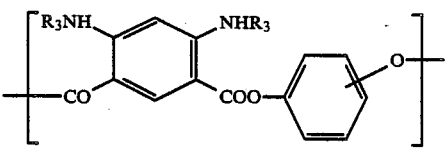 (95)
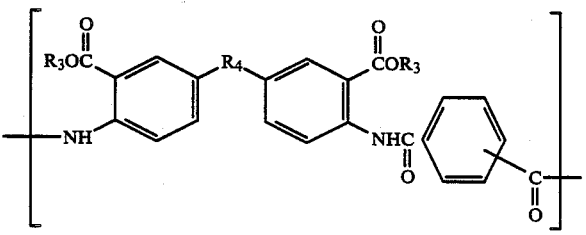 (96)
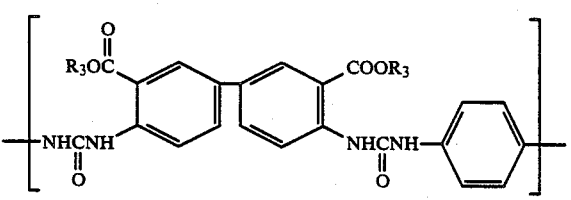 (97)

-continued
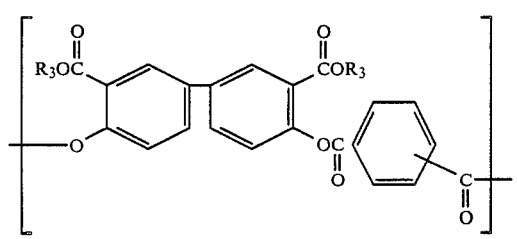 (98)
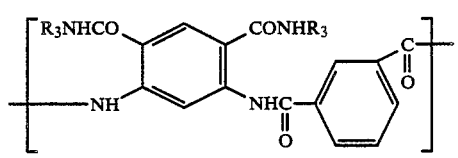 (99)
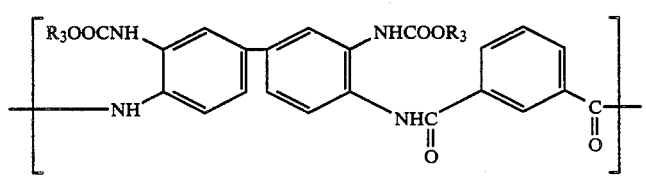 (100)
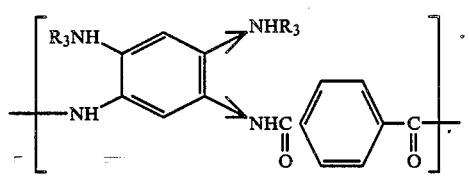 (101)
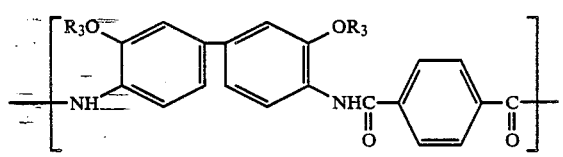 (102)
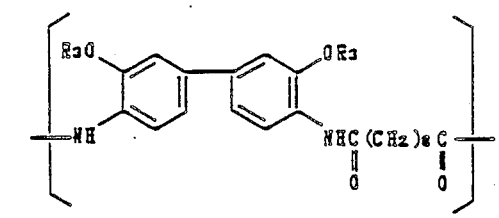 (103)
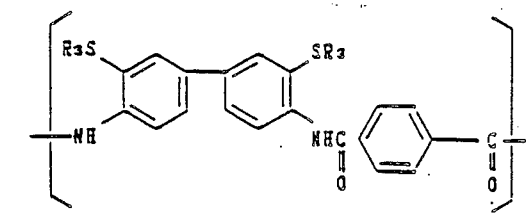 (104)
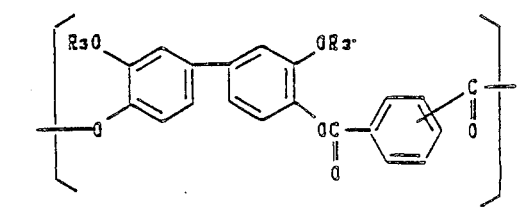 (105)

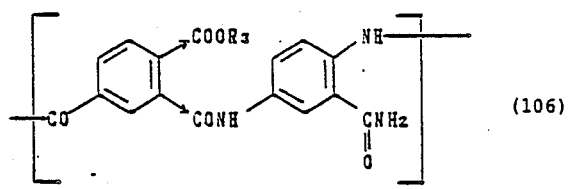 (106)
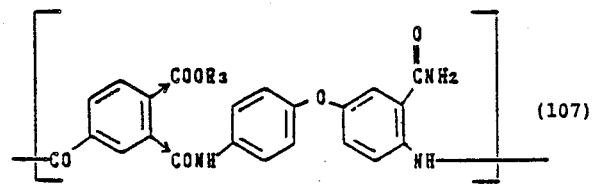 (107)
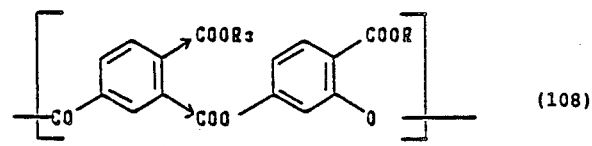 (108)
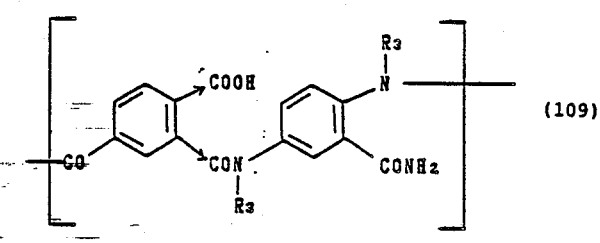 (109)
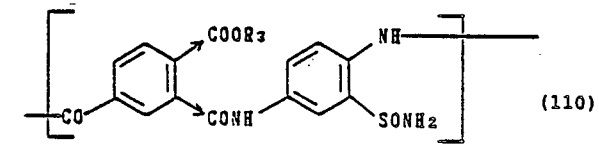 (110)
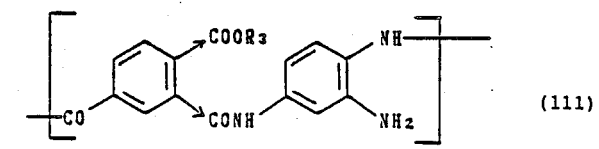 (111)
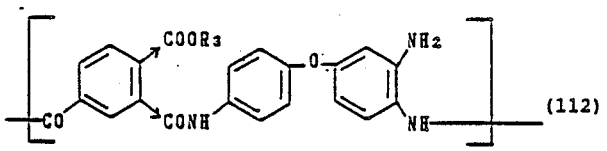 (112)
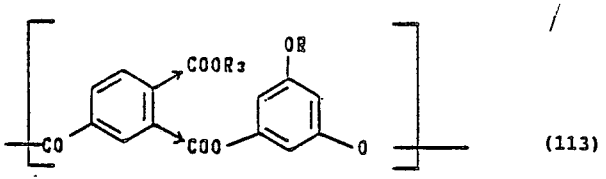 (113)

-continued
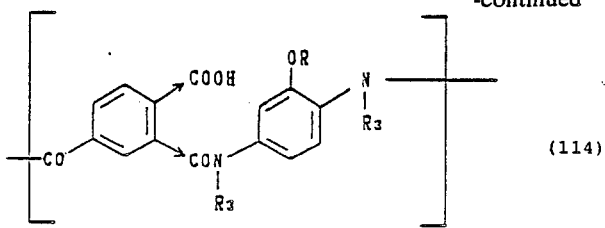 (114)
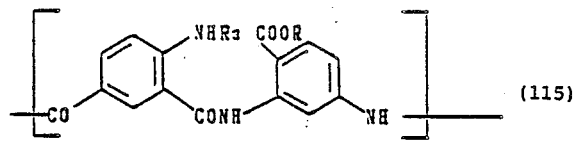 (115)
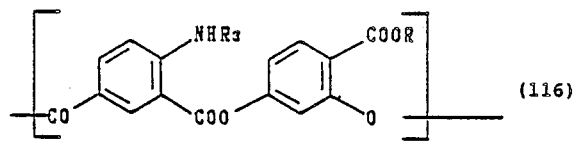 (116)
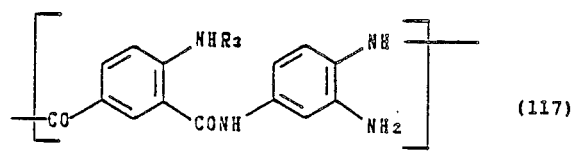 (117)
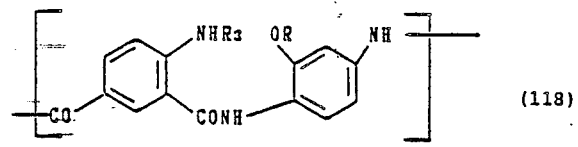 (118)
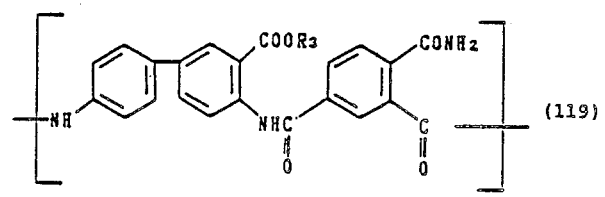 (119)
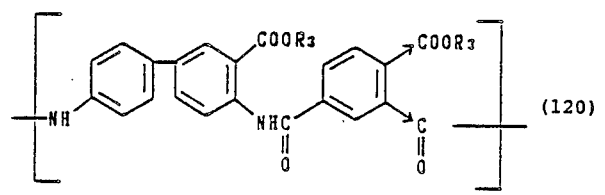 (120)
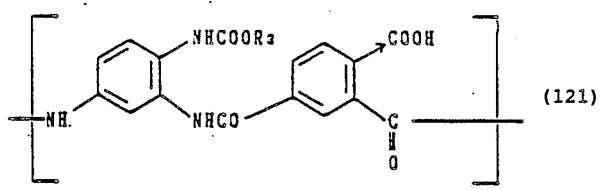 (121)

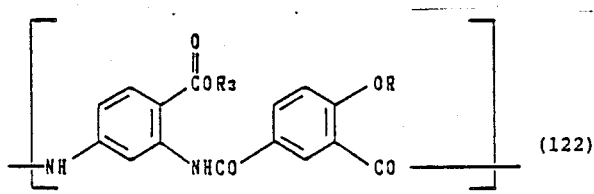
(122)
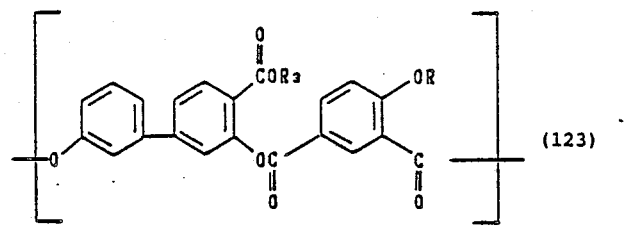
(123)
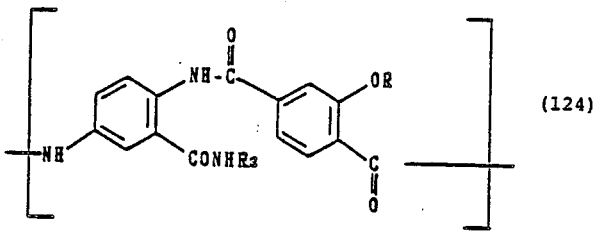
(124)
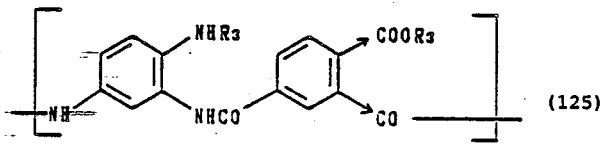
(125)
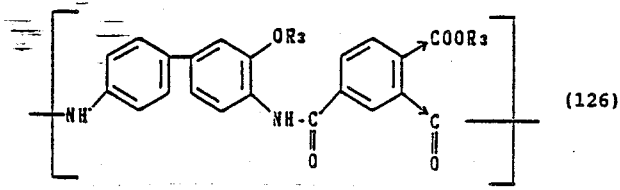
(126)
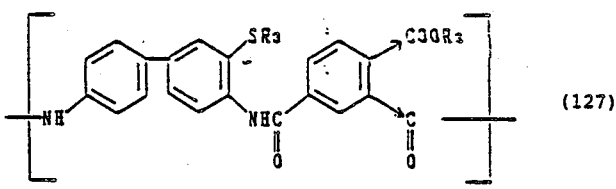
(127)
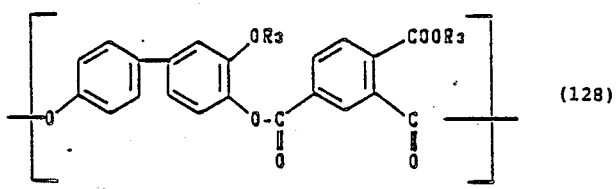
(128)
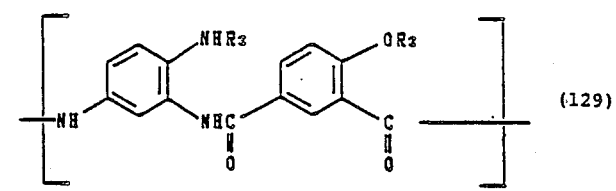
(129)

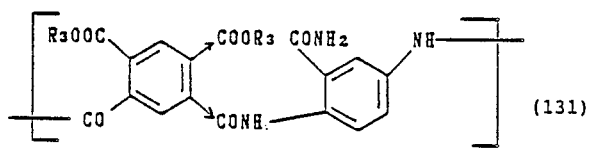 (131)
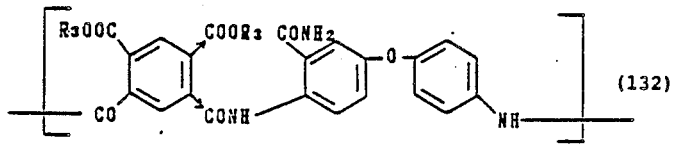 (132)
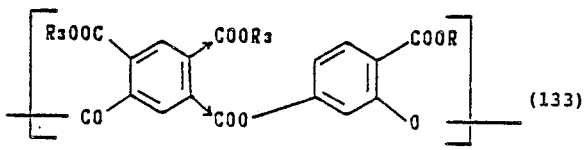 (133)
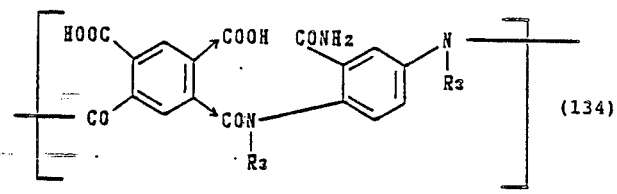 (134)
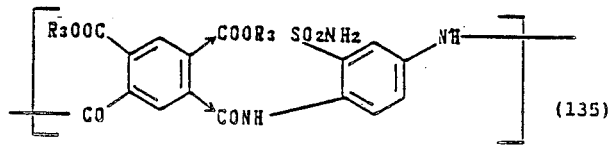 (135)
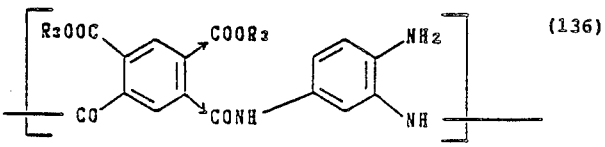 (136)
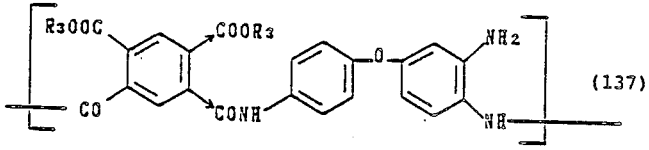 (137)
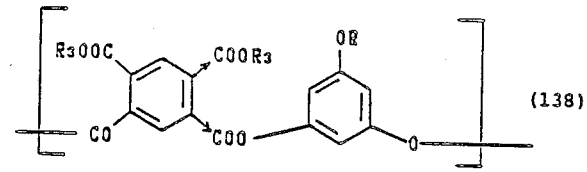 (138)

-continued
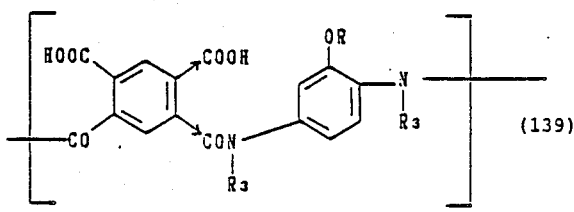
(139)
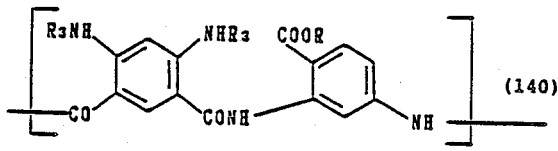
(140)
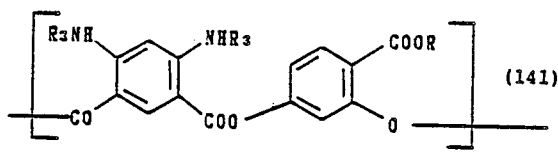
(141)
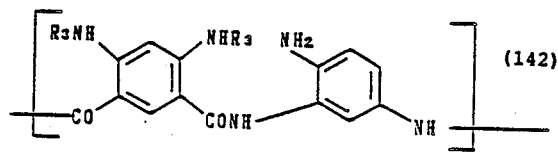
(142)
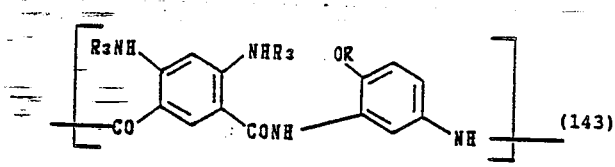
(143)
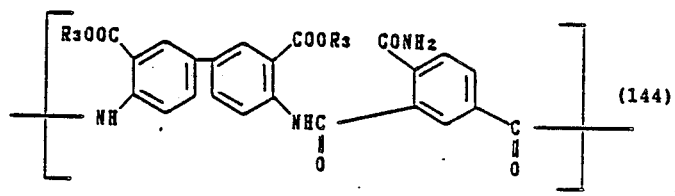
(144)
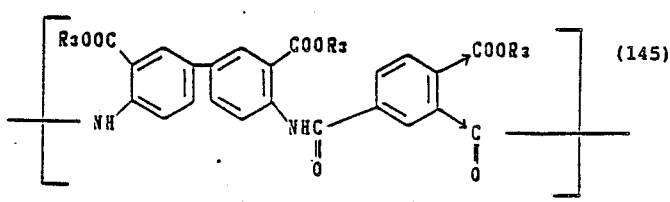
(145)
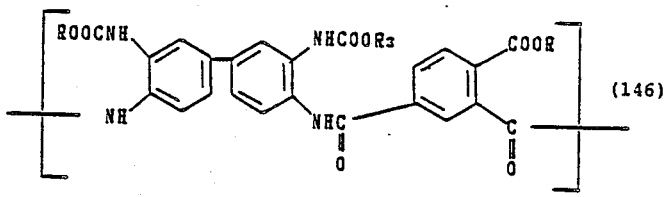
(146)

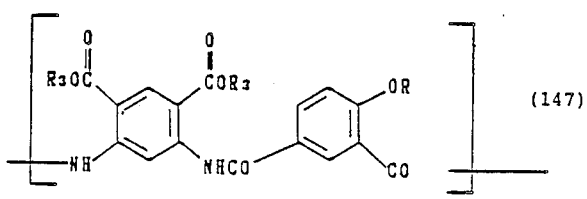
(147)
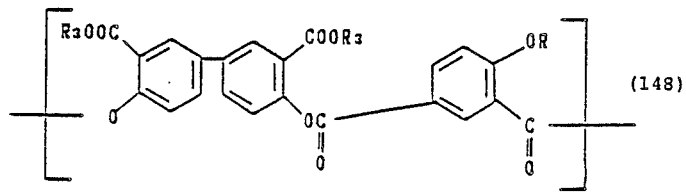
(148)
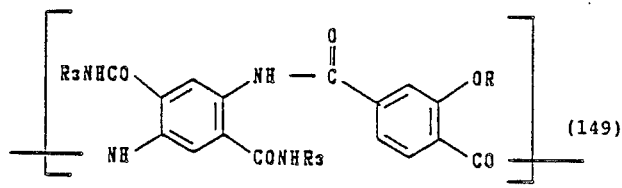
(149)
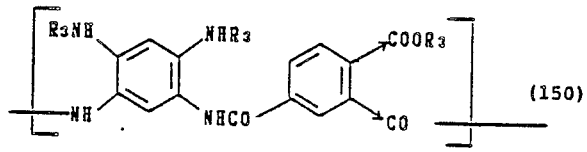
(150)
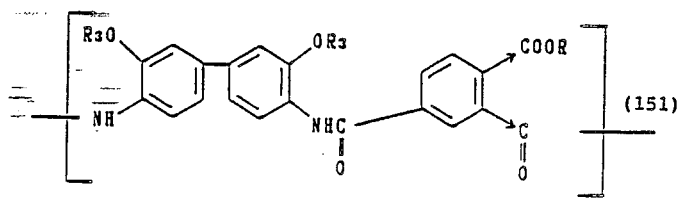
(151)
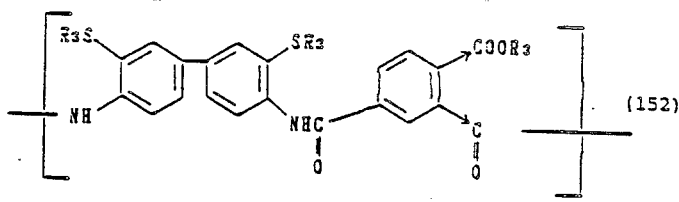
(152)
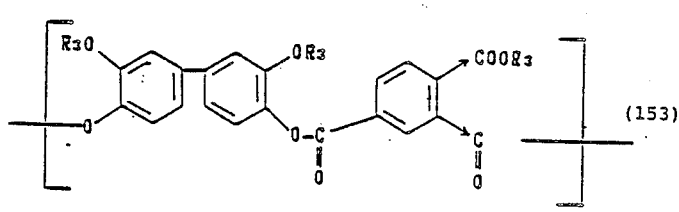
(153)
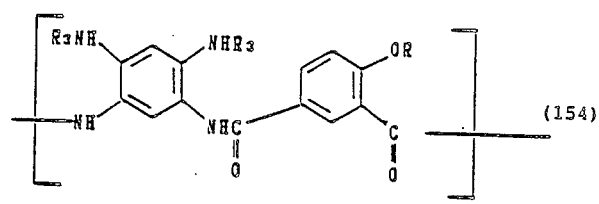
(154)

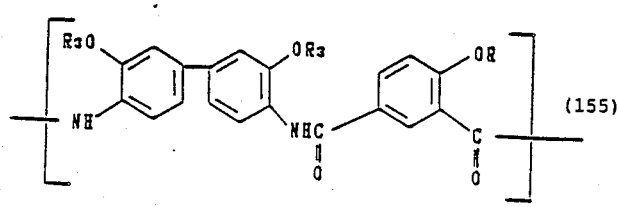
(155)
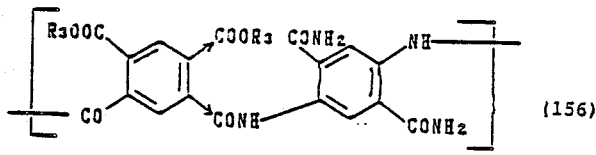
(156)
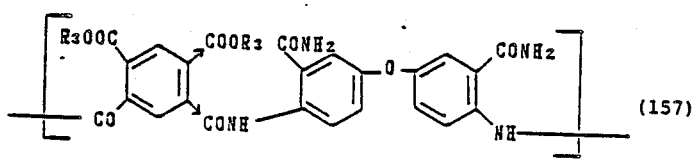
(157)
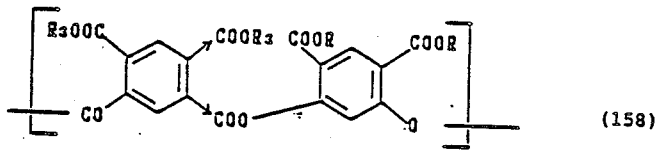
(158)
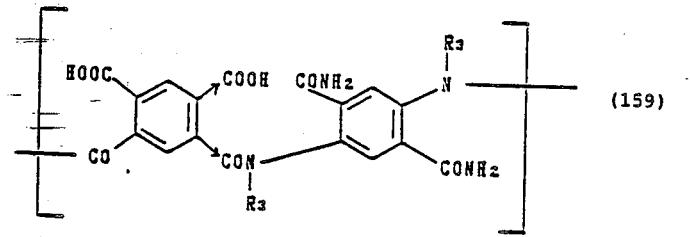
(159)
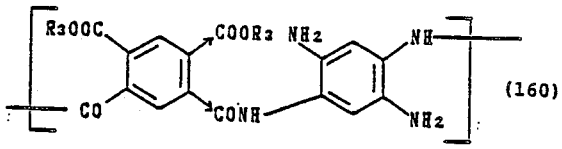
(160)
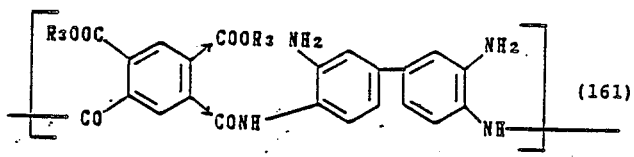
(161)
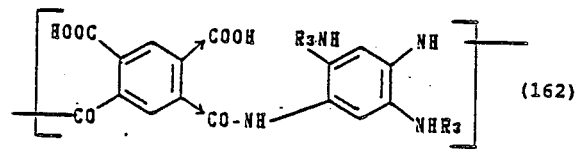
(162)

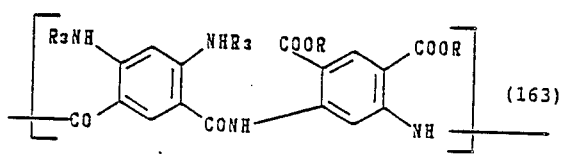
(163)
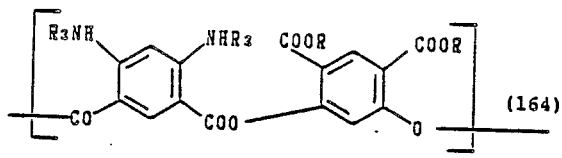
(164)
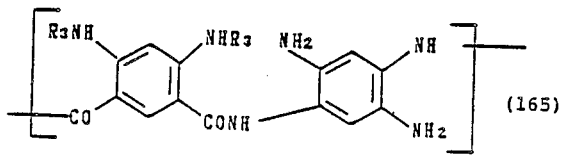
(165)
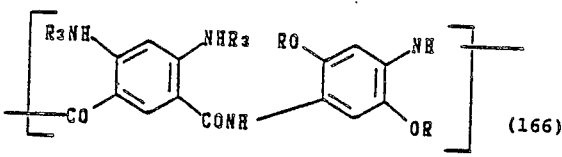
(166)
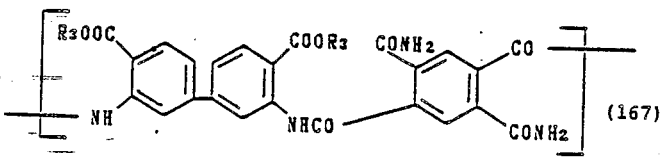
(167)
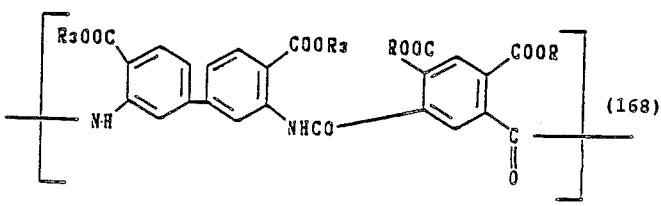
(168)
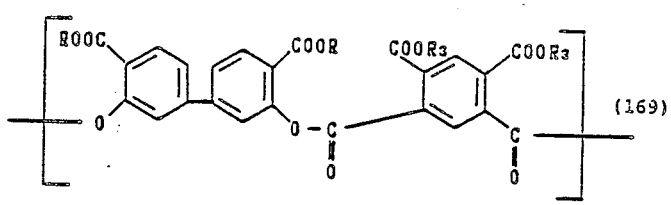
(169)
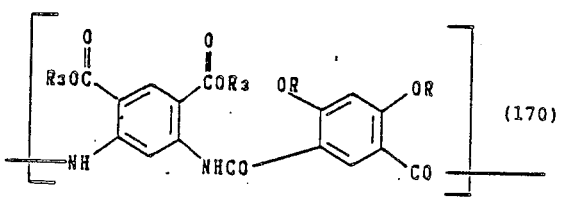
(170)

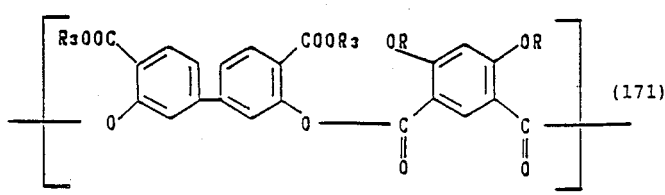
(171)
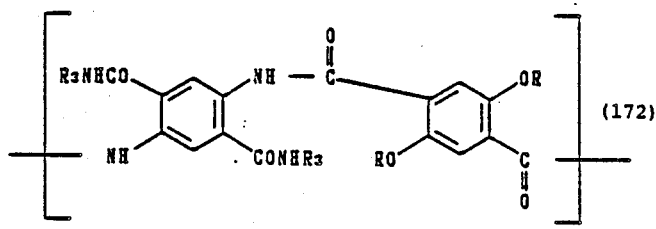
(172)
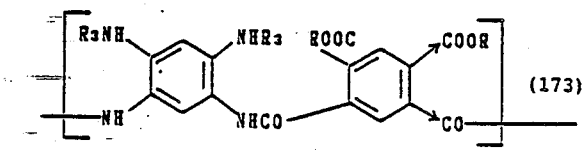
(173)
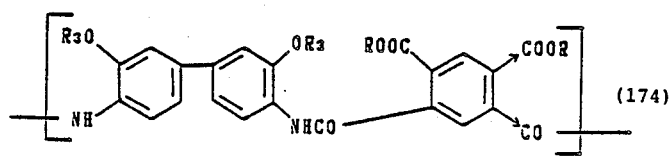
(174)
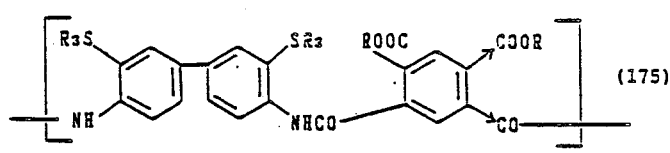
(175)

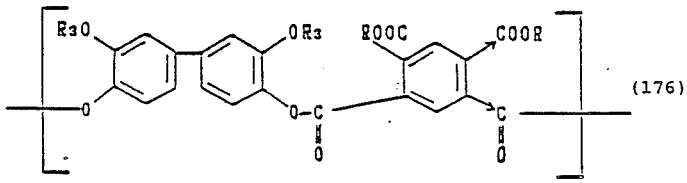
(176)

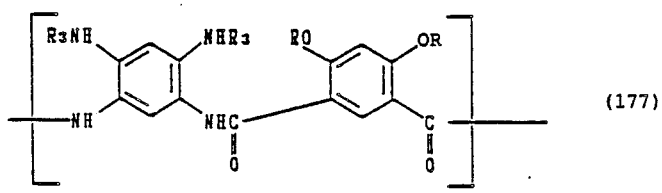
(177)

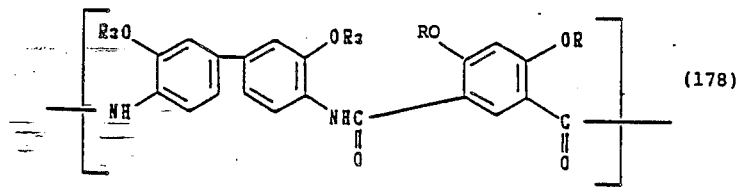
(178)

In the above formulas, "→" indicates isomerism. For instance, formula (83) stands for formulae (83−1) and (83−2) shown below.

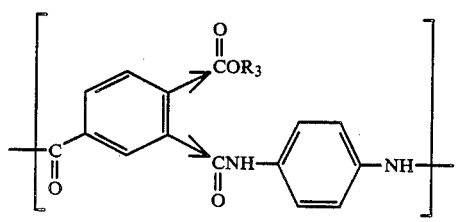
(83)

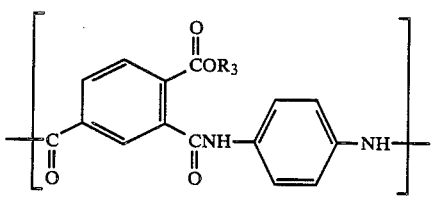
(83-1)

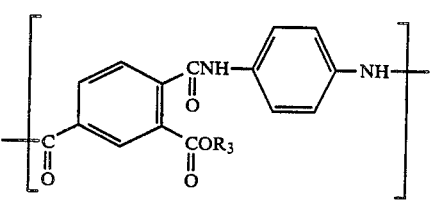
(83-2)

This invention includes not only the case where either (83−1) or (83−2) exist but also the case where both of them co-exist.

Other examples will be found in books, for example, "Heat Resistance of Polymers" (Mar. 5, 1970) and "Thermal Decomposition and Heat Resistance of Polymers" (Mar. 15, 1974), both edited by Hirotaro Kanbe and published by Baifukan Co., Ltd.

This invention also provides a process for producing an amphiphilic high polymer as described above, which comprises polycondensating a combination of a monomer containing a first organic group ($R_1$) and a monomer containing a second organic group ($R_2$), at least one of said organic groups $R_1$ and $R_2$ containing one or two $R_3$ groups, and said combination being selected from those set forth below:

```
A—R₁—A + B—R₂—B
A—R₁—B + B—R₂—B
A—R₁—B + B—R₂—A
```
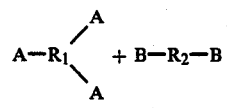
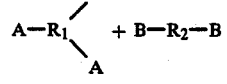
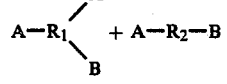
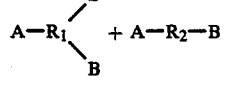
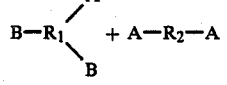
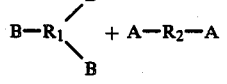
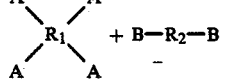
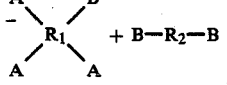
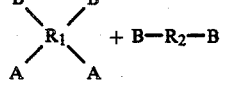
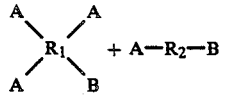
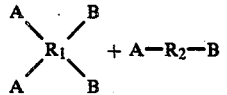
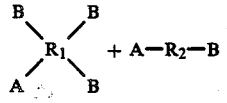
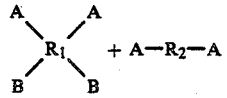
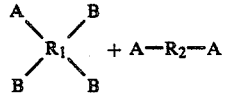
-continued
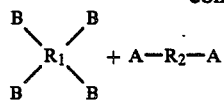
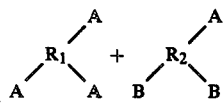
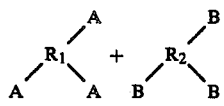
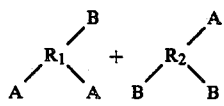
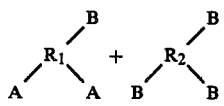
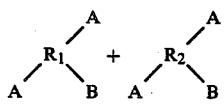
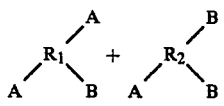
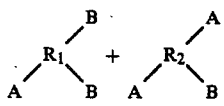
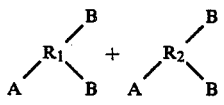
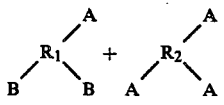
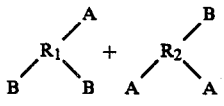
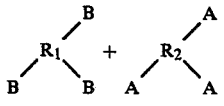
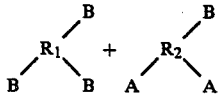
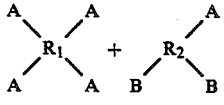

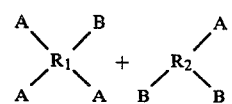
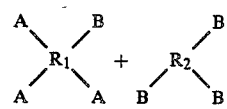
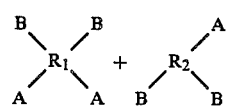
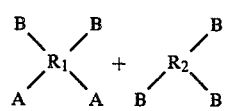
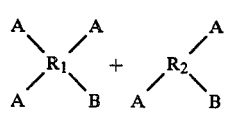
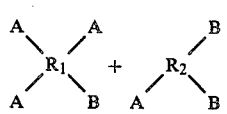
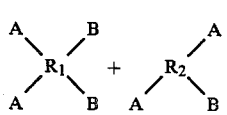
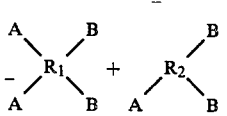
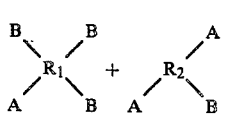
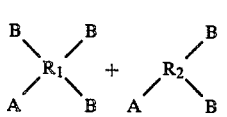
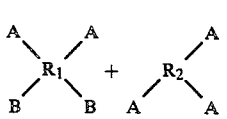
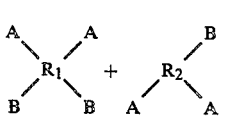
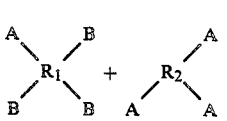
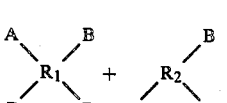
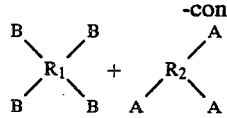
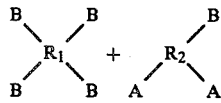
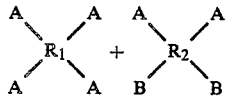
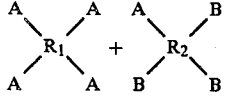
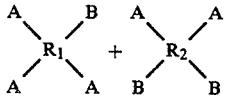
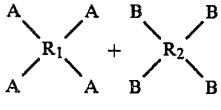
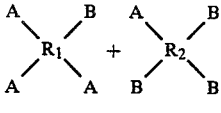
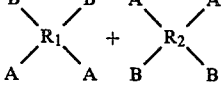
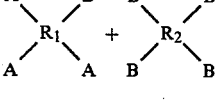
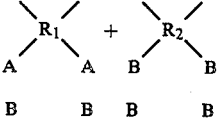
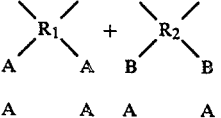
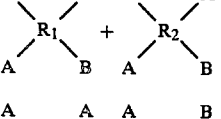
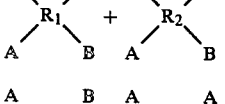

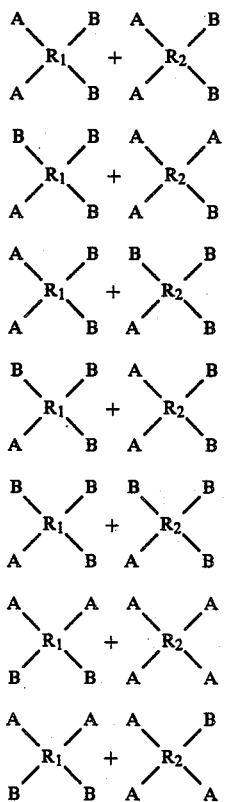
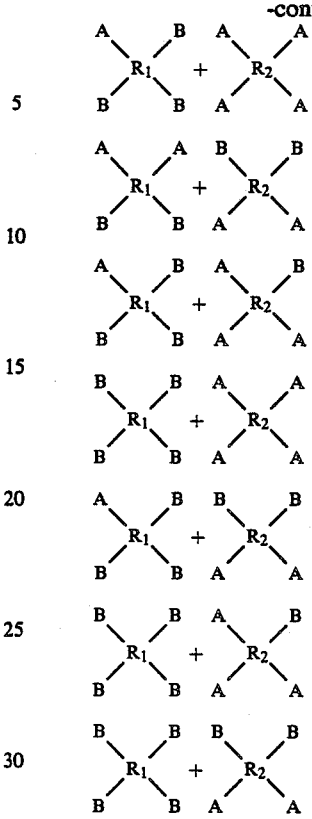
Wherein A represents an acidic group and B represents a basic group.
The process will be illustrated herein below, exemplifying the cases of (76) to (178) shown hereabove.
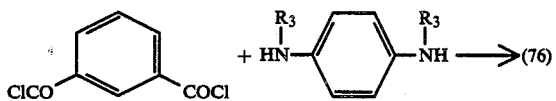
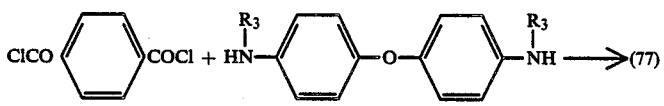
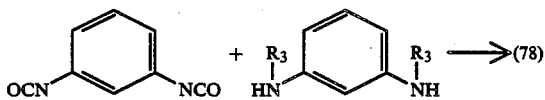
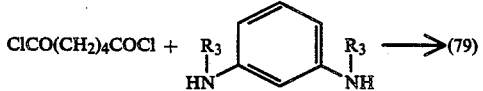
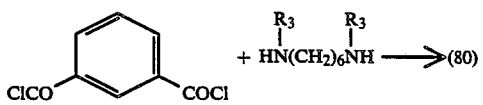
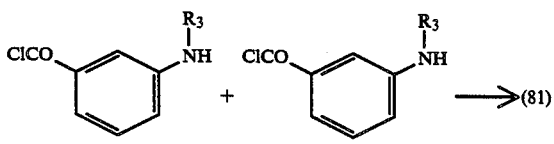

-continued
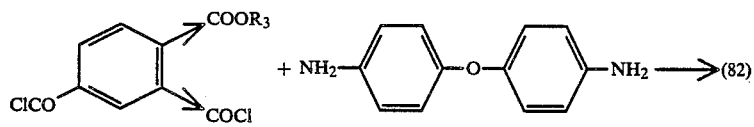 (82)
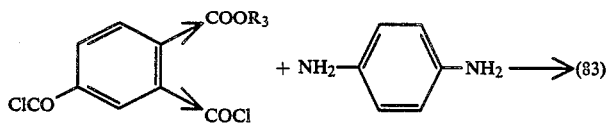 (83)
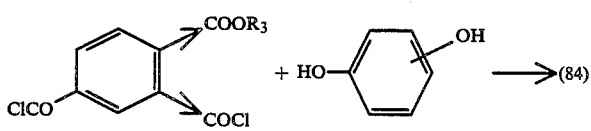 (84)
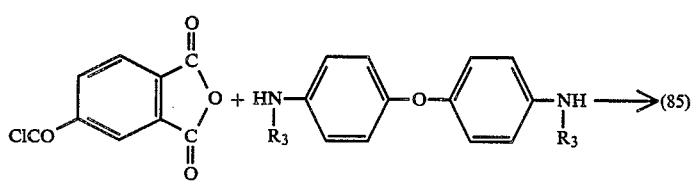 (85)
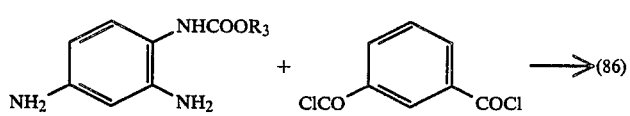 (86)
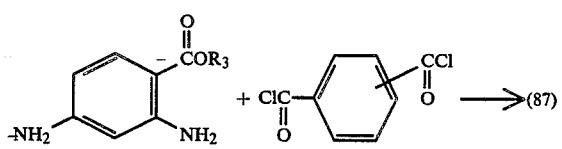 (87)
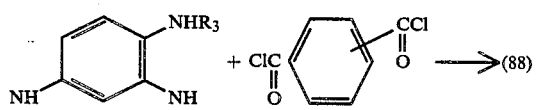 (88)
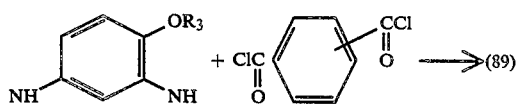 (89)
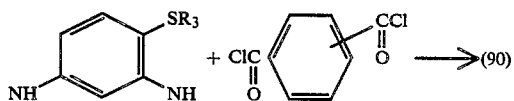 (90)
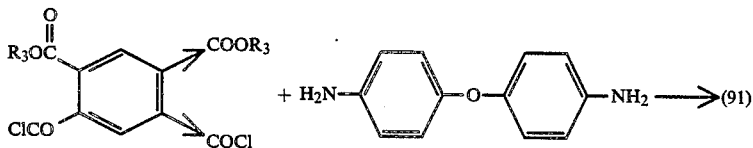 (91)
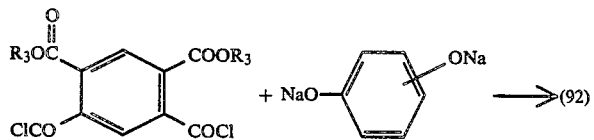 (92)

-continued
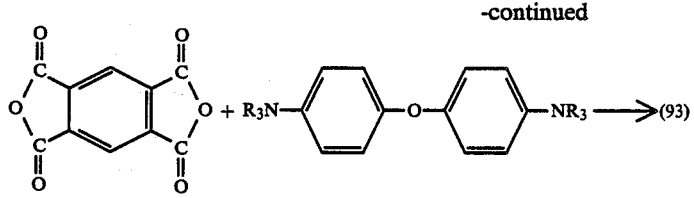 ⟶(93)
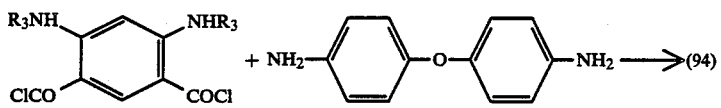 ⟶(94)
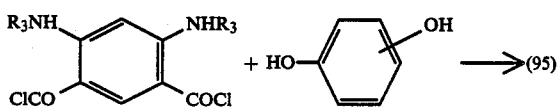 ⟶(95)
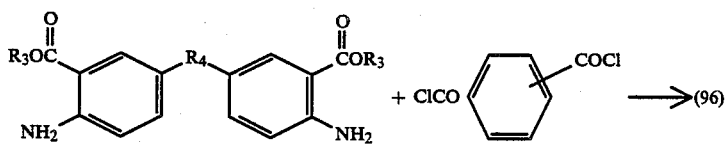 ⟶(96)
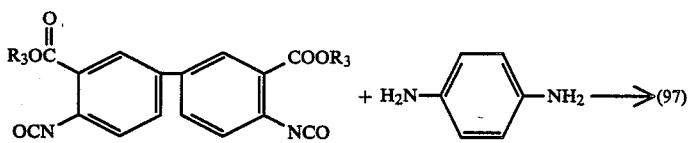 ⟶(97)
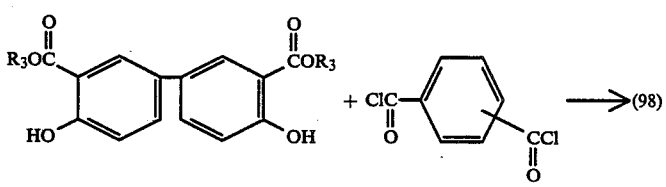 ⟶(98)
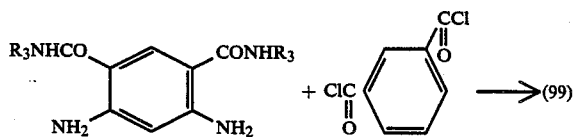 ⟶(99)
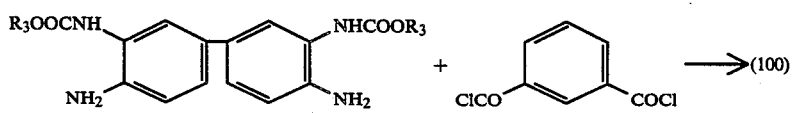 ⟶(100)
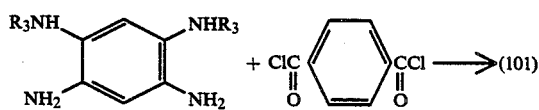 ⟶(101)
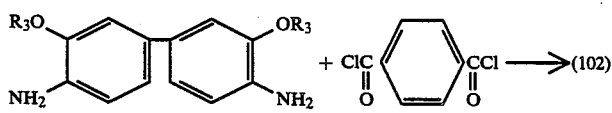 ⟶(102)
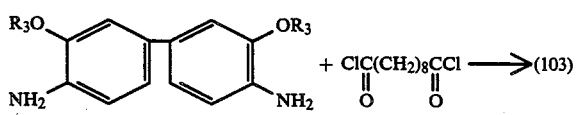 ⟶(103)
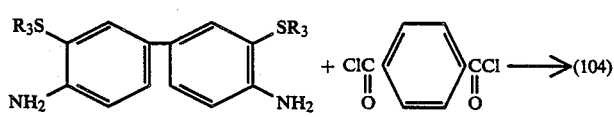 ⟶(104)

-continued
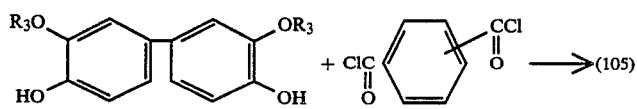 (105)
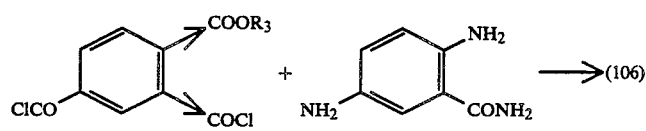 (106)
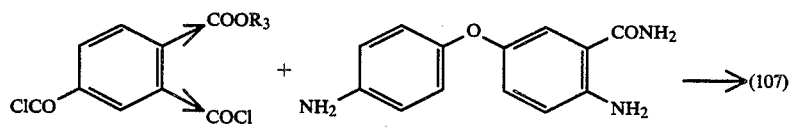 (107)
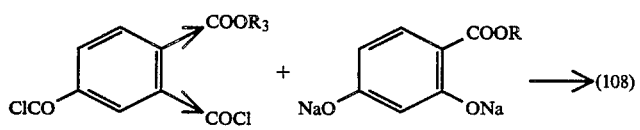 (108)
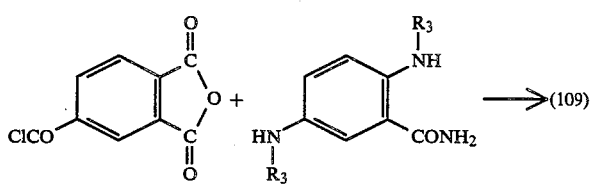 (109)
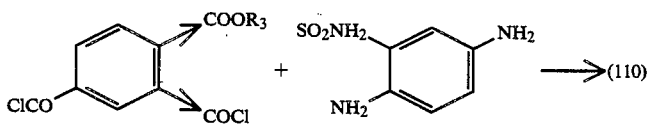 (110)
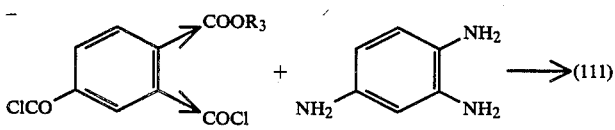 (111)
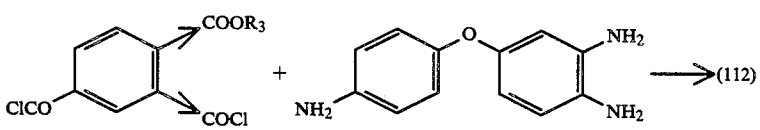 (112)
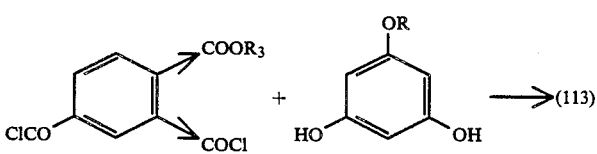 (113)
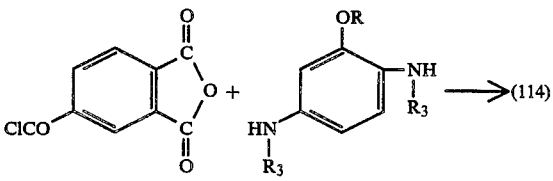 (114)
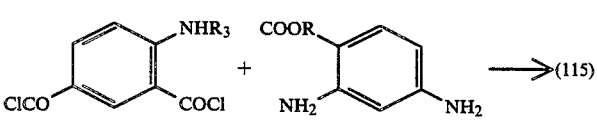 (115)

-continued
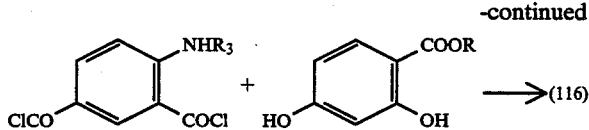
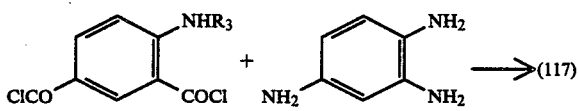
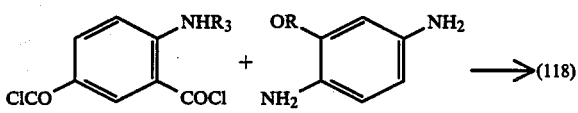
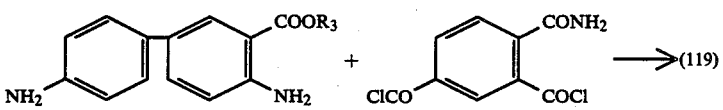
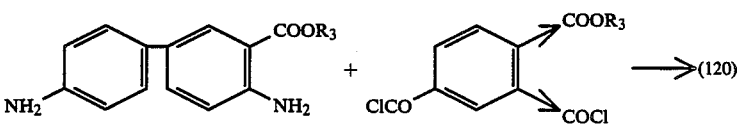
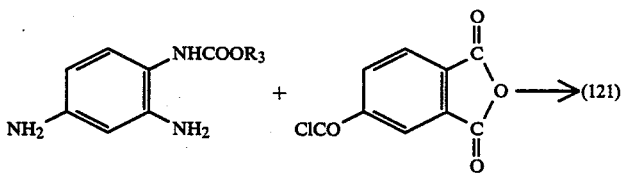
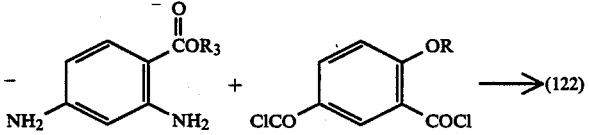
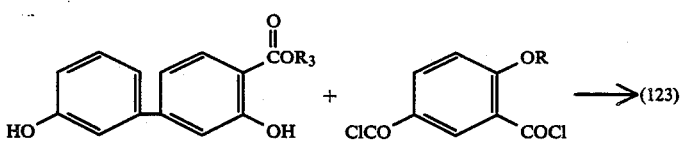
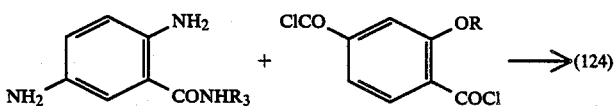
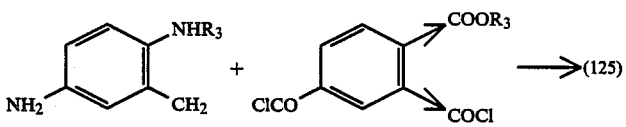
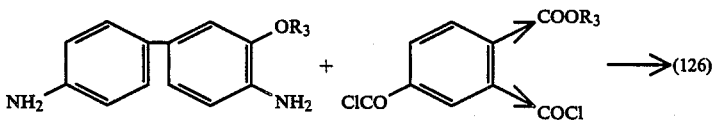
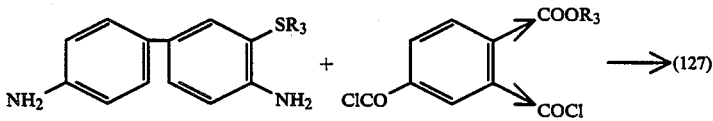

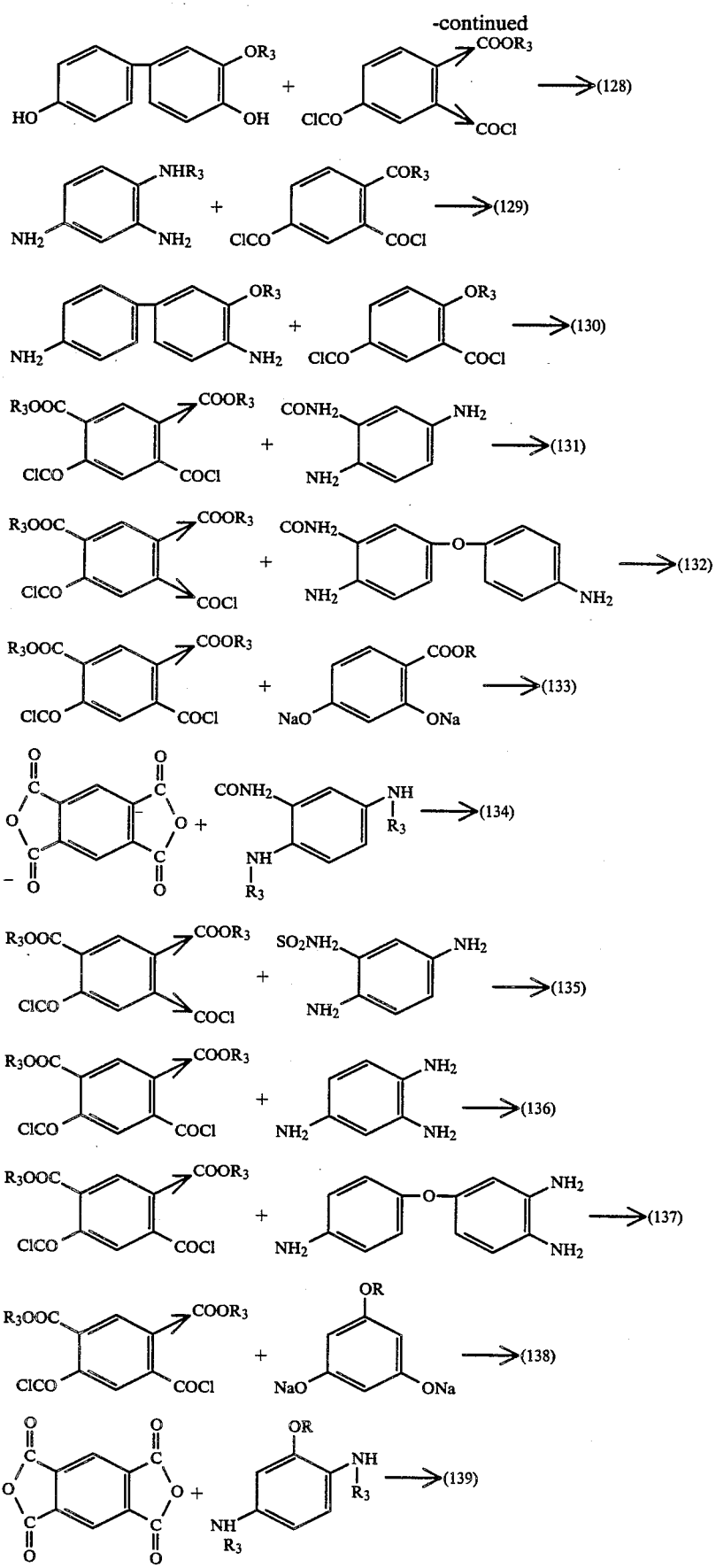

-continued
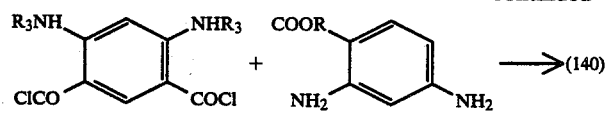 →(140)
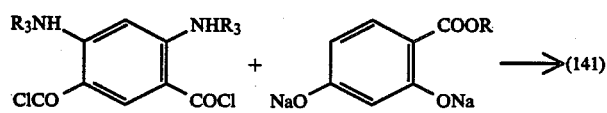 →(141)
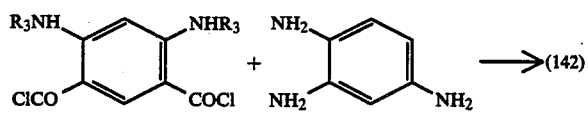 →(142)
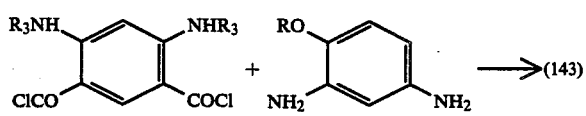 →(143)
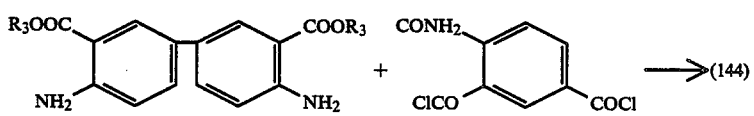 →(144)
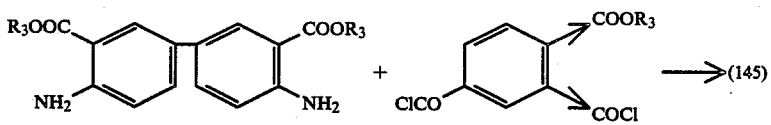 →(145)
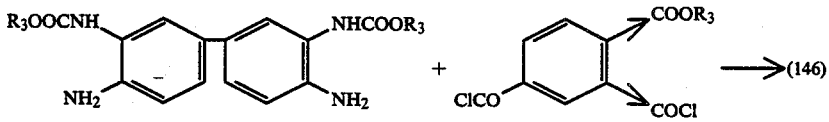 →(146)
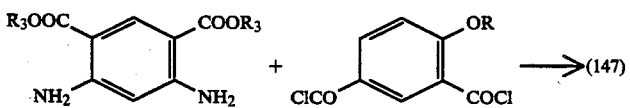 →(147)
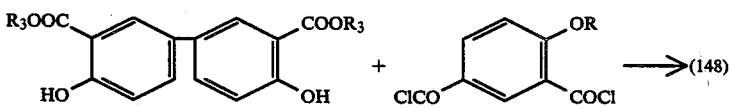 →(148)
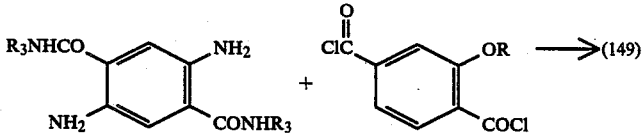 →(149)
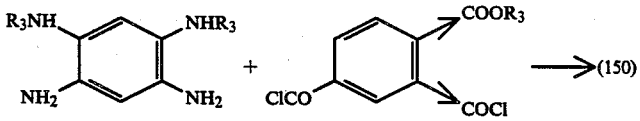 →(150)
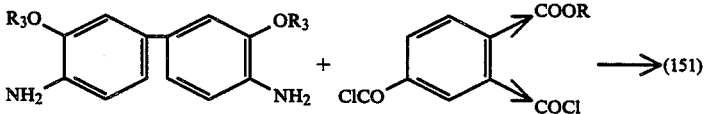 →(151)
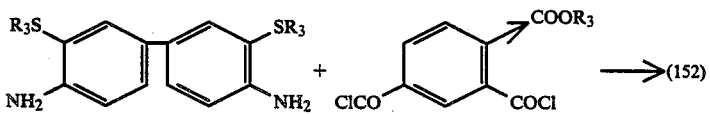 →(152)

-continued
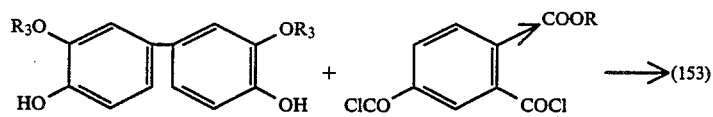 →(153)
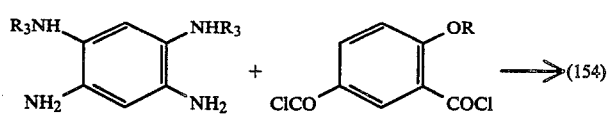 →(154)
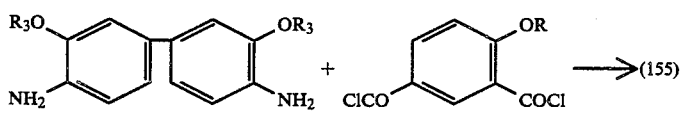 →(155)
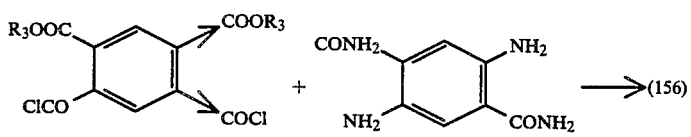 →(156)
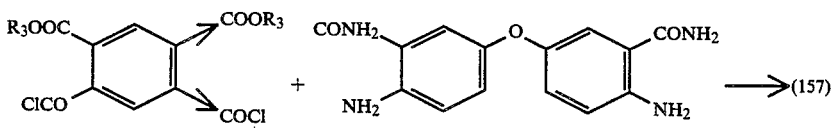 →(157)
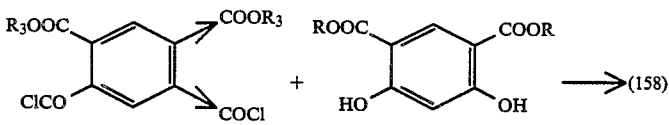 →(158)
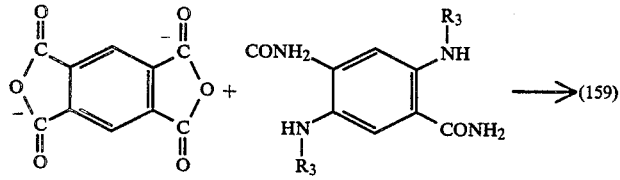 →(159)
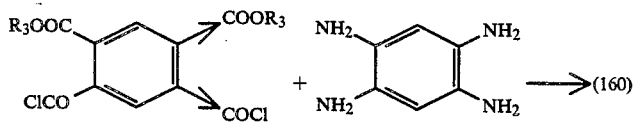 →(160)
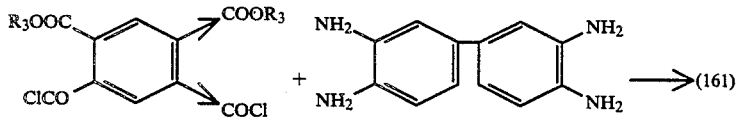 →(161)
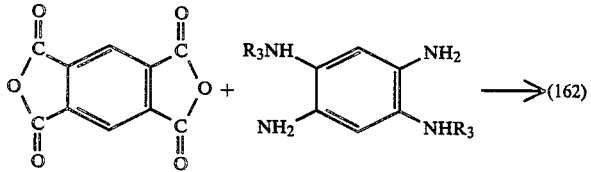 →(162)
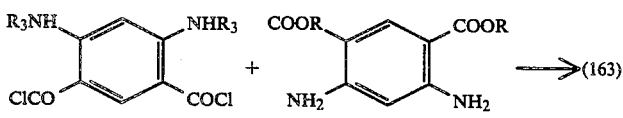 →(163)
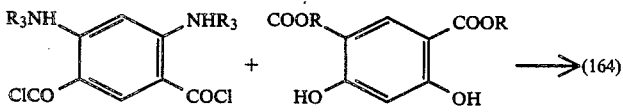 →(164)

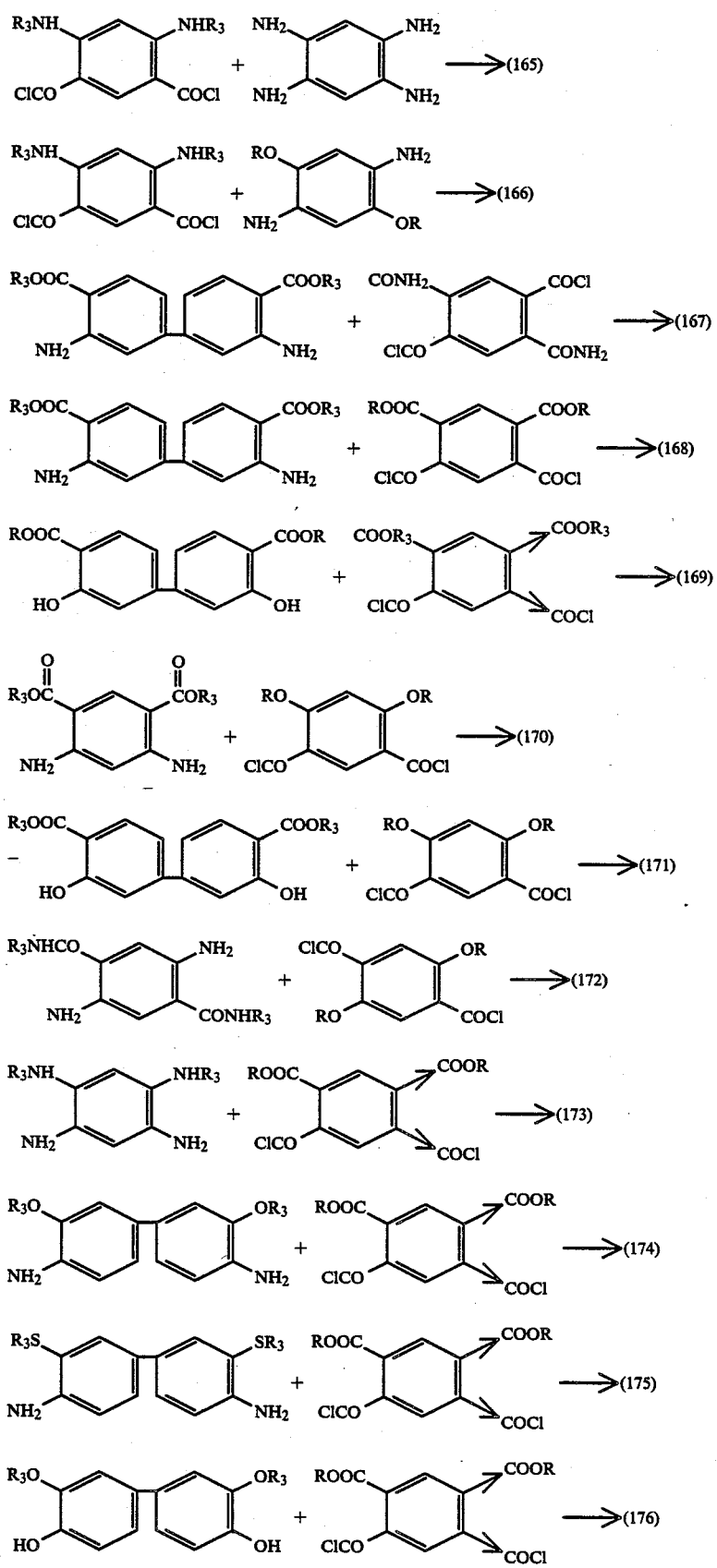

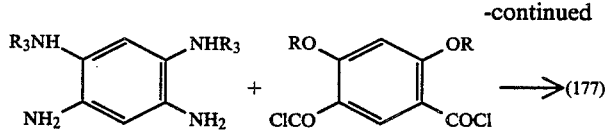
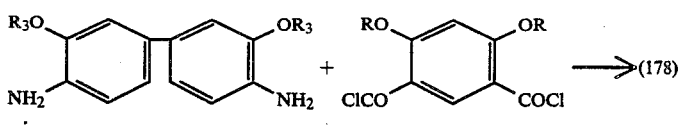

As inferred from the above embodied processes, copolymers of the present invention may be easily prepared in a manner illustrated herein below.

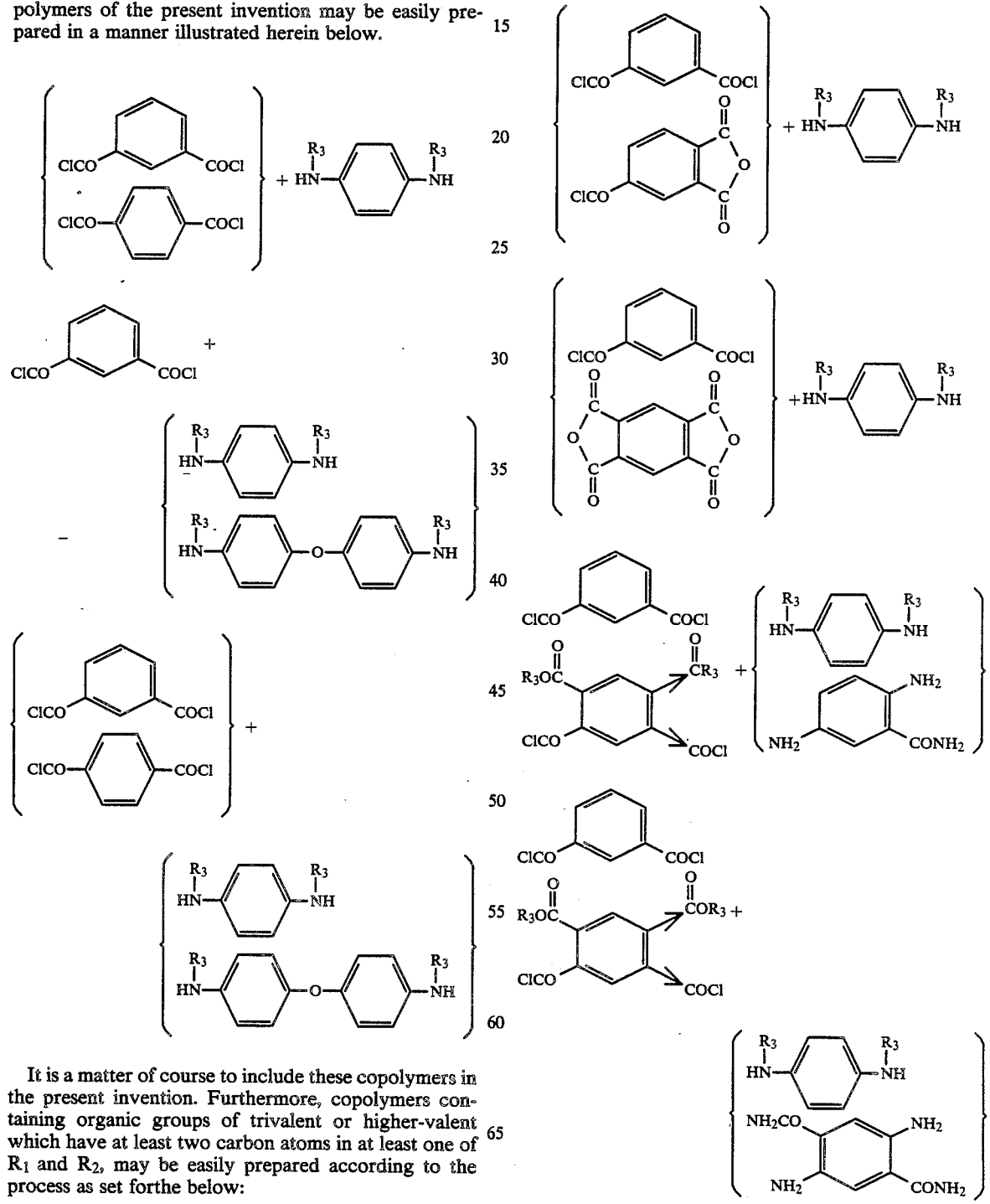

It is a matter of course to include these copolymers in the present invention. Furthermore, copolymers containing organic groups of trivalent or higher-valent which have at least two carbon atoms in at least one of $R_1$ and $R_2$, may be easily prepared according to the process as set forthe below:

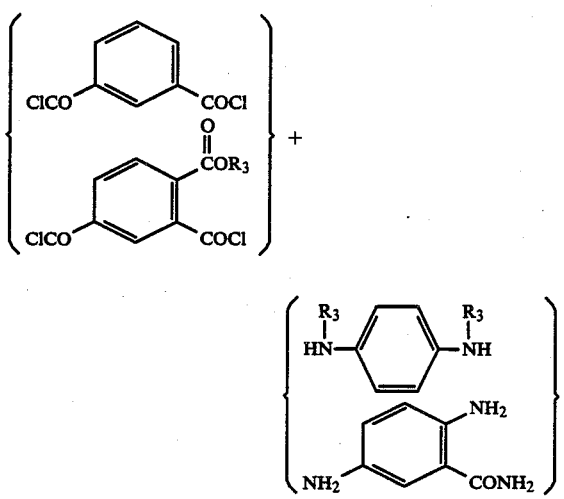

Copolymers, thus prepared, are within the scope of the present invention as preferred embodiments, and is expected to improve its heat-resistance. Various copolymers other than those disclosed herein are included in the present invention, and these may be prepared according to the proceeding processes.

The process for producing thin films of the modified amphiphilic high polymer will be explained thereinbelow, referring to the case where $R_3=CH_3(CH_2)_{17}-$ in formula (91). The following compound:

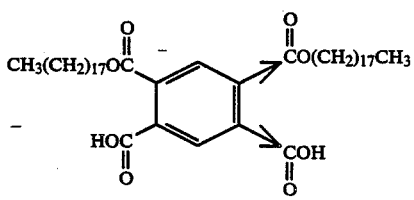

which can be obtained by alcoholysis of pyromellitic acid dianhydride, is acylated with thionyl chloride at a temperature not lower than $-10°$ C., preferably from ca. 0 to 40° C., in an organic polar solvent under a substantially moisture free condition, and then the resulting product is reacted with diaminodiphenyl ether at a temperature not lower than $-10°$ C., preferably from ca. 0 to $+10°$ C. to produce the desired product. The post reaction may be completed at a temperature not lower than 20° C. Acylation and amidation are usually carried out at a temperature lower than 0° C. and usually ca. $-10°$ C. It can, however, be preferable in this invention to carry out the acylation and the amidation at a temperature in the temperature range described above since the substituent groups, such as long chain alkyl groups, of the amphiphilic high polymer have a tendency to be frozen and solidified. It is a matter of course that, in the above production, starting materials having different substitutional groups can be used in combination, so as to produce a copolymer. Tetracarboxylic acid dianhydrides and diamines, which may have no substituent groups or may have substituent groups containing not more than 10 carbon atoms, can also be used in an amount up to ca. 30%.

The thus prepared amphiphilic polyimide precursor can be used as a material for forming a film after having been isolated and purified, or can be added with a solvent, such as chloroform and benzene, so as to directly make a spreading solution for forming a polymeric film.

Explanations will be given hereinbelow on the process for forming films from the high polymer of this invention. Films can be formed by the solvent casting process, the spin coating process, the Langmuir-Blodgett process, etc. The Langmuir-Blodgett process can be preferable as a method for forming an oriented thin film having a thickness controlled in the order of tens Å and less suffering from pin holes.

In the case of the solvent casting or spin coating process, the high polymer of this invention or a mixture thereof can be dissolved in a solvent, such as benzene, chloroform, ethyl ether, ethyl acetate, tetrahydrofuran, dimethylformamide and N,N-dimethylacetamide, and the solution can be applied onto a substrate. Although it is not possible to orient molecules, excellent pin hole-free films having a thickness greater than ca. 1,000 Å can be obtained in accordance with the solvent casting process or the spin casting process.

Explanations will be given hereinbelow on the process for forming Langmuir-Blodgett films to be used in this invention.

In a process for forming a Langmuir-Blodgett film, a film-forming material is spread on the surface of water, and the thus spread material is compressed at a certain surface pressure to form a monomolecular film, which is then transferred or laminated onto a substrate by passing the substrate through the film. This is known as the vertical dipping method. Other known processes for forming a Langmuir-Blodgett film include the horizontal dipping method, the revolving cylindrical method, etc. (see "Shin Jikken Kagaku Koza", Vol. 18 (Surface and Colloids), pp. 498–508. Any conventional processes can be applied to this invention without any particular restrictions.

The Langmuir-Blodgett process is an excellent method for forming oriented thin film of not less than 1000 Å, or of several hundreds Å or several tens Å. The thickness of the thin films can be controlled with an accuracy of some tens Å and the films formed on a substrate in accordance with this invention also have the same characteristic. However, it is possible in this invention to form a film having a thickness greater than 10,000 Å.

Upon the formation of films according to the Langmuir-Blodgett process, there is used, in general, a solvent, such as benzene chloroform and the like, which is insoluble to water and vapourizable into the gaseous phase. However, in the case of the high polymer of this invention, it is preferred to use a polar organic solvent, in order to attain an increased solubility. As examples of preferable polar organic solvents, mention may be made of N,N-diethylformamide, N,N-diethylacetamide, N,N-dimethylmethoxyacetamide, dimethylsulfoxide, N-methyl-2-pyrrolidone, pyridine, dimethylsulfone, hexamethylphosphoramide, tetramethylenesulfone, dimethyltetramethylenesulfone and the like.

In the case where an organic polar solvent is used in combination with a volatile solvent, such as benzene and chloroform, the latter, it is presumed, vapourizes into the gaseous phase during the spreading, whereas the former dissolves into the large quantity of water.

There is no particular limitation on the kind of substrate to be used in this invention. It depends only on the use or application of the film. Examples of substrates usable in this invention include those made of ordinary inorganic substances, such as glass, alumina and quarts; those made of metals, plastics, and semiconductors of, e.g., Groups IV, III–V and II–VI of the Periodic Table, such as Si, GaAs and ZnS; and those made of magnetic materials or ferroelectric materials, such as $PbTiO_3$, $BaTiO_3$, $LiNbO_3$, and $LiTaO_3$. It is also possible to use a substrate subjected to a conventional surface treatment. The adhesion between the high polymer film of this invention and a substrate can also be improved by applying a silicone coupling agent (in particular, a silicone coupling agent containing amino and epoxy groups) or an aluminum chelate to a substrate and then subjecting it to a heat treatment. The substrate may be treated in a plurality of layers with metal salts of fatty acids as conventionaly applied in this field.

It is a characteristic feature of this invention that a thin film of a high polymer having a good heat resistance can be formed on a substrate in accordance with the Langmuir-Blodgett process. It is another feature of this invention that some of the films can be subjected to a partial or complete ring-closing treatment, in order to further improve the heat resistance of the thin film formed on the substrate.

Of the examples represented by formulae (76) to (178), those capable of being subjected to a treatment for forming, partly or completely, 5- or 6-membered rings containing hetero atoms are set forth below by structures after ring-closure.

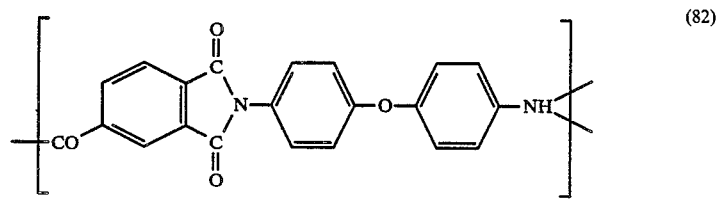

(82)

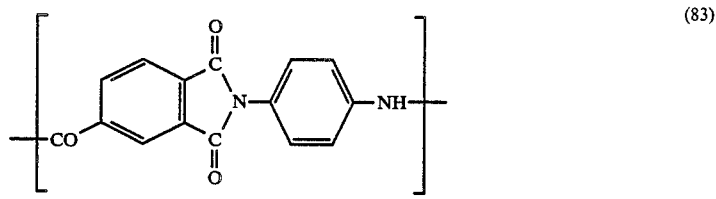

(83)

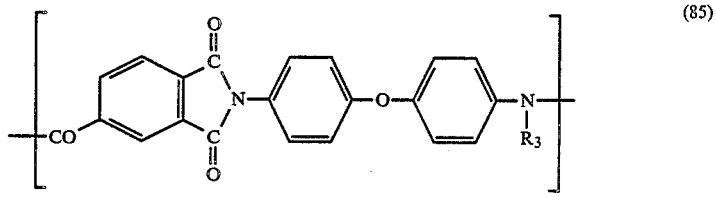

(85)

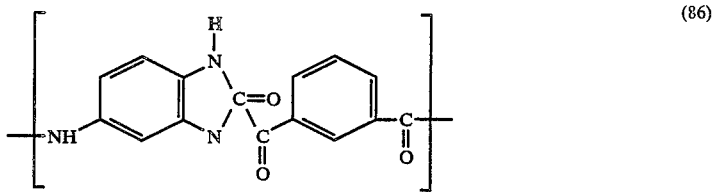

(86)

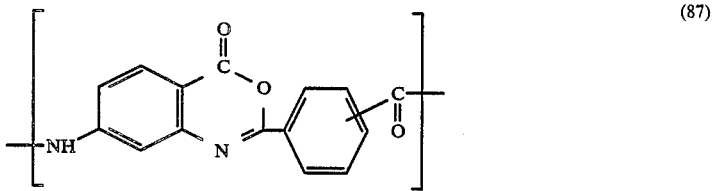

(87)

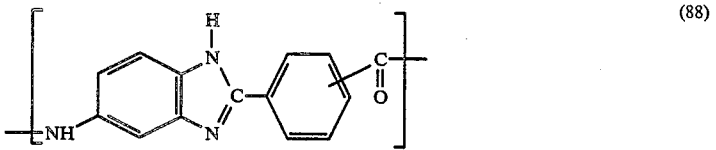

(88)

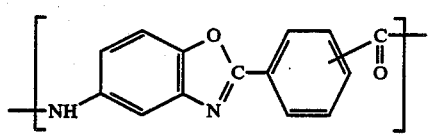
(89)
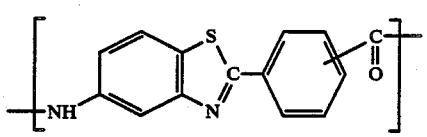
(90)
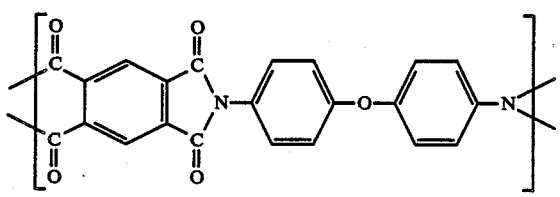
(91)
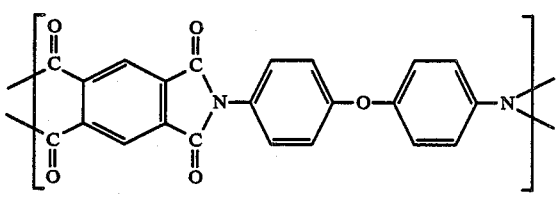
(93)
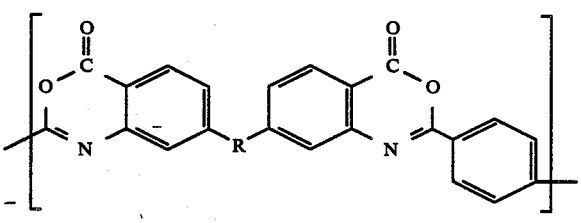
(96)
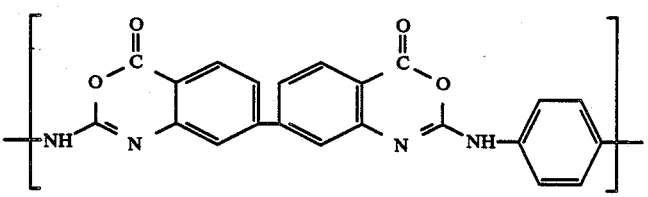
(97)
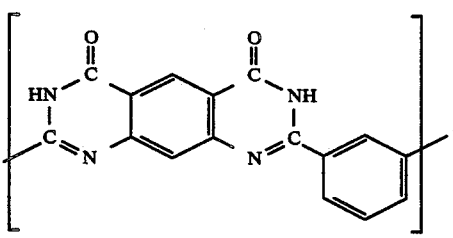
(99)
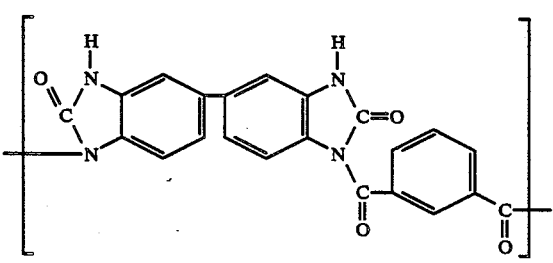
(100)

-continued
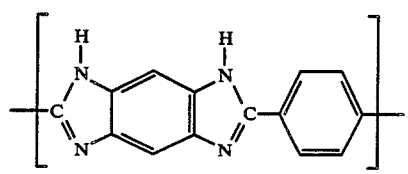 (101)
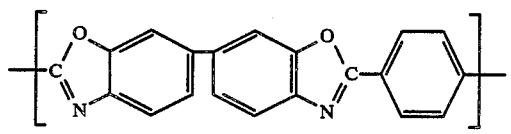 (102)
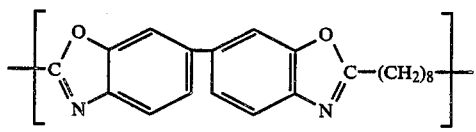 (103)
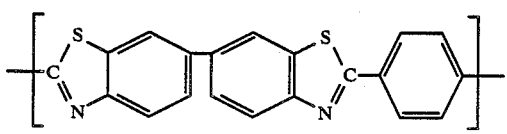 (104)
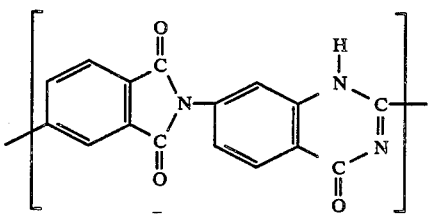 (106)
or
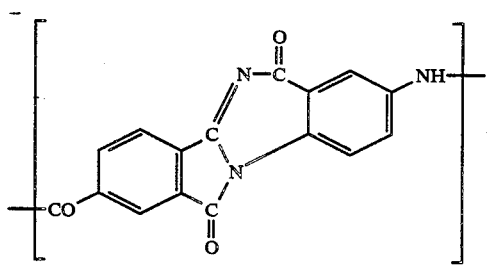
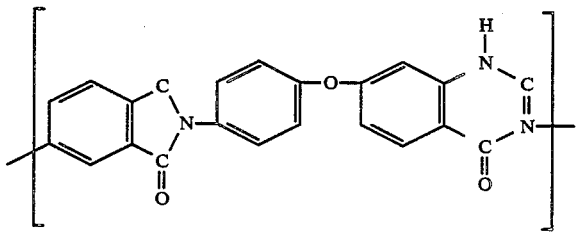 (107)
(109)

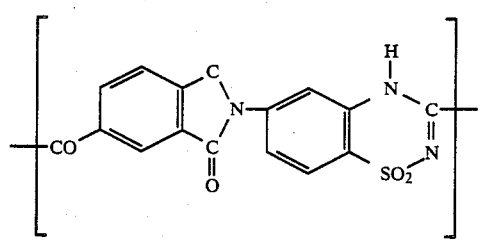
(110)
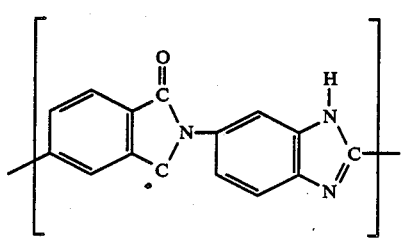
(111)
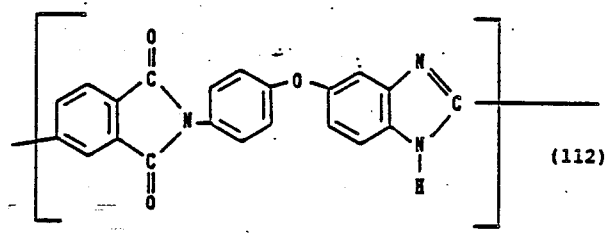
(112)
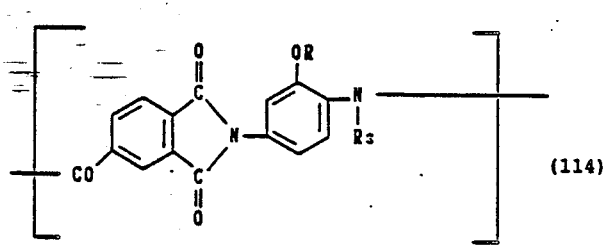
(114)
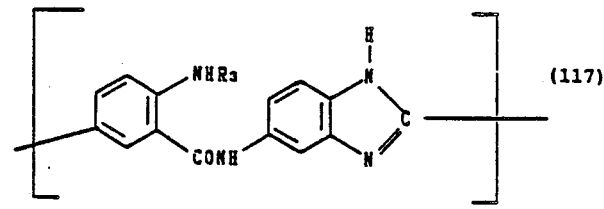
(117)
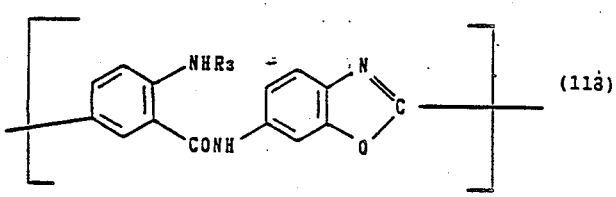
(118)

-continued
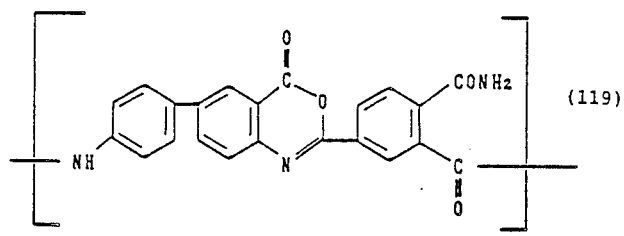 (119)
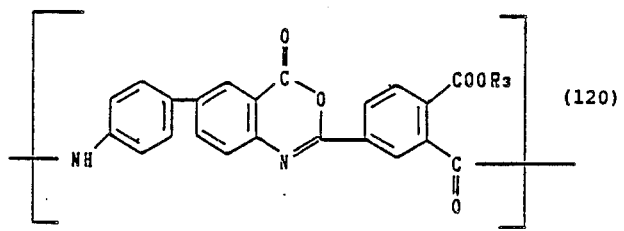 (120)
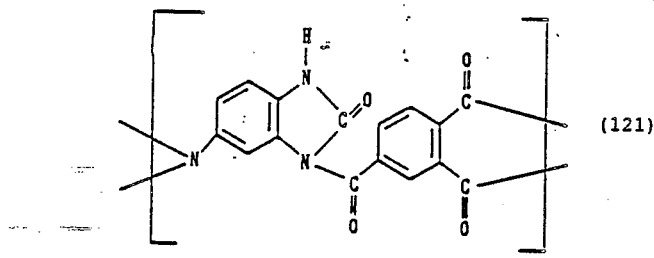 (121)
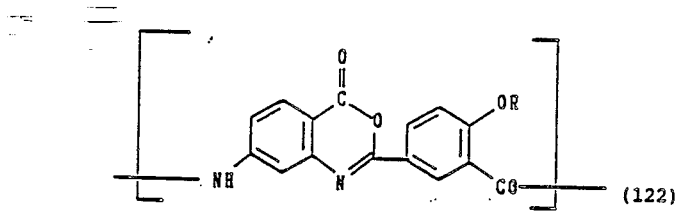 (122)
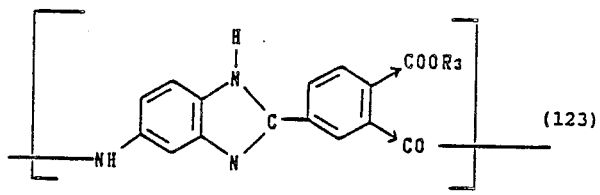 (123)
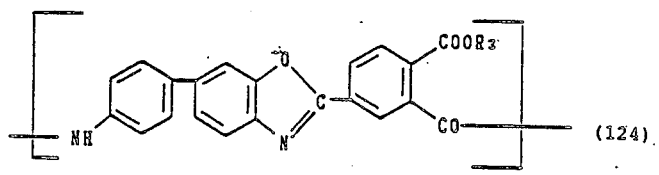 (124)

-continued
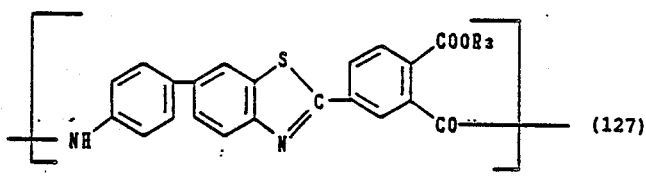 (127)
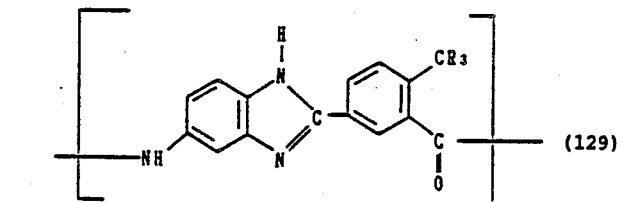 (129)
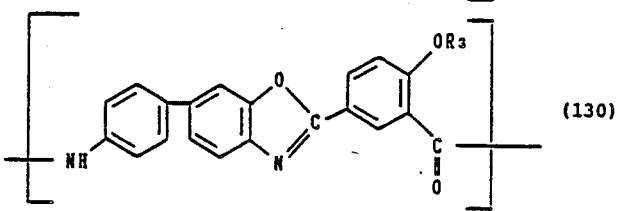 (130)
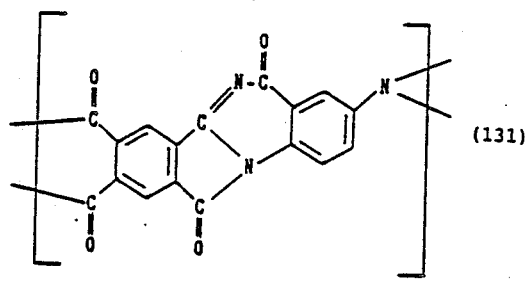 (131)
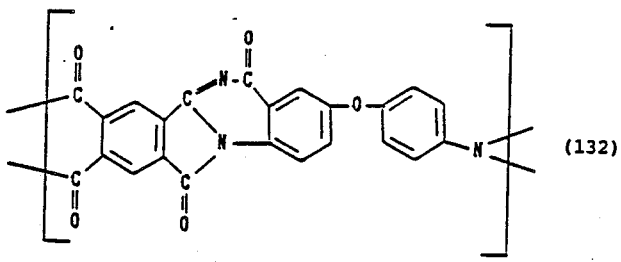 (132)
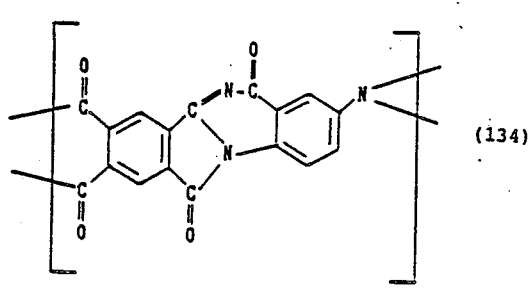 (134)

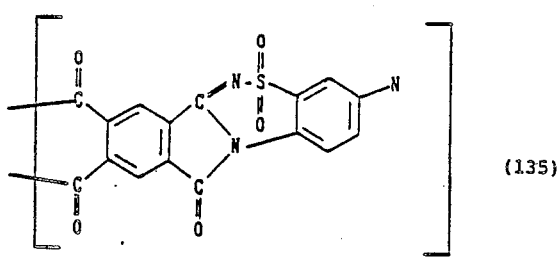
(135)
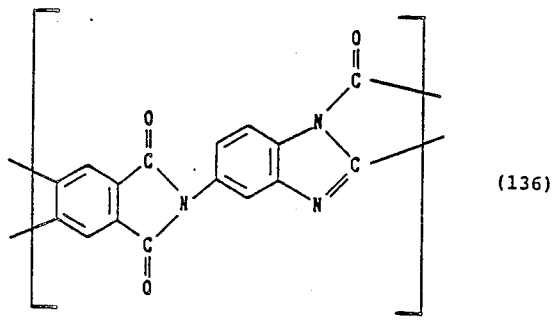
(136)
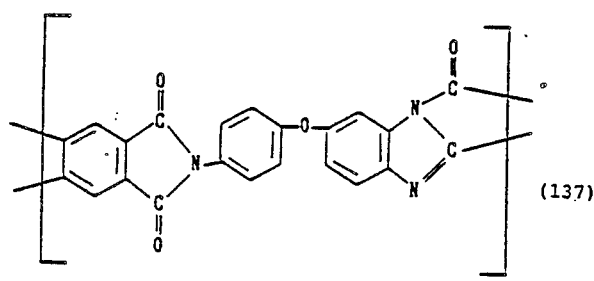
(137)
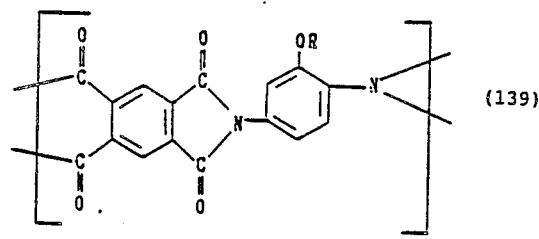
(139)
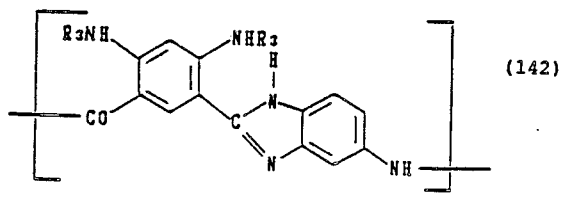
(142)

-continued
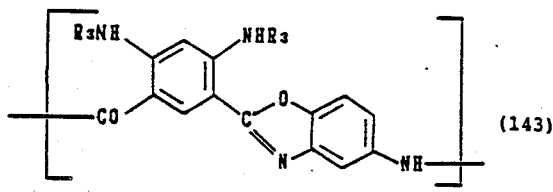
(143)
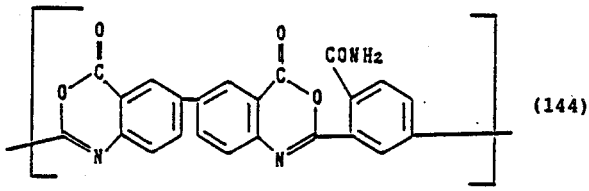
(144)
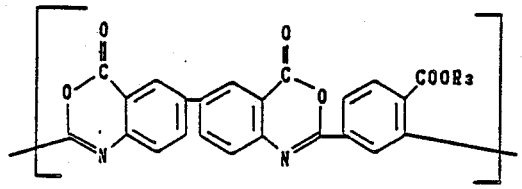
or
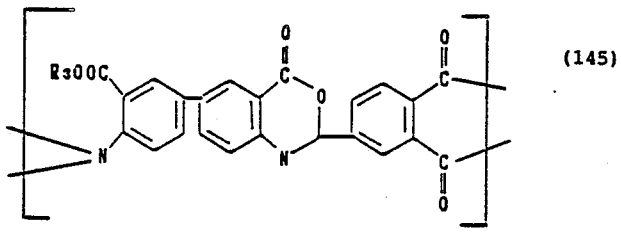
(145)
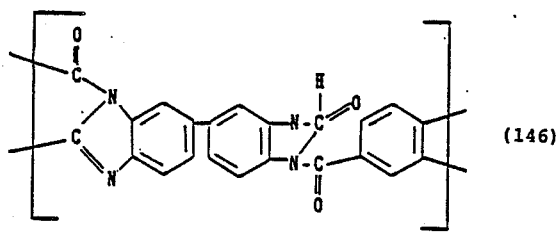
(146)
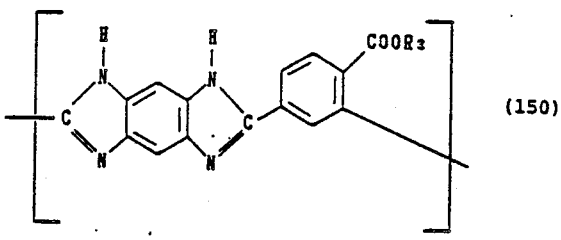
(150)

-continued
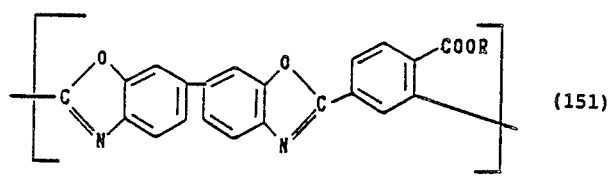 (151)
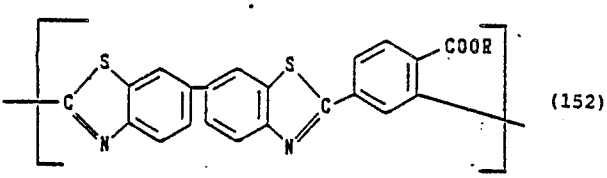 (152)
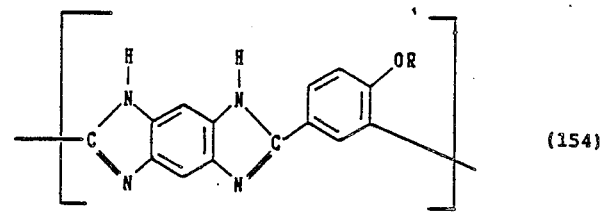 (154)
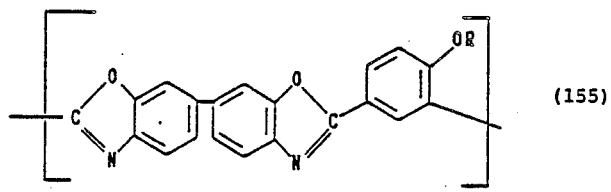 (155)
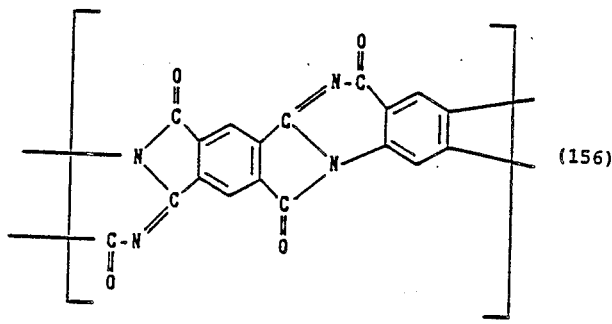 (156)
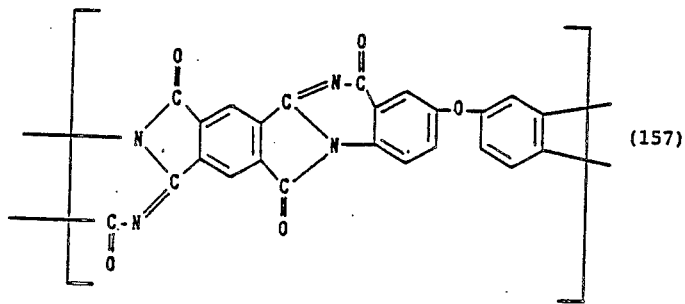 (157)

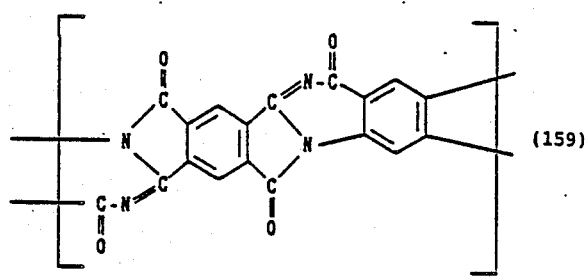
(159)
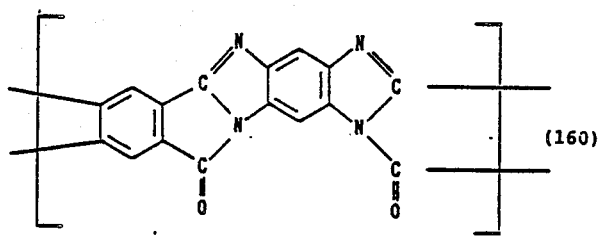
(160)
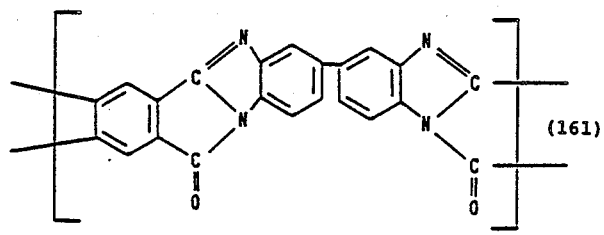
(161)
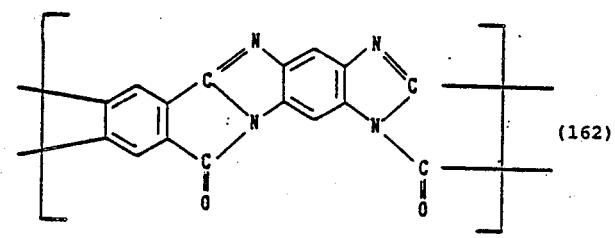
(162)
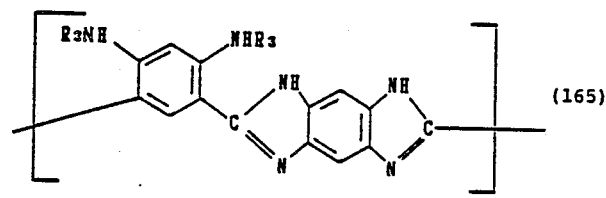
(165)
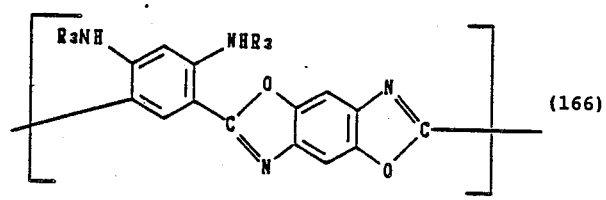
(166)

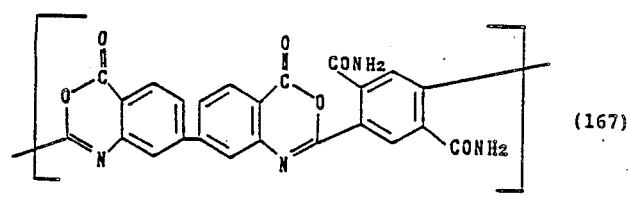 (167)
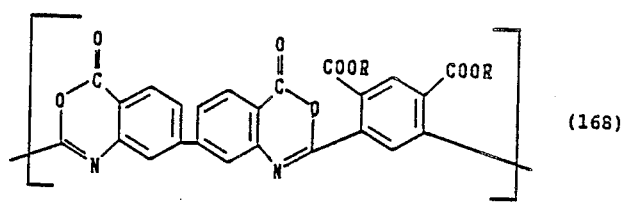 (168)
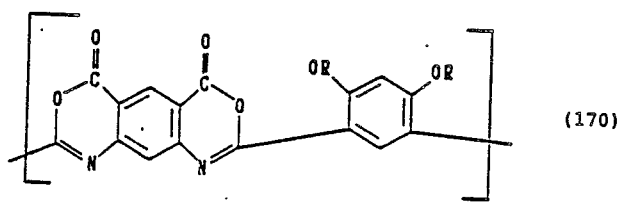 (170)
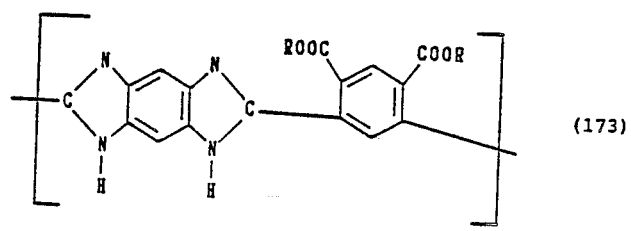 (173)
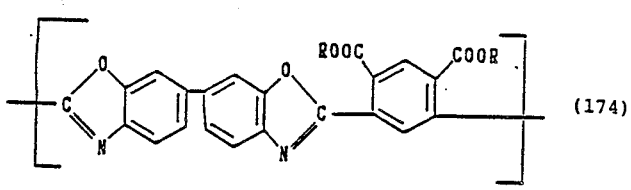 (174)
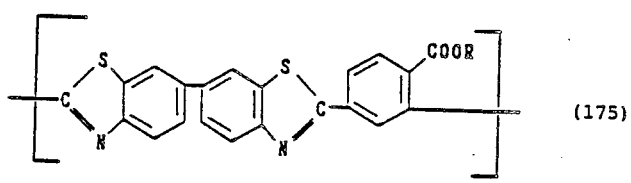 (175)

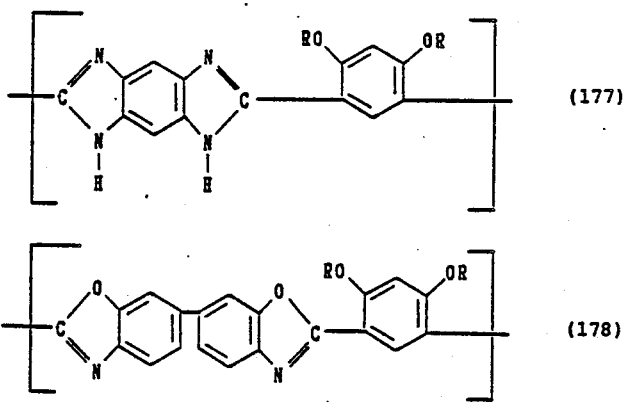

(177)

(178)

There are no particular limitations on the treatment to be employed for the ring closure. In the case of imidization of a sample represented by (91), the following reaction takes place when heated at a temperature of around 200° to 400° C.

High Polymer of (91) $\xrightarrow{\Delta}$

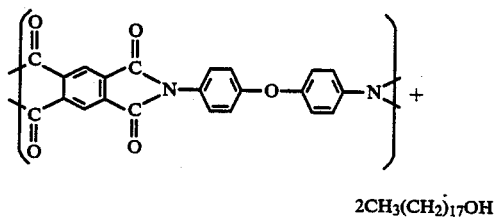

$2CH_3(CH_2)_{17}OH$

In the above case, a thin polyimide film having an excellent heat resistance can be obtained since the groups introduced for the purpose of imparting hydrophobicity to the high polymer can be eliminated as an alcohol and can be readily removed at a temperature of around 200° to 400° C., if desired, in a gas stream or under a reduced pressure.

It is of course possible to use, with or without heating, a chemical curing agent, such as acetic anhydride, pyridine and quinoline, which are usually used for forming imide.

The film formed by depositing or laminating the high polymer of this invention on the surface of a substrate in accordance with Langmuir-Blodgett process and then, where desired, subjecting it to a ring-closing treatment, has not only good heat resistance, physical properties and chemical resistance, but also excellent electrical insulating properties. In addition, the thickness of the film can be less than 10,000 Å. If desired, it can be formed into a film having a thickness as thin as 5,000 Å, 2,000 Å or, if desired, 10 to 1,000 Å.

Even when its thickness is not more than 1,000 Å, or as thin as 50 to 100 Å, the film could have good physical properties, in particular, a dielectric breakdown voltage of not lower than $1 \times 10^6$ V/cm. In particular, in the case where it has a thickness from about 50 Å to about several hundred Å, there can be expected unique effects, such as a tunneling effects. Many interesting applications can be made possible by utilizing such an effect.

Explanations will be given hereinbelow on the uses of the thin film.

The thin film of this invention can be used in a variety of fields, including such fields as electronics, energy conversion and separation of substances, by making use of its characteristics that it has good heat resistance, chemical resistance and physical properties and is in the form of an extremely thin film.

In the field of electronics, electrical conductivity, photoconductivity, optical characteristics, electrical insulating properties, thermal characteristics and chemical reactivity of the film can be utilized. Among such applications are included the following electric and electronic devices.

The first type of important electric and electronic devices that may contain the thin film of this invention is a device having a metal/insulator/semiconductor structure (hereinafter referred to as MIS structure). This is a basic structure for planar electronic devices and integrated circuits.

In FIGS. 1 to 7 are shown schematic views of typical devices having the MIS structure. In the device shown in FIG. 1, a thin insulating film according to this invention is formed on a semiconductor, and a metal electrode is formed on the film. There can be obtained various transducers, such as photoelectric transducer devices (e.g., solar cells), light-emitting, light-receiving and light-detecting devices (e.g., LED, EL and photodiodes), gas sensors and temperature sensing devices, by utilizing semiconductors of Group IV in Periodic Table (e.g., Si and Ge), Group III-V (e.g., GaAs and GaP) or Group II-VI (e.g., CdTe, CdS, ZnS, ZnSe and CdHgTe). The semiconductors used in this invention can be in the form of single crystal, polycrystalline or amorphous.

Figure 2:
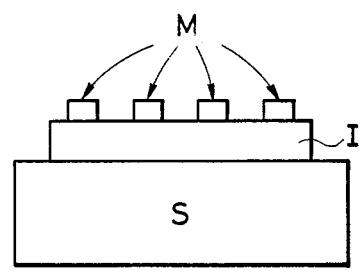

FIG. 2 is a schematic view showing a device similar to the one shown in FIG. 1. This device is provided with electrodes so as to make it possible to form more than one element on a substrate. A device having such a structure has interesting applications as a charge-transfer device, such as a charge coupled device.

Figure 3:
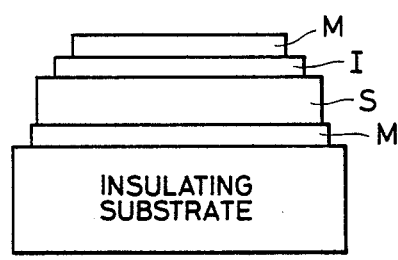

In FIG. 3 is shown a device in which a semiconductor layer (in many cases, a thin semiconductor layer) is formed on an insulating substrate with an electrode (which may be transparent and can be a patterned electrode), and a thin film according to this invention and an electrode are formed thereon.

Figure 4:
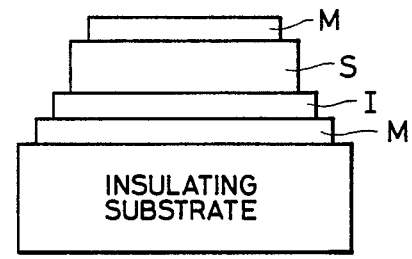

In FIG. 4 is shown a device similar to the one shown in FIG. 3, except that the thin film is positioned between the semiconductor layer and the electrode formed on the substrate. The semiconductor layer can be formed by any of the conventional methods, including Molecular beam epitaxy (MBE), Metal organic chemical vapor deposition (MOCVD), Atomic layer epitaxy (ALE), vacuum evaporation, sputtering, spray pyrolysis and coating methods.

As the semiconductor, there can be used those mentioned in the explanation of FIGS. 1 and 2. The device of this type has the same applications as those shown by FIGS. 1 and 2.

Upon production of a device having a structure shown in FIG. 4, the temperature for forming the semiconductor layer should not exceed the thermal resistance of the thin film according to this invention since the layer is formed directly on the film. However, thin films of this invention subjected to a ring-closing treatment can bear the temperature for forming an amorphous silicone layer. With the recent development in the technology of forming semiconductors at low temperatures, it will become possible to form thereon other semiconductor layers.

Most important MIS type devices are those having so-called FET (field effect transistor) structure, in which channel currents are controlled by gate electrodes. Typical structures of such devices are shown in FIGS. 5 and 6.

Figure 5:
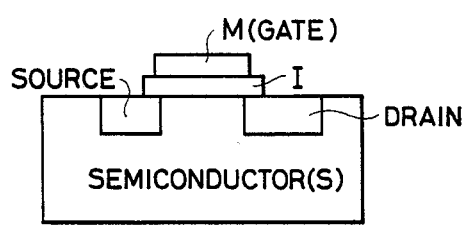
Figure 6:
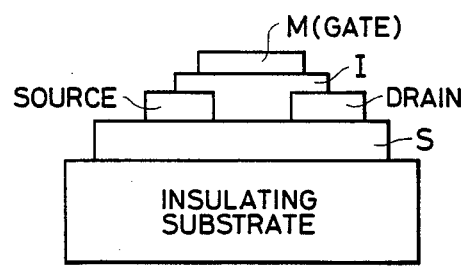

In the device shown in FIG. 5 is used a semiconductor substrate, whereas a semiconductor layer (in many cases, a thin layer of semiconductor) is used in the device shown in FIG. 6.

Various devices can be prepared from an MISFET, which is a basic type of semiconductor devices. For example, a thin film transistor for driving liquid crystal displays can be prepared by forming MISFETs on a substrate with a large area. It is also possible to constitute integrated circuit by producing MISFETs at a high density.

In addition, there are other interesting applications. When the gate electrode is dismounted from the devices shown in FIG. 5 or 6, and an insulating layer and/or a layer sensitive to ions, gases, or the like is provided thereto, they can be used for various purposes. For example, there can be obtained an ion sensitive FET (ISFET), a gas sensitive FET (Chem. FET), an immuno FET (IMFET) or an enzyme FET (ENFET).

The functions of such devices are based on electric field effects arising from the action of ions or various active substances on the surface of the gate insulating layer. The thin film of this invention can be advantageous than hitherto known inorganic layers since it can be further modified by various organic substances. In particular, in the case of a thin film according to this invention which contains long chain alkyl groups, there can be utilized the interaction between the hydrophobic alkyl groups and hydrophobic areas of proteins.

Figure 7:
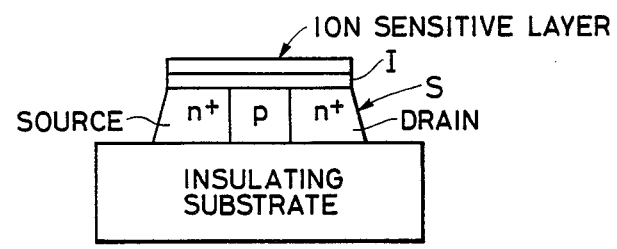

In FIG. 7 is shown an example of ISFET, wherein a semiconductor layer is formed on a quartz substrate on which are formed an insulating film and an ion sensitive film. A thin film according to this invention can be used as an insulating film in the ISFET.

In a preferred embodiment of this invention, a compound semiconductor of Groups III-IV, II-V, etc. in Periodic Table, which usually is not capable of forming good insulating film by means of oxidation, is used as a semiconductor for constituting a device having an MIS structure. All the GaAs FETs so far put into practical use are in the form of metal-semiconductor FET (MESFET) because of the difficulty described above. However, an MIS device having according to this invention makes it possible to attain improved properties. For example, an MIS type integrated circuit utilizing GaAs could be drived at a low voltage. An integrated circuit such as (HEMT) capable of being operated at a high speed and utilizing the high carrier mobility of GaAs semiconductors can be produced in a very simple manner.

Important electrical and electronic devices of a second type that may contain the thin film of this invention are those having a metal/insulator/metal structure (hereinafter referred to as MIM structure).

Figure 8:
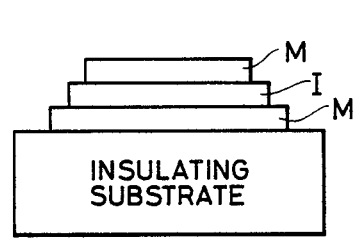
FIGS. 8 through 10 are those of MIM structure.
Figure 9:
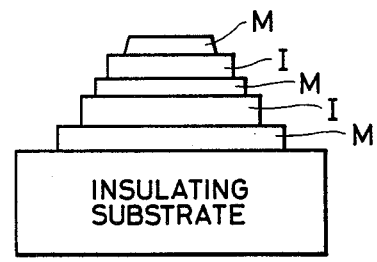
Figure 10:
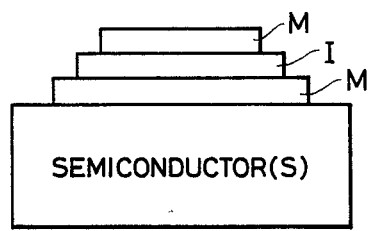

In FIGS. 8 to 10 are shown schematic views of MIM type devices, where a metal layer, an insulating layer and a metal layer are formed, in this order, on a substrate made of a semiconductor or an insulating material.

FIG. 8 shows a structure of a capacitor, which can be used as a moisture sensor by determining the change in its capacitance which may be resulted from a change in humidity. It is also possible to produce a transistor having an MIM structure.

A thermoelectronic transistor can be constituted as shown in FIG. 9.

The device shown in FIG. 10, in which a capacitor is formed on a semiconductor substrate or a semiconductor device, can be used as a capacitor for the memory cells of VSLIs.

It is also possible to produce a device which has a structure of the type shown in FIG. 10, which is so designed that thermoelectrons can be injected into this semiconductor. A Jesephson junction (JJ) device can also be produced by employing a superconductor, such as Nb, in place of the metal.

Figure 11:
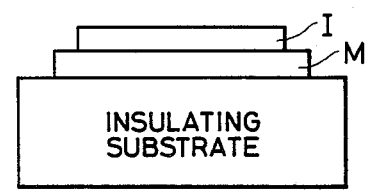
FIGS. 11 through 13 are those of IM structure.

Electrical and electronic devices of a third type that may contain the thin film of this invention are those having an insulator/metal structure (IM structure), which is schematically shown in FIG. 11. Such devices have a simple structure and can be obtained by forming a thin film according to this invention on a metal substrate.

One application of such device is an oriented liquid crystal film, which can be obtained by forming a thin film according to this invention on a patterned electrode, usually a patterned transparent electrode, such as ITO.

Figure 12:
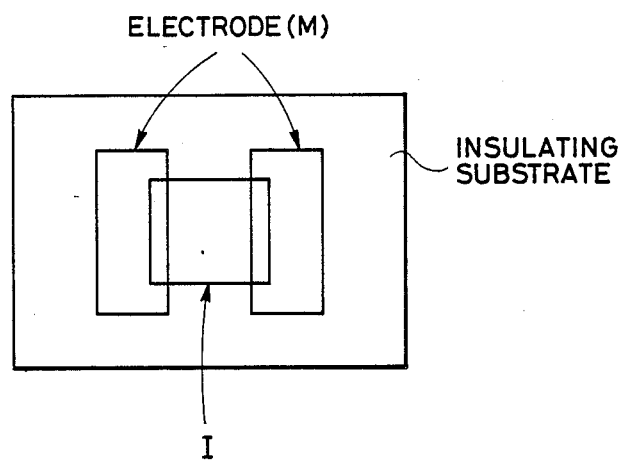
Figure 13:
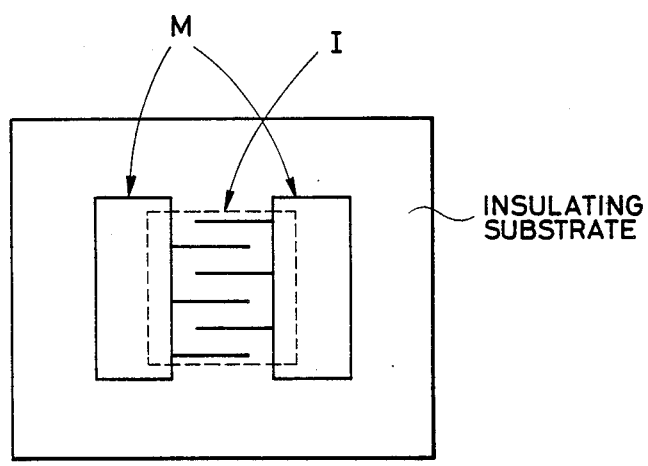

Other examples of their application are shown in FIGS. 12 and 13, where a thin film according to this invention is provided on two independent electrodes. This kind of device can be used as a gas sensor, moisture sensor, or the like.

Other examples of electric and electronic devices than those disclosed herein that may contain the thin film of this invention are described in the articles described hereinbefore, in particular, in the review by P. S. Vincent and G. G. Roberts, "Thin Solid Film", 68, pp. 135-171 (1980).

With regard to examples of other semiconductor devices and compound semiconductor devices, reference can be made to such books as E. S. Yang, "Fundamentals of Semiconductor Devices", McGraw-Hill Book Co. (1978), and Imai et al., "Kagobutsu Handotai"(Compound Semiconductor) Devices [I] and [II], "Kogyo Chosakai"(1984).

Explanations will be made hereinbelow on applications other than electric and electronic devices.

In recent years, optical recording systems utilizing the formation of pits or a change in phase of a thin film containing dyes or a thin film of an inorganic substance, such as $TeO_x$, has been widely used. The thin film of this invention is sensitive to heat and light. In particular, its thickness is changed or pits are formed when exposed to laser beams of the kind usually used in optical recording systems. The refractive index of the film can also be changed by heat or light. Optical recording systems can therefore be obtained by utilizing such phenomena.

As clearly described hereinabove, the thin film of this invention is sensitive to heat and, hence, a patterned film can be obtained by making use of this reactivity. To be more specific, when a pattern of areas containing thermally closed rings is formed in a thin film according to this invention and the remaining areas not containing thermally closed rings are dissolved off by use of a solvent, there can be obtained a pattern of the thin film. Such a pattern of thin film can be utilized as a resist since it has not only good heat resistance and mechanical strength but also excellent chemical resistance. In an embodiment of this invention, the thin film can be rendered reactive to light through introduction of alkyl chains containing double or triple bonds.

In addition, the thin film can also be used as a cladding element or as an element for optical circuits.

An optical circuit can be formed by making a patterned film, e.g., in accordance with the above-described method for forming a resist. In case of the thin film of this invention, the thickness can be controlled and the refractive index can be changed by changing the kind of compounds used for its preparation. This is an important factor for an element to be used for optical circuits.

The film can be used preferably as a protective coating material in every field. Various functions can be realized according to the technique for forming mixed and layered films by using the high polymer of this invention in place of conventional LB materials. Such a mixed or layered film has a variety of uses. For example, a photoelectric converter or a biosensor can be prepared from a film incorporated with a dye or an enzyme.

It is also possible to use the film in the field of material separation.

It has been tried in recent years to prepare a film having fine pores on the surface of a porous film substrate in order to use it for the separation of materials.

A thin film having fine pores can be prepared by producing a thin film in accordance with this invention under the existence of conventional LB materials and then subjecting it to a ring-closing treatment. For example, a polyimide thin film having fine pores can be formed on a porous polyimide film, by preparing a thin film from a polymeric compound having a polyimide precursor structure in the presence of an excess of stearyl alcohol on the surface of a porous polyimide film, and then subjecting it to a ring-closing treatment.

The process for producing the amphiphilic high polymer of this invention and the process for forming the film of this invention will be explained hereinbelow by way of examples.

EXAMPLE 1

Preparation of N,N'-distearyl-p-phenylenediamine

Into a four-necked 200 ml flask equipped with a mechanical stirrer and a reflux condenser were charged 15.6 g (0.140 mol) of 97% p-phenylenediamine, 15.5 g (0.466 mol) of stearyl bromide and 1.96 g (0.466 mol) of powdered sodium hydroxide, and the resulting mixture was heated with stirring for ca. 3.5 hours at 140° to 150° C. under a stream of nitrogen gas.

Figure 14:
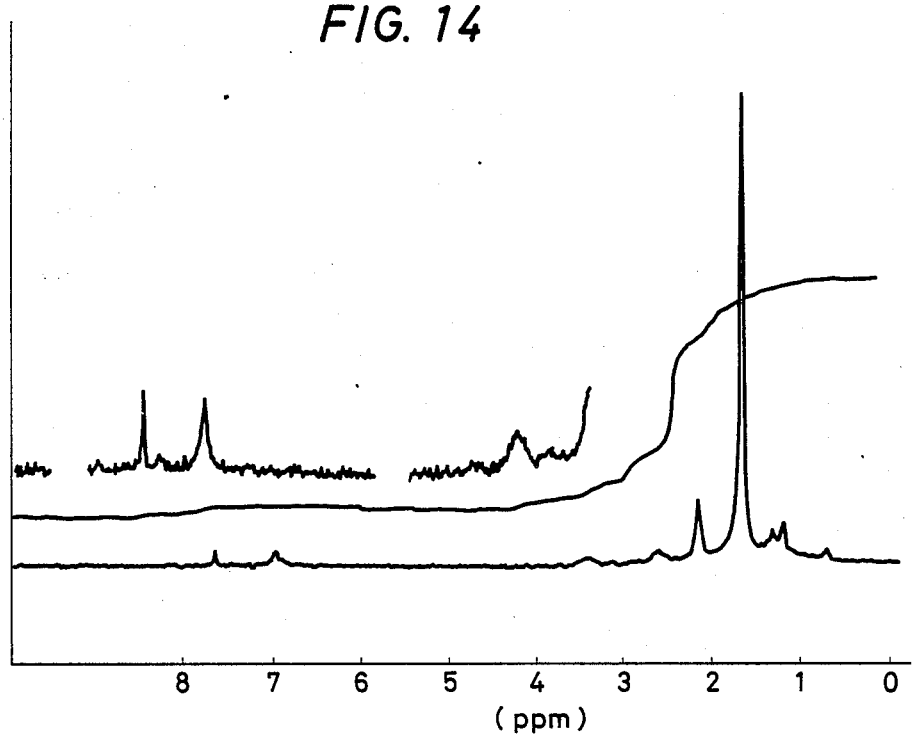
FIGS. 14 and 15 show respectively the $^1$H-NMR spectrum and the IR spectrum of N,N'-distearyl-p-phenylenediamine.
Figure 15:
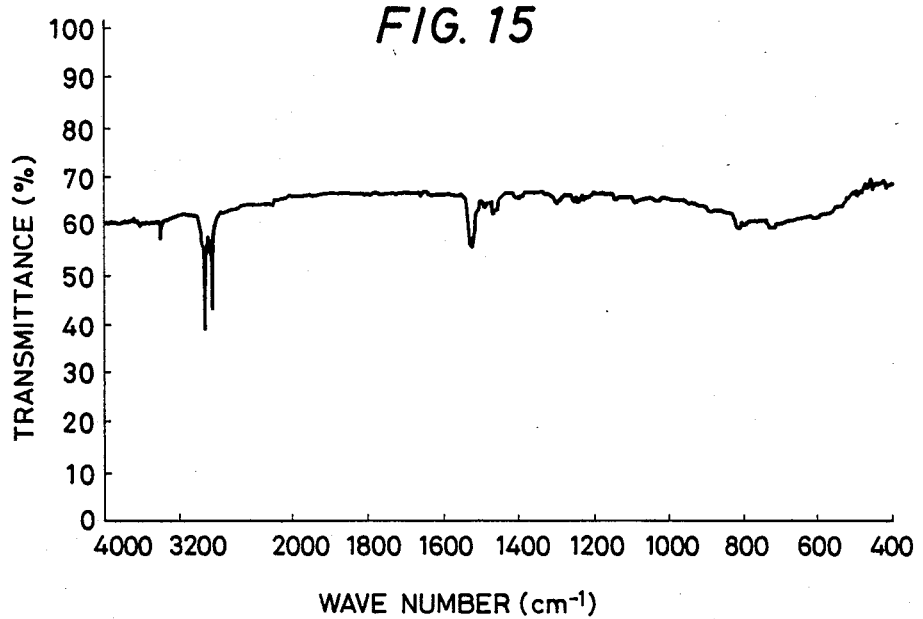

Into the reaction mixture was poured ca. 50 ml of water, and the resulting mixture was cooled to room temperature to give dark purple precipitate. The precipitate formed was filtered, and washed with hot ethanol and then with methylene chloride to give 5.77 g of pink powders of desired N,N'-distearyl-p-phenylenediamine. Yield: 40%. The product was recrystallized from chloroform to give pink plates crystal. The structure of the product was determined by $^1$H-NMR (see FIG. 14), IR spectrum (see FIG. 15), melting point and elementary analysis.

Melting point: 102° to 103° C.,

Anal. calcd for $C_{42}H_{30}N_2$: C, 82.28%, H, 13.15%, N, 4.5%, Found: C, 81.93%; H, 13.22%, N, 4.63%.

SYNTHESIS OF POLYAMIDE

In 140 ml of dry hexamethylphosphoramide was dissolved 1.23 g (2 mmol) of N,N'-distearyl-p-phenylenediamine. To this was added dropwise 0.406 g of isophthalic acid chloride dissolved in dry hexamethylphosphoramide at ca. 60° C., and the resulting mixture was allowed to react for additional 2 hours. The reaction product was poured into redistilled water, and the precipitate formed was filtered and washed with water and with ethanol to give grayish blue powders of the desired polyamide.

The product was subjected to $^1$H-NMR, IR spectrometry, thermogravimetric analysis (TGA) and differential thermal analysis (DTA) and the following results were obtained.

$^1$H-NMR ANALYSIS

Figure 16:
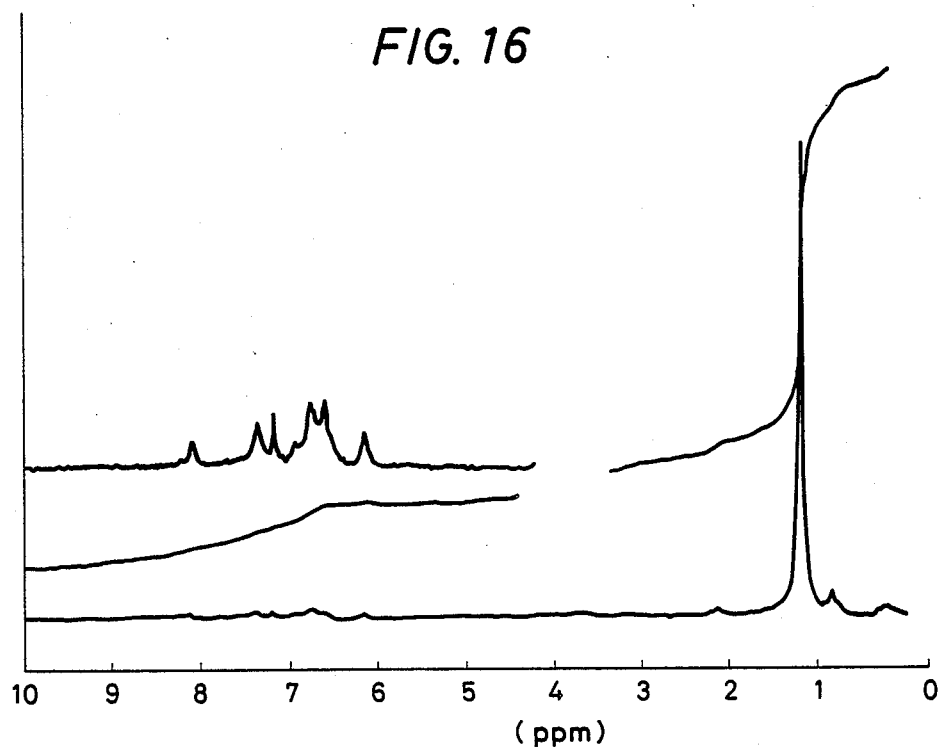
FIGS. 16 and 17 show respectively the $^1$H-NMR spectrum and the IR spectrum of polyamide synthesized in Example 1.

A chart shown in FIG. 16 was obtained by proton NMR analysis.

$\delta = 1.25$ ppm 74H ($2 \times C_{13}H_{37}$)

$\delta = 6-8.25$ ppm 8H (aromatic).

IR SPECTROMETRY

Figure 17:
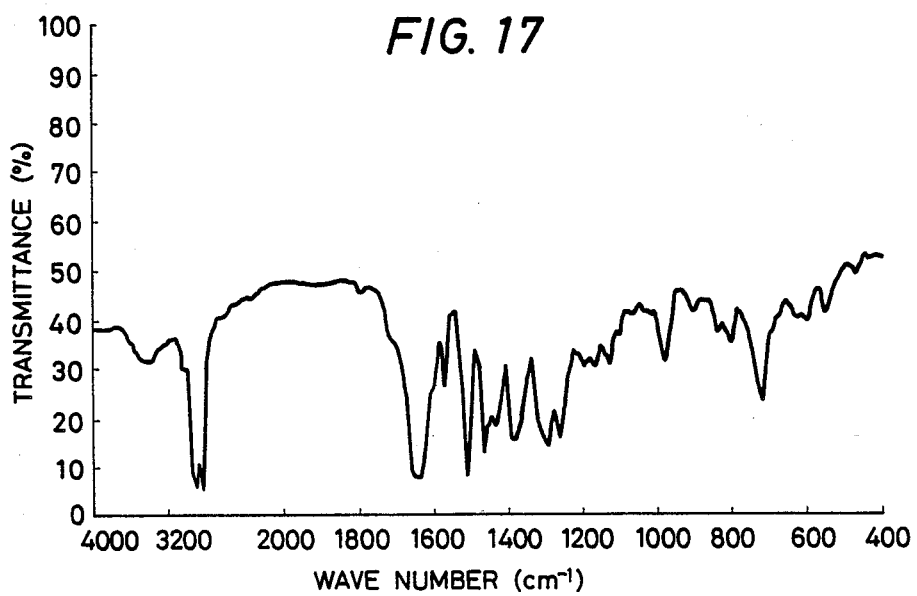

By the KBr disk method was obtained the IR chart shown in FIG. 17. In the chart are observed absorption peaks characteristic of esters, amides I and III, alkyl chains and ethers. The absorption band of amide II was not observed since the alkyl chains are present on nitrogen atoms.

THERMAL ANALYSIS (TGA-DTA)

Figure 18:
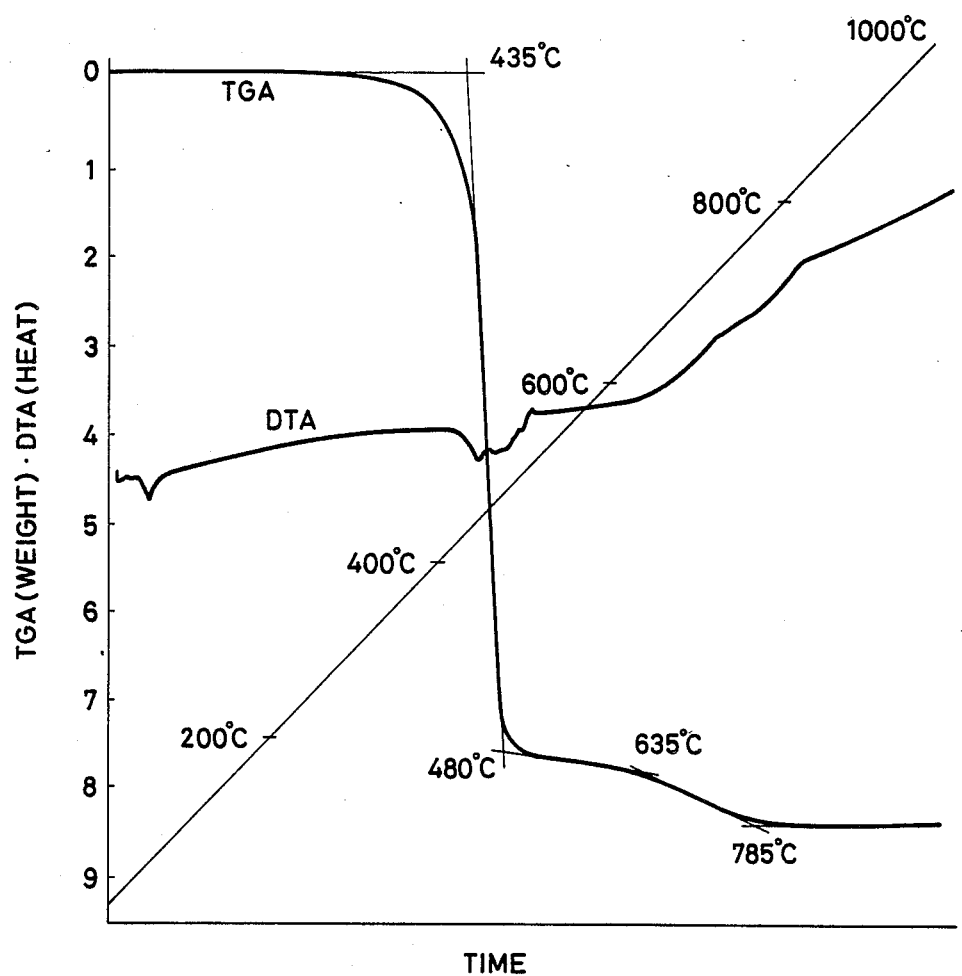
FIG. 18 shows the result of the thermal analysis (TGA-DTA) of polyamide synthesized in Example 1.

The thermal properties of the product were measured in an nitrogen stream (30 ml/min) by using an RTG-DTA of type H manufactured by Rigaku Denki Co., Ltd. under the following conditions: full scale of TGA, 10 mg; full scale of DTA, 100 μv; maximum temperature, 1,000° C.; and rate of heating, 10° C./min, and the results shown in FIG. 18 were obtained. In the TGA were observed inflection points at 435°, 480°, 635° and 785° C. It seems that the polyimide is decomposed at a temperature between 435° and 480° C. since a weight reduction of 92.6% is observed at the above temperature range. In the DTA is observed an endothermic peak corresponding to the above decomposition.

EXAMPLE 2

In order to evaluate the basic characteristics an a Langmuir-Blodgett film of the polyamide, its surface pressure-area curve ($\pi$-A curve) was drawn by the conventional method under the following conditions:
Equipment: Joice-Loeble trough
Solvent: Chloroform
Density: $0.795 \times 10^{-3}$ mol/l
Subphase: Redistilled water (containing no $Cd^{++}$)
Water temperature: 18°-19° C.

Figure 19:
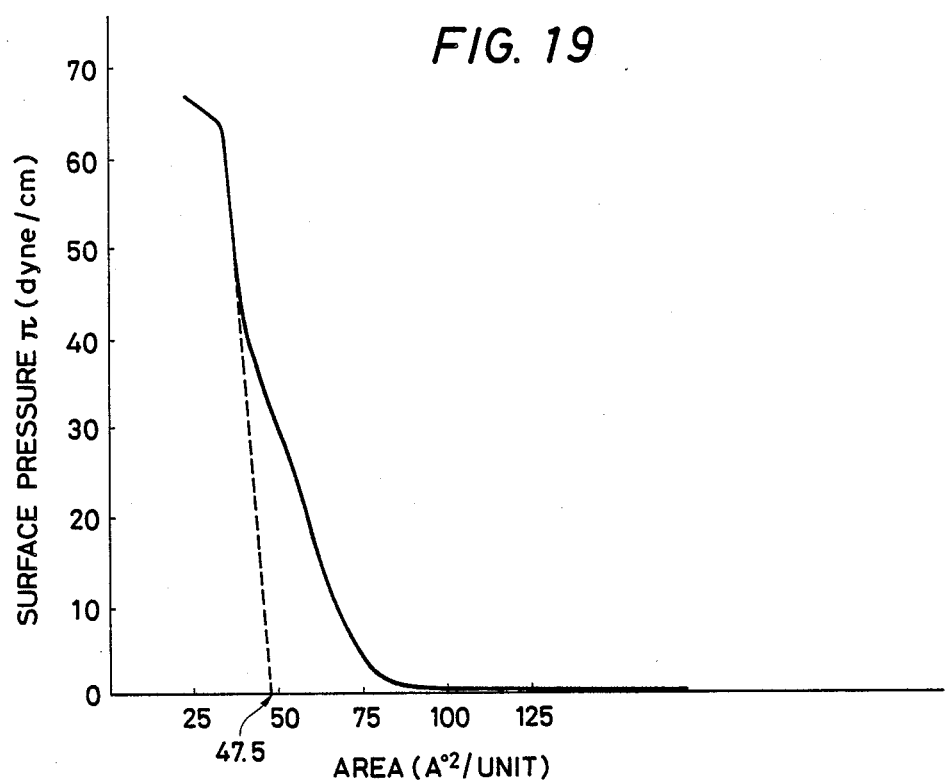
FIG. 19 shows the surface pressure-area curve of polyamide in Example 1.

In FIG. 19 is shown $\pi$-A curve of the polyamide. The surface pressure rises gradually up to 45 dyne/cm. This seems to be a region of liquid film. The curve shows a steep rise at surface pressures above 45 dyne/cm, which indicates the formation of a solid film. The film collapses at 64 dyne/cm. The area per recurring unit at a surface pressure 0 (i.e., limiting area) was about 47.5 Å/unit.

The polyamide was spread on the surface of water, and the film formed was transferred and deposited onto the surface of an aluminium-evaporated glass substrate in accordance with Langmuir-Blodgett process (vertical dipping method), while maintaining the surface pressure at 29 dyne/cm. A reduction in the area of the film was observed during both raising and dipping. The transfer ratio was 1. It is presumed that an ideal Y type film was formed.

EXAMPLES 3-4

In a mixture of tetrahydrofuran and water was dissolved 1.23 g (2 mmol) of N,N'-distearyl-p-phenylenediamine. To this was dropped with thorough stirring a solution of 0.406 g of isophthalic acid chloride in benzene at room temperature to synthesize a polyamide by surface polycondensation. Hydrogen chloride was trapped by sodium carbonate.

A polyamide having the formula set forth below was prepared in the same manner as above, by using terephthalic acid chloride in place of isophthalic acid chloride.

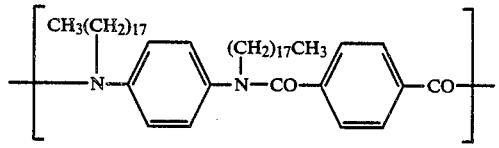

The products were subjected to $^1$H-NMR, IR spectrometry and thermal analysis (TGA-DTA). Results obtained were almost the same as in the case of the polyamide in Example 1.

EXAMPLES 5-6

The polyamides synthesized in Examples 3 and 4 had the same basic characteristics as those of the polyamide obtained in Example 1. The polyamides could be deposited on an aluminium evaporated glass substrate by the vertical dipping method and gave a Y-type film.

EXAMPLE 7

In a flask was reacted 1.92 g (0.01 mol) of trimellitic acid anhydride with 2.70 g (0.01 mol) of stearyl alcohol at 100° C. for 3 hours in a stream of dry nitrogen.

The reaction product was dissolved in 40 ml of hexamethylphophoramide and coated to 0° to 5° C. Thereafter, 2.38 g of thionyl chloride was added dropwise to the reaction mixture at ca. 5° C., and the resulting mixture was maintained at ca. 5° C. for 1 hour to complete the reaction.

Thereafter, a solution of 2 g (0.01 mol) of diaminodiphenyl ether in 50 ml of dimethylacetamide was added dropwise to the reaction mixture at 0° to 5° C., and the reaction was allowed to continue for about 1 hour after the completion of the dropping. The reaction mixture was then poured into 600 ml of ethanol to precipitate the reaction product. The precipitate formed was filtered and dried at 40° C. under reduced pressure to give ca. 6 g of high polymer containing the recurring unit represented by formula (82).

The product was analysed by IR spectrometry, thermogravimetric analysis (TGA) and differential thermal analysis (DTA), and its molecular weight was measured by the GPC. The following results were obtained.

IR SPECTROMETRY

Figure 20:
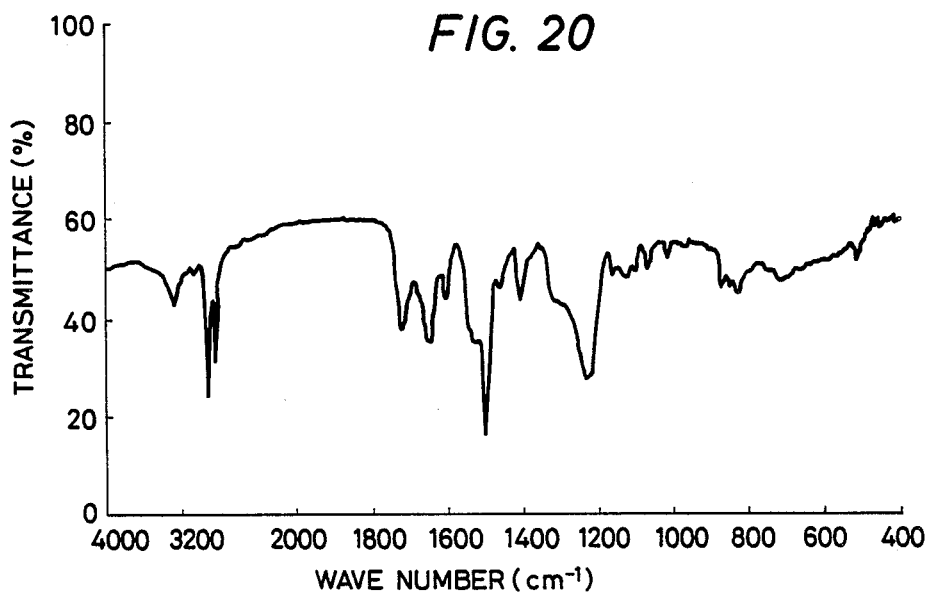
FIGS. 20 and 24 show respectively the IR spectra of the polyamides synthesized in Examples 7 and 8.

By the KBr disc method was obtained the IR chart shown in FIG. 20, which shows absorption peaks characteristic of esters, amides I, II and III, alkyl chains and ethers.

THERMAL ANALYSIS (TGA-DTA)

Figure 21:
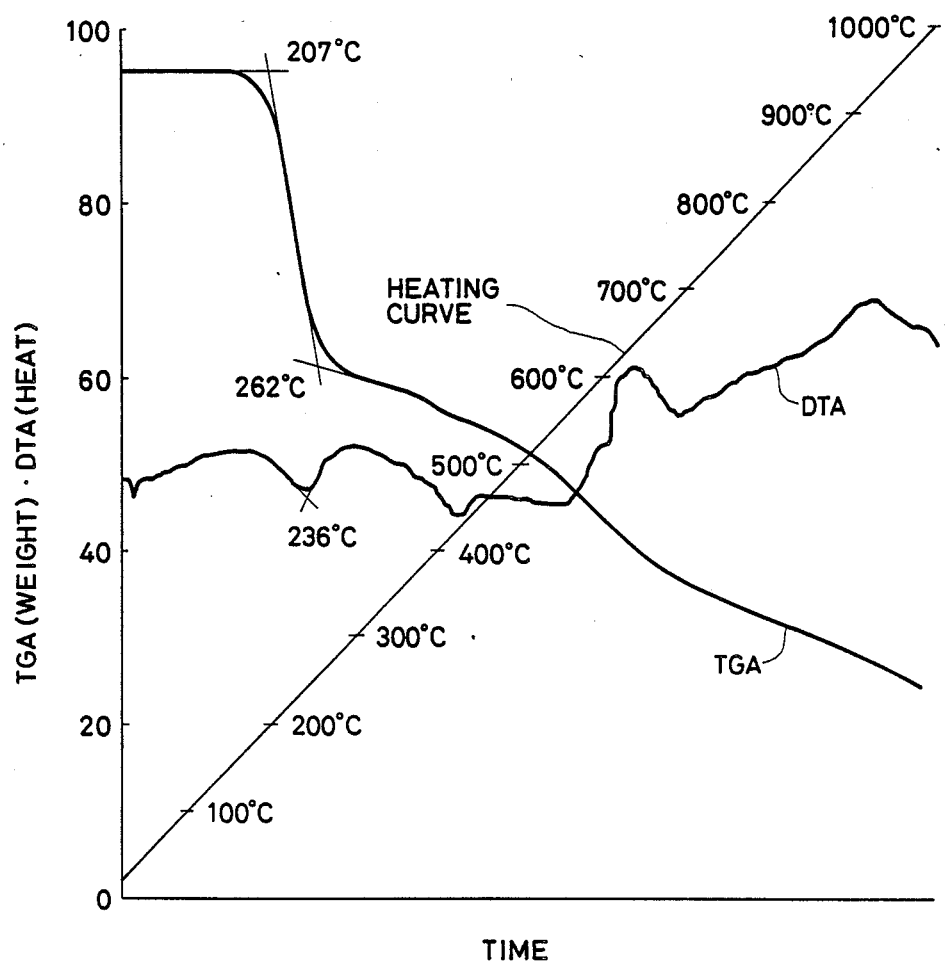
FIGS. 21 and 25 show the results of the thermogravimetric analysis (TGA-DTA).

The thermal properties of the product were measured in an nitrogen stream (30 ml/min) by using an RTG-DTA of type H manufactured by Rigaku Densi Co., Ltd., under the following conditions: scale of TGA, 10 mg; full scale of DTA, 100V; maximum temperature, 1,000° C.; and rate of heating, 10° C./min. The results are shown in FIG. 21. In the TGA curve are observed obvious inflection points at 207° C. and 262° C. It seems that decomposition takes place at temperatures above 400° C. although distinct decomposition points are not observed.

Figure 22:
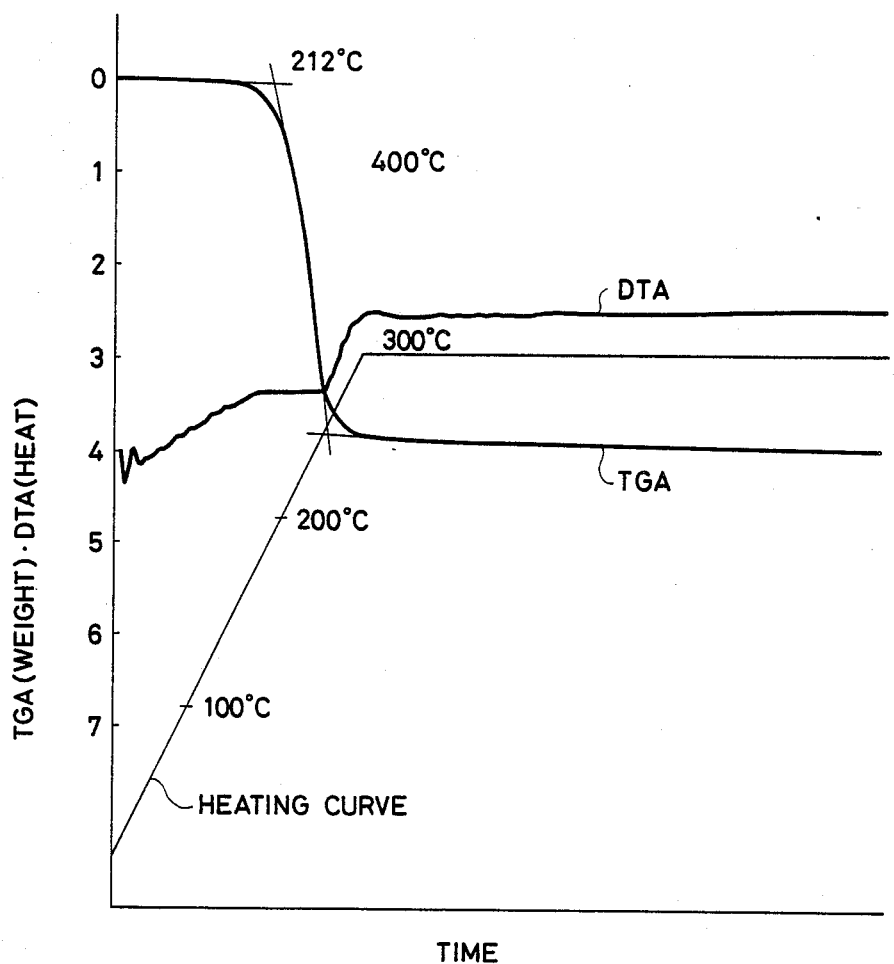
FIG. 22 shows the result of the thermogravimetric analysis obtained when the polymer was heated to 300° C. at a rate of 10° C./min and maintained at that temperature for one hour.
Figure 23:
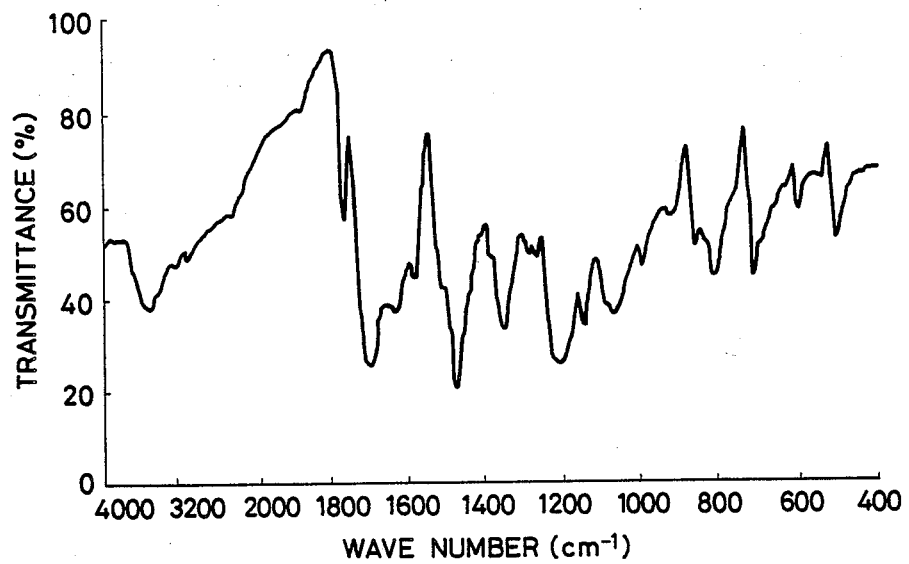
FIG. 23 shows the IR spectrum obtained after heat treatment at 300° C. for one hour.
Figure 24:
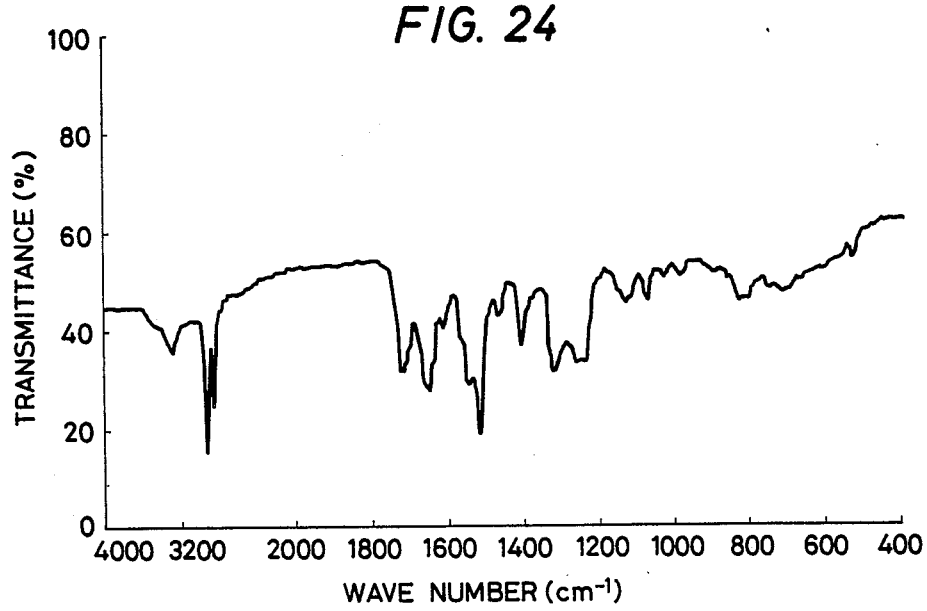
Figure 25:
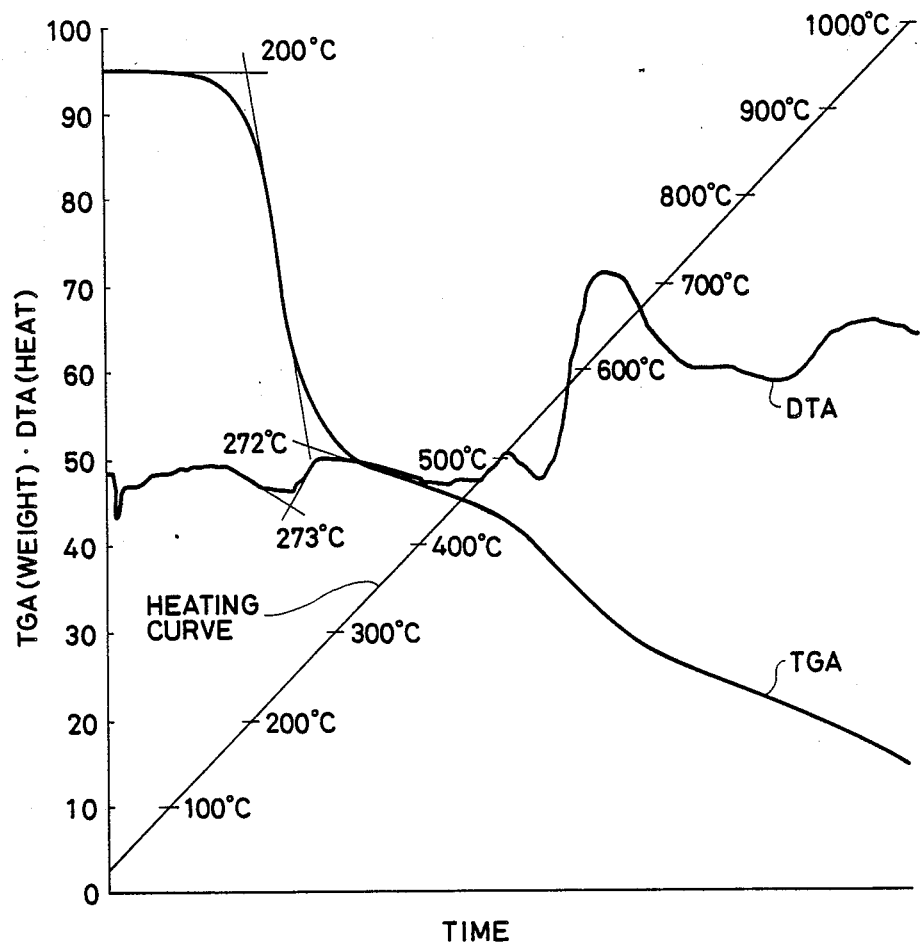

On the other hand, FIG. 22 shows TGA and DTA curves obtained by heating the sample up to 300° C. and then maintaining it at the same temperature for 1 hour. It would be seen that the decrease of the weight of the sample ceased when it was heated at 300° C. for 1 hour, thereby giving a total weight reduction of 42.8%, which agrees with the theoretical reduction rate of 43.1% calculated with the assumption that stearyl alcohol is eliminated from the high polymer prepared in this invention. This indicates that the imidation had been completed and polyamideimides were formed. This is supported by the IR spectrum of the product taken after the treatment (see FIG. 23).

MEASUREMENT OF MOLECULAR WEIGHT BY GPC

A number average molecular weight of ca. 20,000 was obtained by comparing the result of GPC measured in a mixture of N,N-dimethylacetamide and chloroform with that of the polystyrene standard sample.

EXAMPLE 8

A high polymer having recurring units represented by (83) was synthesized in the same manner as in Example 7, except that p-phenylenediamine was used instead of diaminodiphenyl ether. The results of IR spectrum and thermal analysis are shown in 24 and 25. The product obtained showed the same characteristics as those of the product obtained in Example 7.

EXAMPLE 9

In a 5:5 mixture (by volume) of distilled chloroform and distilled dimethylacetamide were dissolved 2.389 milliunits, each, of products obtained in Example 7 or 8 to prepare 25 ml, each, of spreading solutions for LB films.

Figure 26:
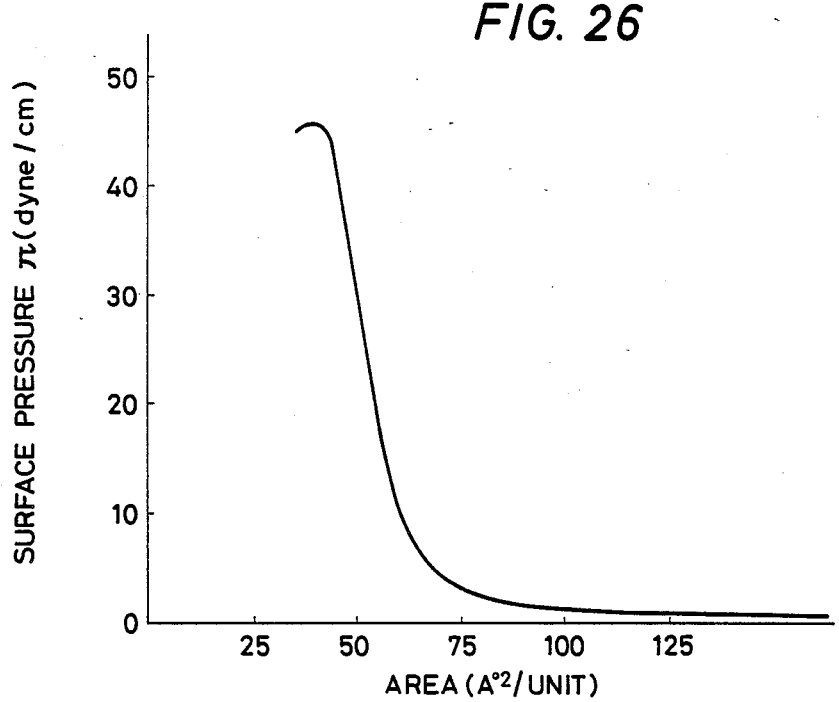
FIGS. 26 and 27 show respectively the surface pressure-area curves of the high polymers synthesized in Examples 7 and 8.
Figure 27:
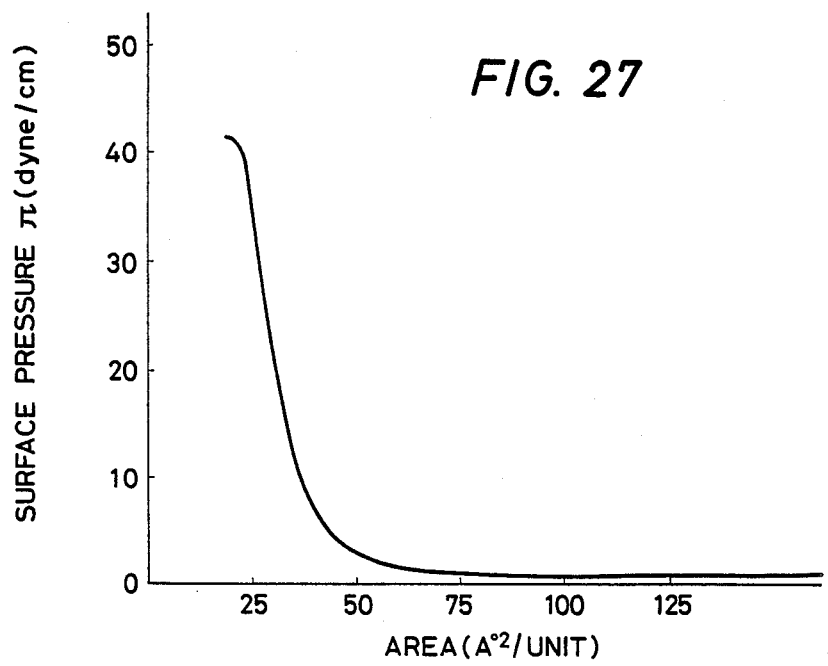

The relationship between surface pressure and area per recurring unit was measured on the surface of redistilled water at 20° C., and the results shown in FIGS. 26 and 27 were obtained. The surface pressure rose steeply at around 75 Å$^2$/unit or 50 Å$^2$/unit, respectively, and good condensed films were formed. Their limiting areas were 60 Å$^2$/unit or 38 Å$^2$/unit, respectively, and their collapse pressures were higher than 40 dyne/cm, which are extremely high as a polymeric LB film.

The films formed on the surface of water were transferred onto glass or CaF$_2$ plates in accordance with Langmuir-Blodgett technique at a dipping speed of 10 mm/min, while maintaining the surface pressure of the film at 25 dyne/cm. 25 or 24 layers had been deposited on the plates. The FT-IR of the multilayer films formed on the CaF$_2$ plate was identical with that of the product obtained in Example 7. It was also confirmed by means of its area-time curve that the film was of Y-type.

In X-ray diffraction analysis, no peaks were observed since the films were thin and did not contain Cd$^{++}$ or the like when the film was formed according to the Example 7.

EXAMPLE 10

In a flask was reacted with 2.18 g (0.01 mol) of pyromellitic acid anhydride with 5.40 g (0.02 mol) of stearyl alcohol at ca. 100° C. in for 3 hours a stream of dry nitrogen.

The thus obtained product was dissolved in 40 ml of hexamethylphosphoramide and cooled to 0° to 5° C. Then 2.38 g of thionyl chloride was added dropwise to the reaction mixture at ca. 5° C., and the resulting mixture was maintained at the same temperature for 1 hour to allow the reaction to complete.

Thereafter, a solution of 2 g (0.01 mol) of diaminodiphenyl ether in 50 ml of dimethylacetamide was added dropwise to the reaction mixture, and the reaction was allowed to continue for ca. 1 hour after the completion of the dropping. The reaction mixture was then poured into 600 ml of distilled water to precipitate the product. The precipitate formed was filtered and dried at 40° C. to give ca. 9 g of light yellow powders.

The thus obtained product was analyzed by IR spectrometry, thermogravimetric analysis (TGA) and differential thermal analysis (DTA), and its molecular weight was measured by the GPC method. The following results were obtained.

IR SPECTROMETRY

Figure 28:
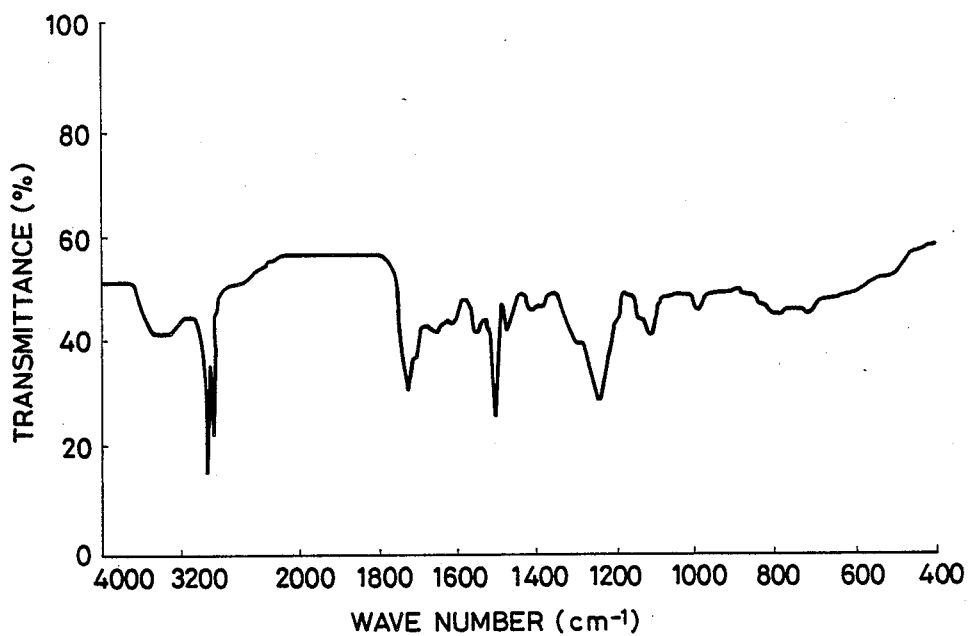
FIG. 28 shows the IR spectrum of the precursor obtained in Example 10.

The IR chart shown in FIG. 28 was obtained by the KBr disc method. Absorption peaks characteristic of esters, amides I, II and III, alkyl chains and ethers are observed in the chart.

THERMAL ANALYSIS (TGA-DTA)

Figure 29:
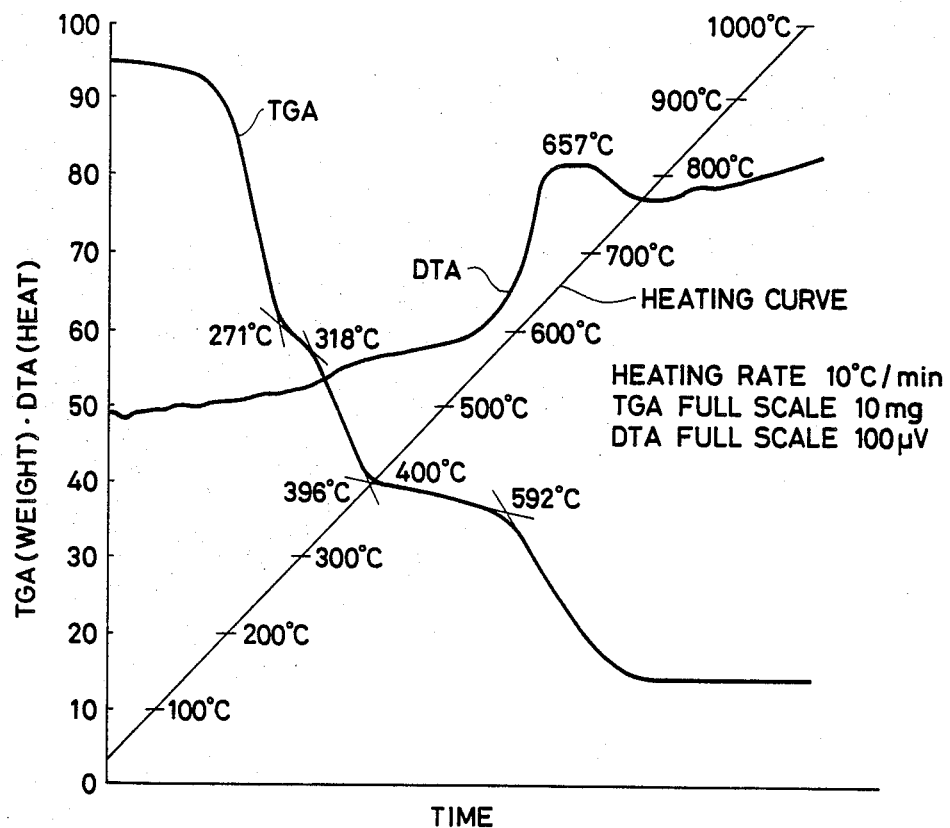
FIG. 29, the result of the thermogravimetric analysis (TGA-DTA) of the precursor obtained in Example 10.

The thermal properties of the product were measured in a nitrogen stream by using an RTG-DTA of type H manufactured by Rigaku Densi Co., Ltd., under the following conditions: TGA full scale, 10 ml; DTA full scale, 100 μV; maximum temperature, 1,000° C.; and rate of heating, 10° C./min, and the results shown in FIG. 29 were obtained. In the TGA are observed inflection points at 271°, 318°, 396° and 592° C. In the DTA is observed a characteristic peak at around 657° C.

Figure 30:
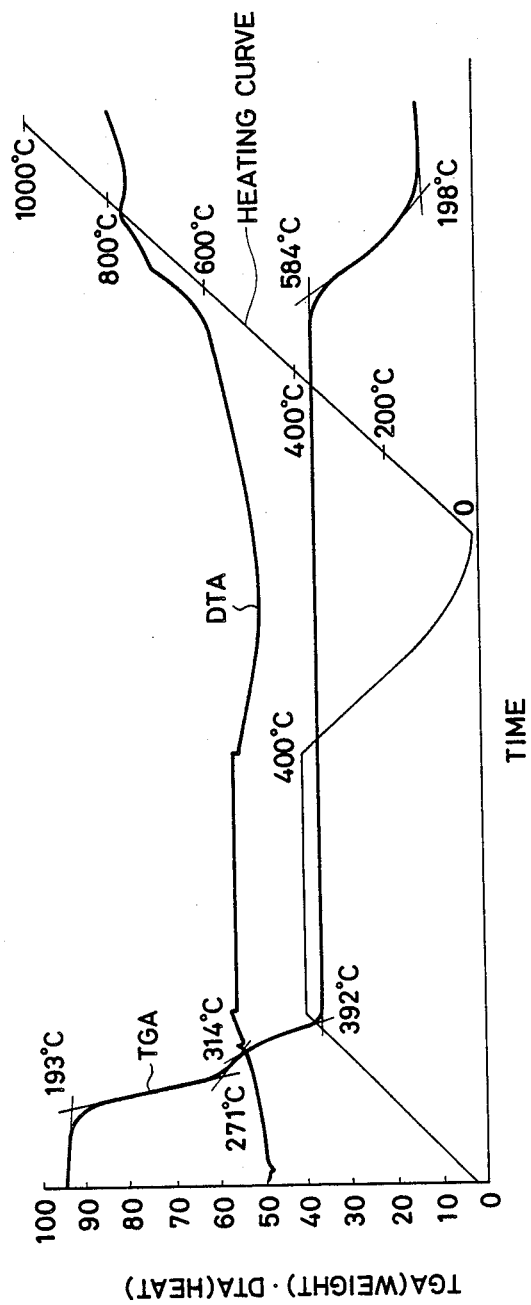
FIG. 30, the result of the thermogravimetric analysis (TGA-DTA) in the case where the precursor obtained in Example 10 was heated from room temperature to 400° C., maintained at that temperature for one hour, and then, after lowering to room temperature, further raised to 1000° C.

On the other hand, FIG. 30 shows TGA and DTA curves obtained at the time when a sample of the precursor was heated up to 400° C. at a heating rate of 10° C./min, maintained at the same temperature for 1 hour, cooled to room temperature, and then heated again up to 1,000° C. at a heating rate of 10° C./min. When maintained at 400° C. for 1 hour, the sample attained at almost constant weight, that is to say, the imidation reaction was completed. When the sample was cooled to room temperature, and then reheated, it showed no change in its weight up to temperature exceeding 450° C., and its thermal decomposition started at 584° C., which is identical with the thermal decomposition temperature of corresponding polyimide films. Accordingly, it can be said that a product having a heat resistance comparable to that of polyimide films could be obtained by completing the imidation.

MEASUREMENT OF MOLECULAR WEIGHT BY GPC

A number average molecular weight of ca. 30,000 (reduced to polystyrene) was obtained by GPC measured in N,N-dimethylformamide.

EXAMPLE 11

In a 8:2 mixture (by volume) of distilled chloroform and distilled dimethylformamide was dissolved 55.1 mg of the product obtained in Example 10 to prepare 25 ml of LB film spreading solution.

Figure 31:
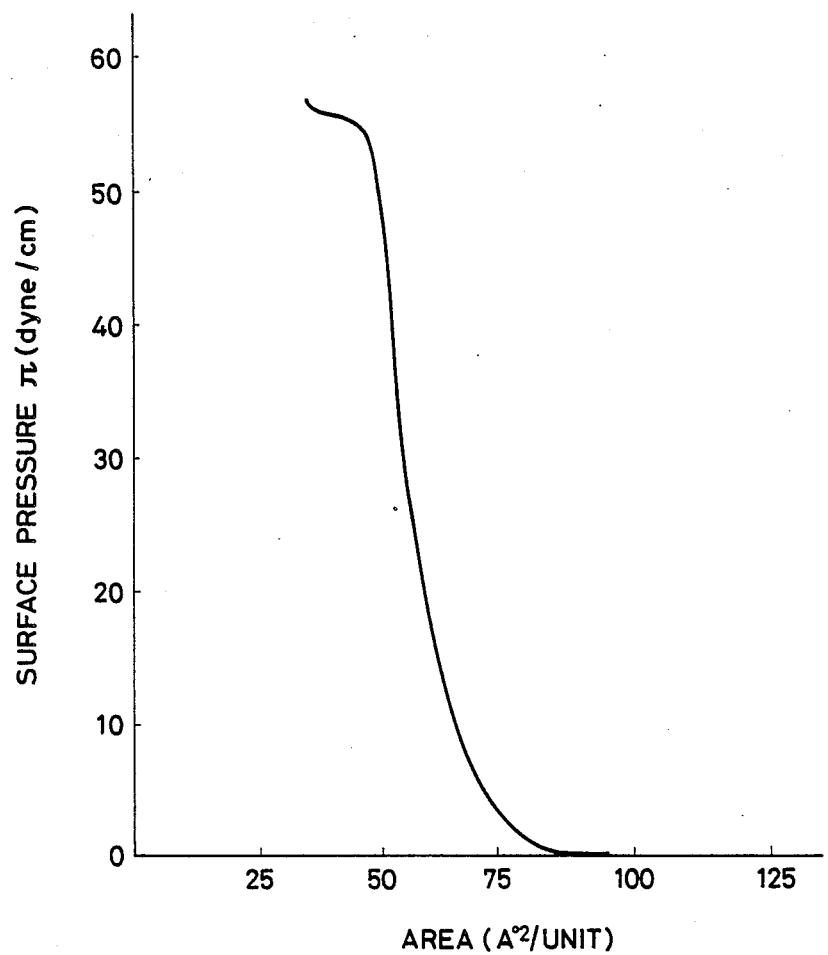
FIG. 31, the relationship between surface pressure and area per recurring unit measured in the case where precursor obtained in Example 10 was spread on the surface of water in accordance with Example 11.

The relationship between surface pressure ($\pi$) and area per recurring unit was measured on the surface of redistilled water, and the results shown in FIG. 31 was obtained. The surface pressure rose steeply at around 75 Å$^2$/unit, and a good condensed films was formed. Its limiting area was 60 Å$^2$/unit, and its collapse pressure was 55 dyne/cm, which is extremely high as a polymeric LB film. When the film was held on the surface of water, maintaining its surface pressure at 25 dyne/cm, its surface area showed no decrease over a period of two hours and the film remained stable.

Figure 32:
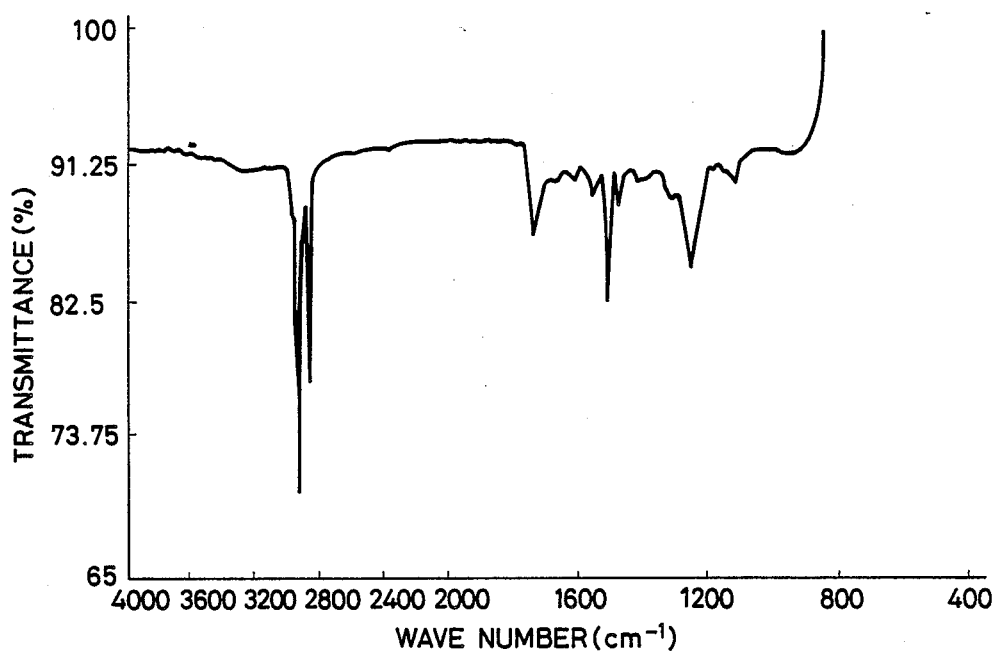
FIG. 32, the FT-IR spectrum of the multilayer films obtained by depositing the above described film spread on the surface of water, on a $CaF_2$ plate by LB technique.

The film was transferred onto a glass plate or a CaF$_2$ plate by Langmuir-Blodgett technique at a dipping speed of 10 mm/min, thereby maintaining the surface pressure at 25 dyne/cm. 61 or 60 layers, respectively were deposited on each plate. The multilayer films built up or deposited on the CaF$_2$ plate gave an FT-IR shown in FIG. 32, which is indentical with that of the product obtained in Example 10. It was also confirmed by its area-time curve that the deposited film consisting of Y-type layers, one peak was observed at $2\theta = 4.65°$ in spite of the fact that the film did not contain Cd$^{++}$ or the like.

When n is 3, and $\lambda$ is 1.5418 Å under Braagg's diffraction condition of $n\lambda$ being $2d \cdot \sin \theta$, a thickness of monolayer film is calculated as 28.5 Å. The result is considered as being almost in conformity with a value provided that a long chain alkyl groups in amphiphilic polyimide precursor stands vertically.

It was confirmed by the peaks at 1790 and 1710 cm$^{-1}$ in its FT-IR analysis that $\alpha$, $\beta$-unsaturated 5-membered imide rings were formed when the deposited film were heated at 400° C. for 1 hour.

It was also confirmed by IR spectrometry that imidation took place when the product obtained in Example 10 was heated at 400° C. for 1 hour, thereby decreasing its weight by 58% by weight, which is well in conformity with the theoretical value of 58.7% calculated with the assumption that stearyl alcohol was eliminated by the imidation.

COMPARATIVE EXAMPLE 1

Figure 33:
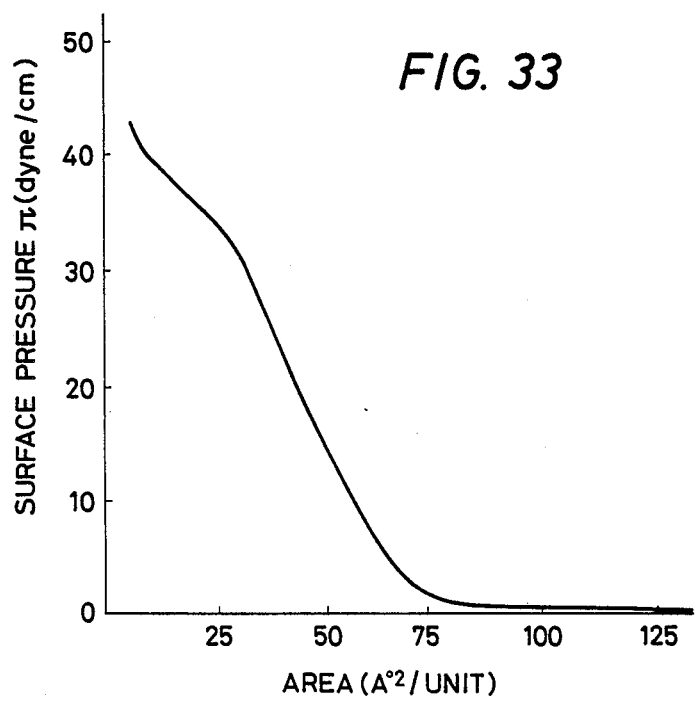
FIG. 33, the relationship between surface pressure and area per recurring unit of the precursor obtained in Comparative Example 1.

A polyimide precursor was synthesized in the same manner as in Example 10, except that n-decyl alcohol (n-$C_{10}H_{21}OH$) was used instead of stearyl alcohol. As far as IR spectrum, thermal analysis and molecular weight measured by GPC are concerned, the polyimide precursor showed the same characteristics as those of the polyimide obtained in Example 10. However, the surface pressure-area curve of the precursor, shown in FIG. 33, indicates the presence of a liquid expansion phase and denies the existence of a condensed phase. It would, therefore, be apparent that an alkyl group containing only 10 carbon atoms would be too short to give a polymer capable of forming a stable condensed film.

EXAMPLES 12-14

Example 10 was repeated, except that lauryl alcohol (containing 12 carbon atoms), myristyl alcohol (containing 14 carbon atoms) or cetyl alcohol (containing 16 carbon atoms) were used instead of stearyl alcohol. In cases where alcohols containing 12 to 14 carbon atoms were used, there were obtained products showing characteristics between those of the products prepared from $C_{10}$ and $C_{18}$ alcohols. In the case where the $C_{16}$ alcohol was used, there was obtained a product capable of forming a condensed film which was as stable as in the case of $C_{18}$.

EXAMPLE 15

10.91 g of pyromellitic acid dianhydride was reacted with 27.05 g of stearyl alcohol at 120° C. for 3 hours. The product obtained was recrystallized from 200 ml of ethanol to give distearyl pyrromellitate having a melting point of 133°-137° C. 3.79 g of this distearyl pyrromellitate was dissolved in 60 cc of hexamethylphosphoramide and cooled to 5° C., and then 1.19 g of thionyl chloride was dropwise added thereto at about 5° C. By allowing the solution to stand for about one hour after the dropping, the reaction was completed. Subsequently, 1.2 g of diaminodiphenyl ether dissolved in 30 cc of dimethylacetamide was dropwise added at about 10° C., and after reaction was conducted for two hours by elevating the reaction temperature to about 20° C., the reaction mixture was poured in 400 cc of ethanol to precipitate the reaction product, which was filtered and dried at 40° C., whereby ca. 3.4 g of pale yellow powder was obtained.

The results of the measurement of molecular weight by IR spectrum analysis, thermal analysis (TGA-DTA) and GPC were as follows.

IR SPECTRUM ANALYSIS

Figure 34:
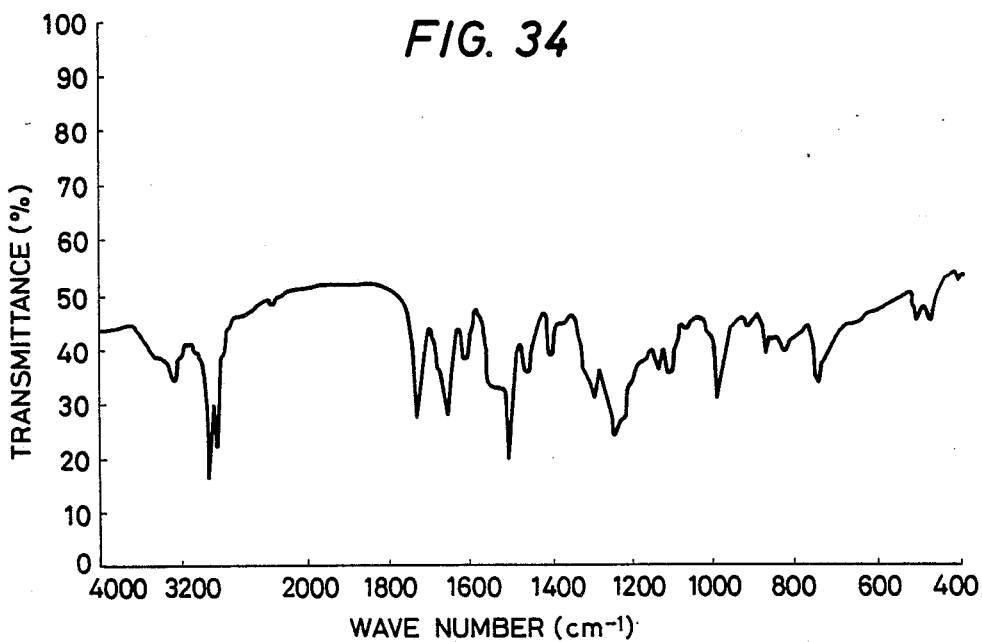
FIG. 34 shows the IR spectrum of the precursor obtained in Example 15.

As the IR chart obtained by KBr disc method is shown in FIG. 34, there appeared the absorption peaks characteristic of esters, amides I, II, and III, alkyl chains, and ethers.

THERMAL ANALYSIS (TGA-DTA)

Figure 35:
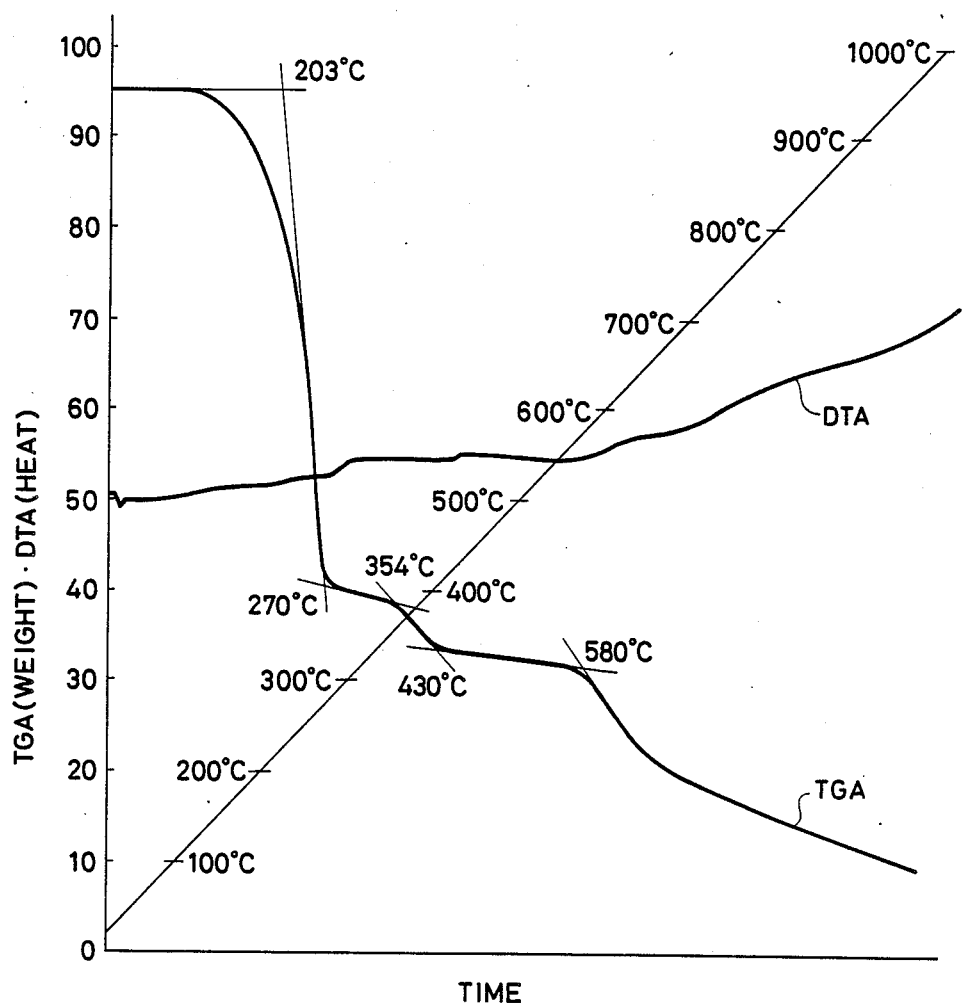
FIG. 35 shows the result of the thermal analysis.

The result obtained by measuring by the use of an RTG-DTA of type H, manufactured by Rigaku Denki Co., Ltd., under the following conditions: TGA full scale, 10 mg; DTA full scale, 100 μv; maximum temperature, 1000° C.; rate of heating, 10° C./min; and nitrogen stream of 30 ml/min is as shown in FIG. 35. In the TGA are observed inflection points at 203°, 270°, 354°, 403°, and 580° C., while in the DTA is observed no characteristic peak.

MEASUREMENT OF MOLECULAR WEIGHT BY GPC

A number average molecular weight of ca. 15,000 (reduced to polystyrene) was obtained by GPC measured in a mixed solvent of chloroform and N,N-dimethylacetamide (8:2).

EXAMPLE 16

In an 8:2 mixture (by volume) of distilled chloroform and distilled dimethylacetamide was dissolved 55.1 mg of the product obtained in Example 15 to prepare 25 ml of LB film spreading solution.

Figure 36:
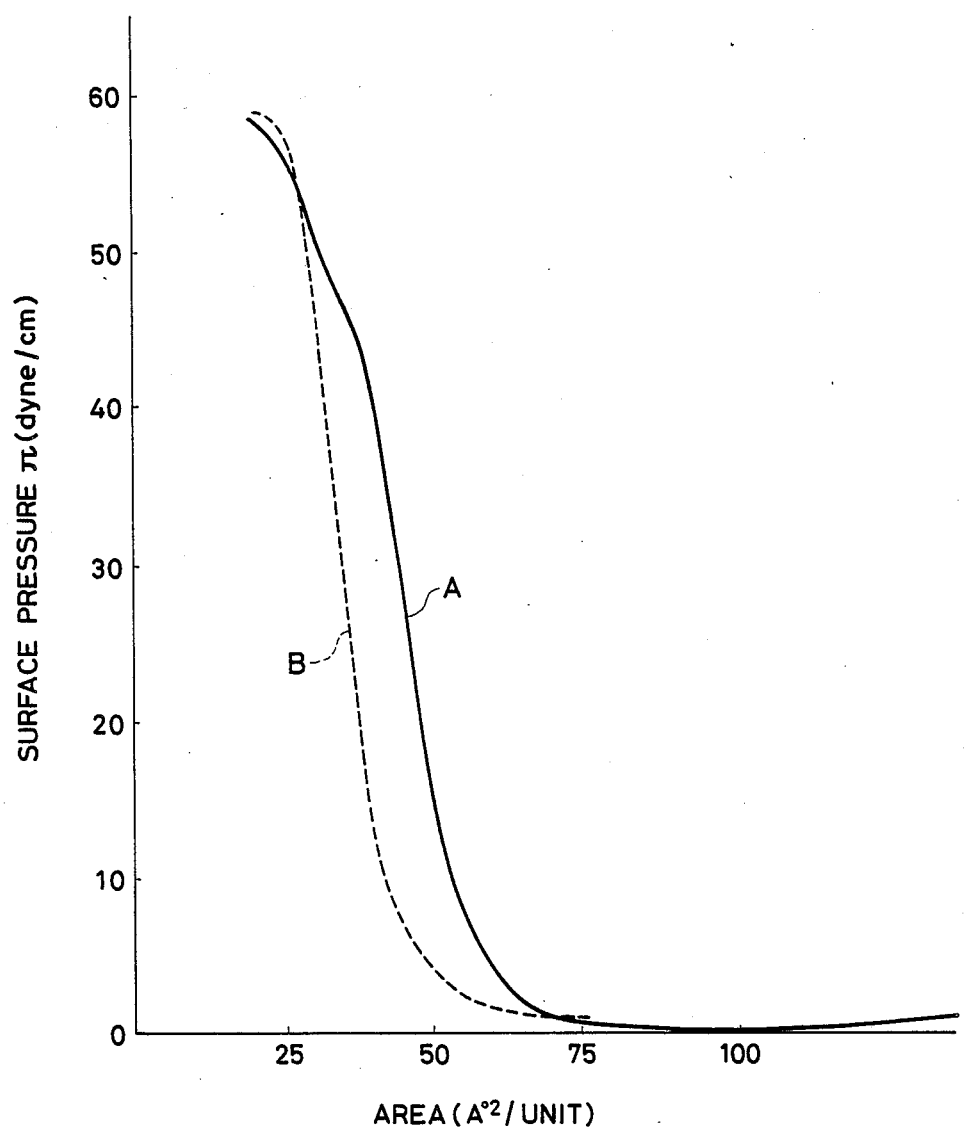
FIG. 36 shows the surface pressure-area curves of the precursor obtained in Example 15 and of the same mixed with an equimolar amount of stearyl alcohol.

The relationship between surface pressure and area per recurring unit was measured at 20° C. on the surface of redistilled water, and the result shown in FIG. 36 was obtained. The surface pressure rose steeply at around 60 Å$^2$/unit, forming a good condensed film. The limiting area was 55 Å$^2$/unit, and the collapse pressure was 45 dyne/cm (FIG. 36-A). When the above described solution and a solution of stearyl alcohol having the same molar concentration as the above described solution were mixed in equal volumes and the surface pressure-area curve was evaluated by making the sum of the number of recurring units in the product obtained in Example 15 and the number of molecules of the stearyl alcohol equal to FIG. 36-A, the result as shown by B was obtained. It would be apparent that by the addition of stearyl alcohol the rise of the curve becomes still further steeper, and the collapse pressure also rises to ca. 60 dyne/cm, thus the film being stabilized.

The deposition on the glass substrate on which aluminum was vacuum evaporated or which was treated with silane coupling agent A-1100 or A-187 was found to be of Y-type whether stearyl alcohol was added or not and the deposited film obtained was equally good.

Further, when a 1:1 mixture (molar ratio) of the product obtained in Example 15 and stearyl alcohol was layered on a germanium substrate, and heated at 400° C. for one hour in a stream of nitrogen, there were observed the disappearance of the stearyl group and the appearance of five-numbered ring imide of 1790, 1710 cm$^{-1}$ according to FT-ATR-IR process.

EXAMPLE 17

2.47 g of distearyl pyrromellitate synthesized in the same manner as in Example 15 was cooled to 0° to 5° C. in 12 cc of dry hexamethylphosphoramide, and was acylated with 0.744 g of thionyl chloride. The acylated product thus prepared was then added with stirring at room temperature to an aqueous solution which was beforehand prepared from 0.358 g of resorcinol and 0.26 g of sodium hydroxide.

The precipitate formed was separated and purified by reprecipitation to give 0.92 g of white powder. The results of the measurement of molecular weight by IR spectrum analysis, thermal analysis, and GPC were as follows.

IR SPECTRUM ANALYSIS

Figure 37:
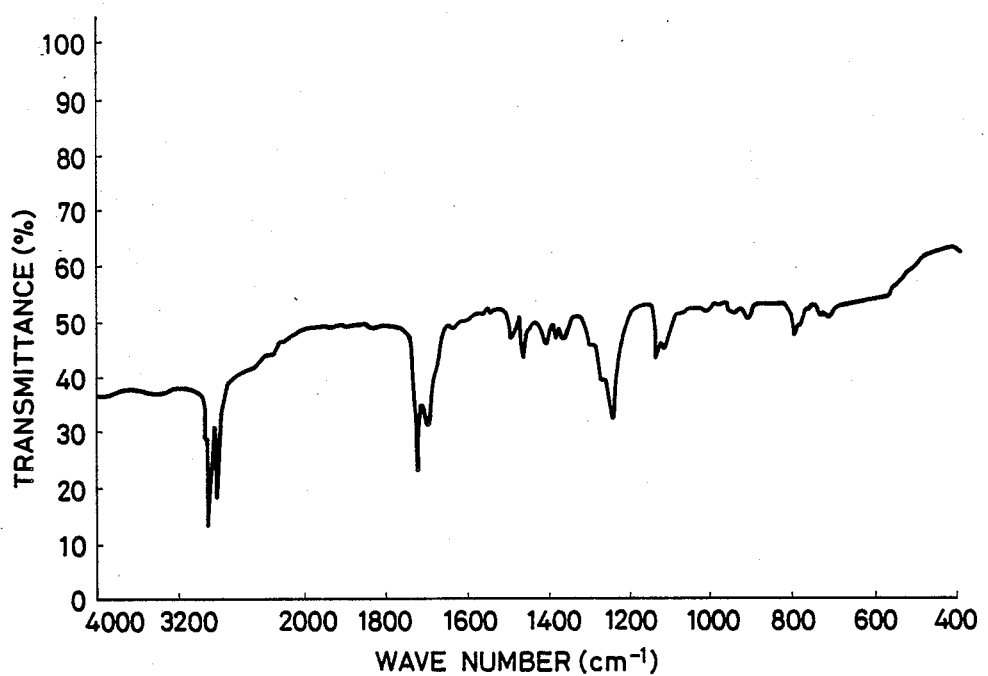
FIG. 37 shows the IR spectrum of the high polymer obtained in Example 17.

As the IR chart obtained in the same manner as in Example 15 is shown in FIG. 37, there appeared the absorption peak characteristic of esters and alkyl chains.

THERMAL ANALYSIS

Figure 38:
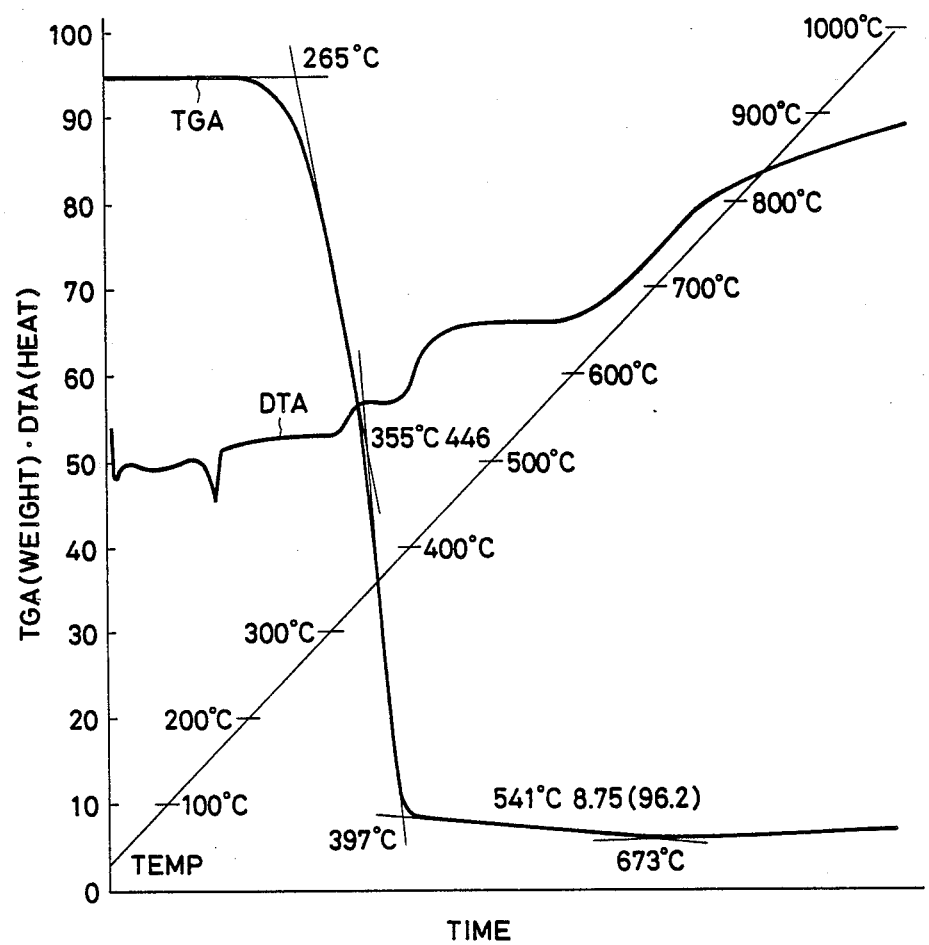
FIG. 38, the result of the thermal analysis (TGA-DTA)

The result obtained by measuring in the same manner as in Example 15 is shown in FIG. 38. In the TGA were observed inflection points at 265°, 355°, and 397° C., and although at 265° C. or higher a rapid thermal decomposition begins, it is considered that the product is thermally stable up to around 200° C. On the other hand, in the DTA were observed a sharp heat absorption peak at 160° C. and a broad heat evolution peak seemingly due to broad thermal decomposition.

MEASUREMENT OF MOLECULAR WEIGHT BY GPC

A number average molecular weight (reduced to polystyrene) measured in the same manner as in Example 15 was about 7,000.

EXAMPLE 18

17.3 mg of the product obtained in Example 17 was dissolved in a 19:1 mixture (volume ratio) of chloroform and dimethylacetamide to prepare 10 ml of LB film spreading solution.

Figure 39:
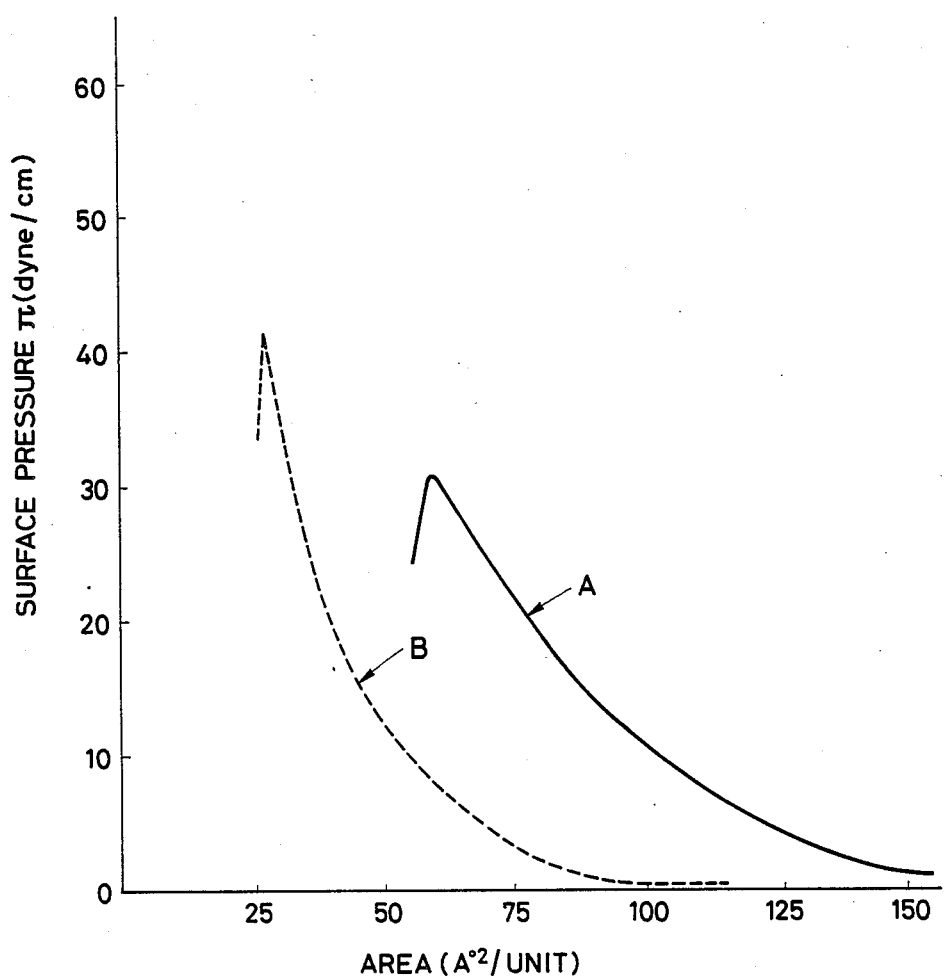
FIG. 39, the relationship between surface pressure and area per recurring unit in the case where the high polymer obtained in Example 17 was spread on the surface of water in accordance with Example 18.

The relationship between surface pressure and area per recurring unit was measured at 22° C. on the surface of redistilled water. The film was expansive and collapsed at ca. 30 dyne/cm, as shown in FIG. 39. The film could be deposited on a substrate at a surface pressure of 20 dyne/cm at a dipping speed of 10 mm/min only when the substrate was being taken out.

Next, the above solution was mixed with stearyl alcohol as in the case of Example 16, and a surface pressure-area curve of the product was evaporated. The curing showed a steep rise as indicated in FIG. 39-B. It was also confirmed from the area-time curve that a Y-type film was formed on a glass substrate in the case where the above solution was mixed with stearyl alcohol at a molar ratio of 1:1.

EXAMPLE 19

Synthesis of an Amphiphilic High Polymer from Trimellitic Acid Monostearyl Ester and 2,5-Diaminobenzamide In a 200 ml four neck flask an acid chloride was prepared from trimellitic acid monostearyl ester (2.31 g, 5.00 millimoles), HMPA (30 ml), and thionyl chloride (1.19 g, 10.0 millimoles). Thereto was dropwise added 2,5-diaminobenzamide (0.756 g, 5.00 millimoles) at about 5° C. with stirring by the use of a mechanical stirrer. Stirring was further continued for more than one hour, and the temperature was slowly restored to room temperature. The resulting red-brown reaction liquid was poured in 500 ml of ethanol, while stirring by the use of a mechanical stirrer, when a white precipitate was formed. The precipitate was filtered, washed first with water and then with ethanol, and dried under a reduced pressure, whereby polyamide 5 (2.30 g, yield 80%) was obtained as a pale yellow solid. The structure was identified by $^1$H-NMR and IR spectrum.

The results of the measurement of molecular weight by $^1$H-NMR, IR spectrum analysis, thermal analysis (TGA-DTA), and GPC are as follows.

$^1$H-NMR ANALYSIS

The proton NMR spectrum obtained in DMF-$d_7$+CDCl$_3$ was assigned as follows.
δ0.7–1.7 (m, 35H CO$_2$CH$_2$C$_{17}$H$_{35}$)
δ4.25 (t, 2H CO$_2$CH$_2$C$_{17}$H$_{35}$)
δ7.90–8.40 (m, 6H, aromatic).
The proton of CONH could not be observed.

IR SPECTRUM ANALYSIS

Figure 40:
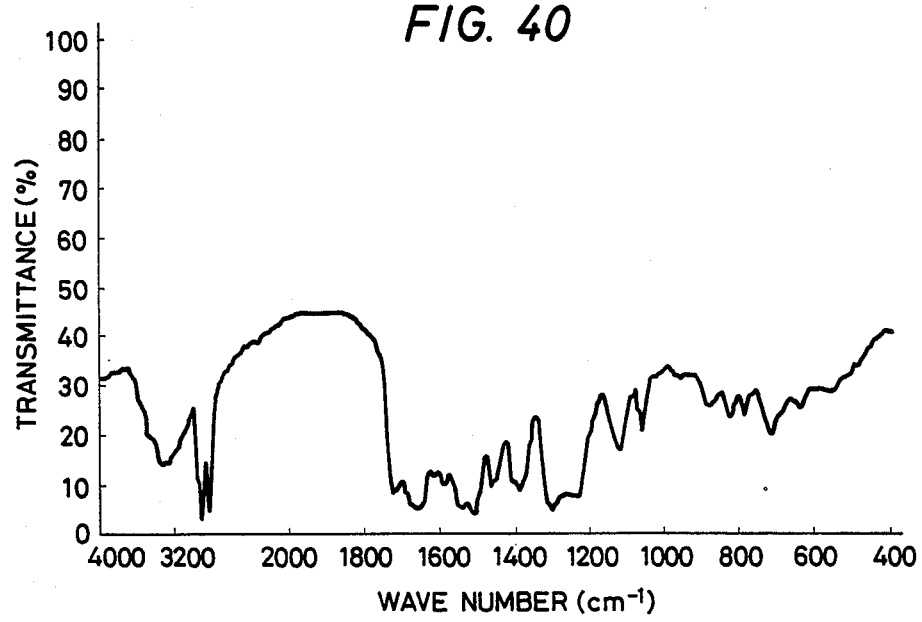
FIG. 40 shows the IR spectrum of the amphiphilic high polymer obtained in Example 19.

As the IR chart obtained by KBr disc methods is shown in FIG. 40, there appeared the absorption peak characteristic of ester amides I, II, and III, and alkyl chains.

THERMAL ANALYSIS (TGA-DTA)

Figure 41:
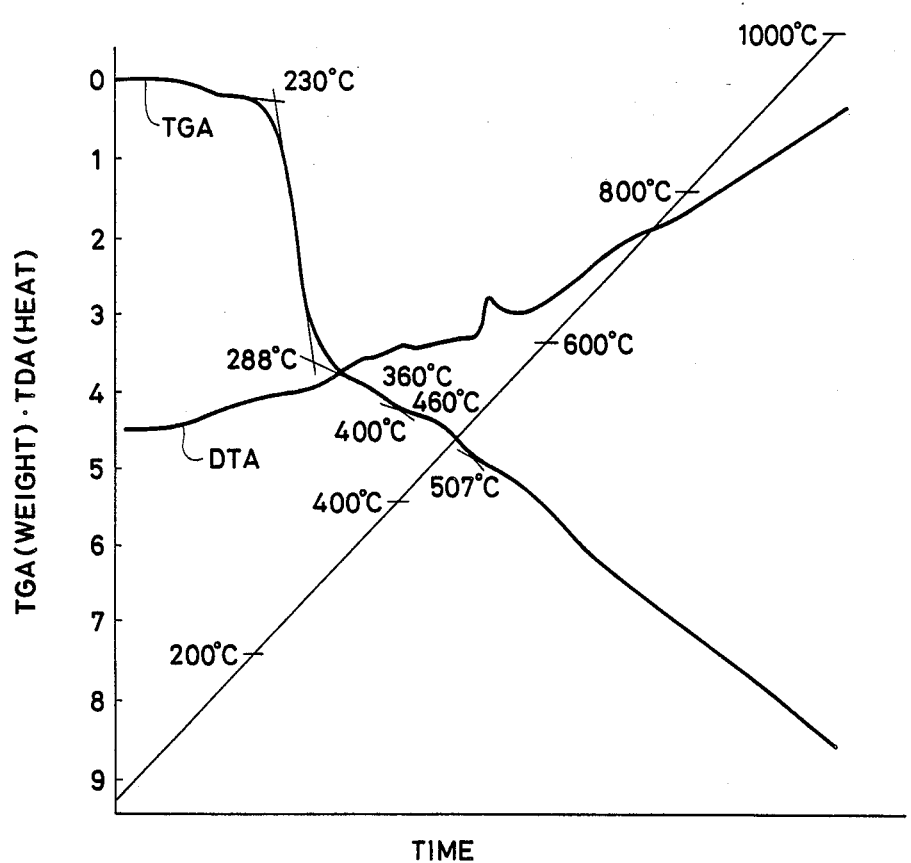
FIG. 41 shows the result of the thermogravimetric analysis.

The result obtained by measuring by the use of an RTG-DTA of type H, manufactured by Rigaku Denki Co., Ltd., under the conditions: TGA full scale, 10 mg, DTA full scale, 100 μv; maximum temperature, 1000° C.; rate of heating, 10° C./min; and nitrogen stream of 30 ml/min is as shown in FIG. 41. In the TGA were observed inflection points at 230°, 288°, 360°, 400°, 460°, and 507° C. and a characteristic peak in the vicinity of 525° C.

Figure 42:
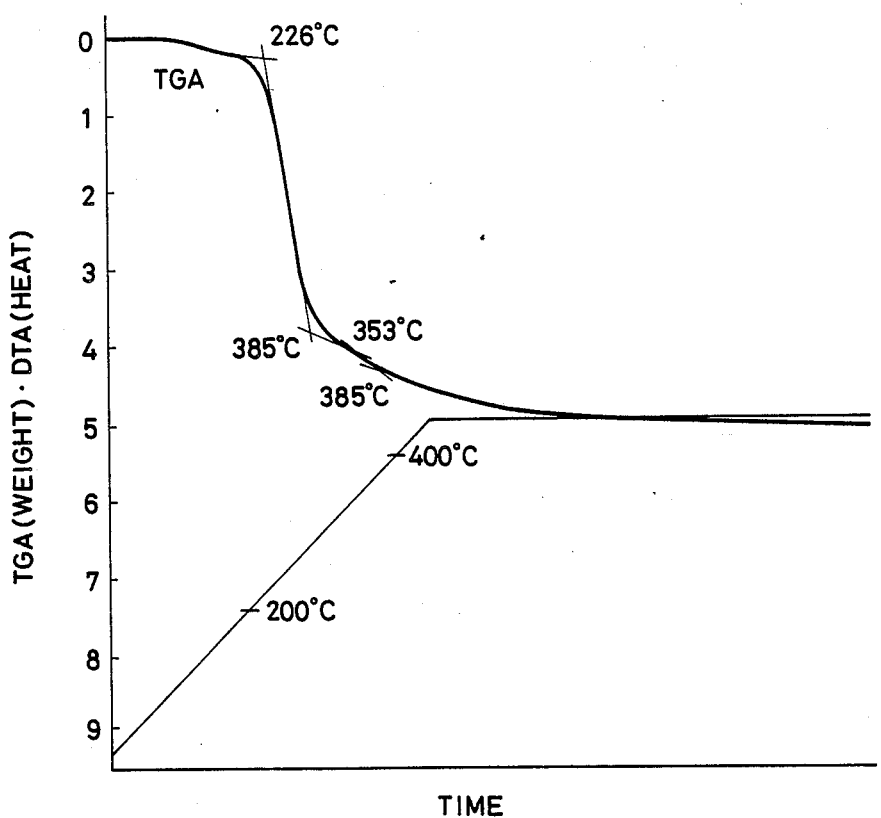
FIG. 42 shows the weight change (TGA) and the heat change (DTA) when the high polymer was heated from room temperature to 450° C. and maintained at that temperature for one hour.

On the other hand, FIG. 42 shows the result obtained when the product was heated up to 450° C. at rate of 10° C./min, and maintained at 450° C. for one hour. Although the weight slowly decreases by heating at 450° C. for one hour, heat-resistant at around 400° to 450° C. may be expected.

In the IR spectrum of the compound which was obtained by the ring closure of the amphiphilic high polymer in this example as above it was confirmed that the absorption resembling that of the imide linkage is observed and the alkyl group disappears. Also, the weight decrease after the heating at 450° C. for one hour is 48.4%, which is in good agreement with the theoretical decrease 50.1% in the case where a ring closure structure is formed by the elimination of stearyl alcohol and water.

MEASUREMENT OF MOLECULAR WEIGHT BY GPC

By GPC measured in a mixture of N,N-dimethylacetamide and chloroform a number average molecular weight of about 16,000 (reduced to polystyrene) was obtained.

The product obtained in this example was dissolved in a 5:5 mixture (volume ratio) of distilled chloroform and distilled dimethylacetamide to prepare 25 ml of LB film spreading solution.

Figure 43:
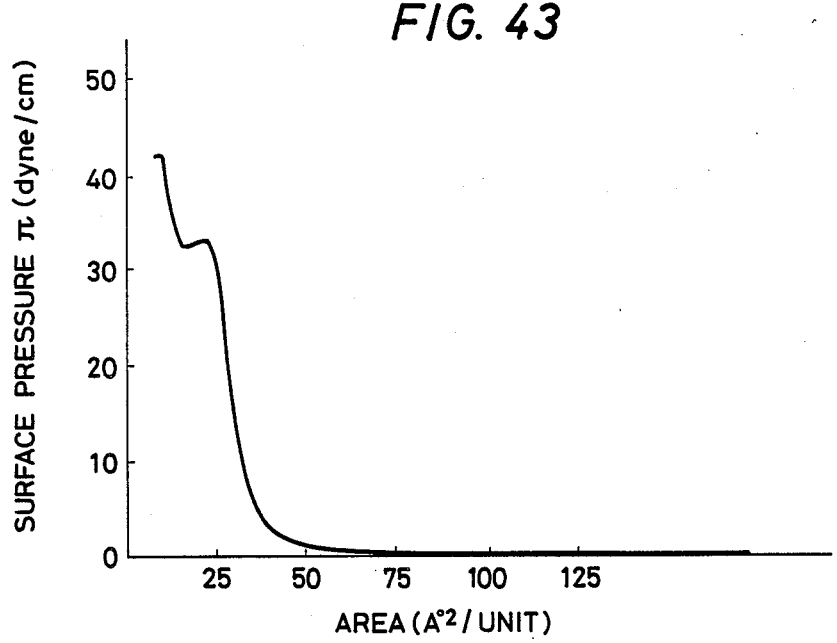
FIG. 43 shows the relationship between surface pressure and area per recurring unit in the case where the amphiphilic high polymer obtained in Example 19 was spread on the surface of water.
Figure 44:
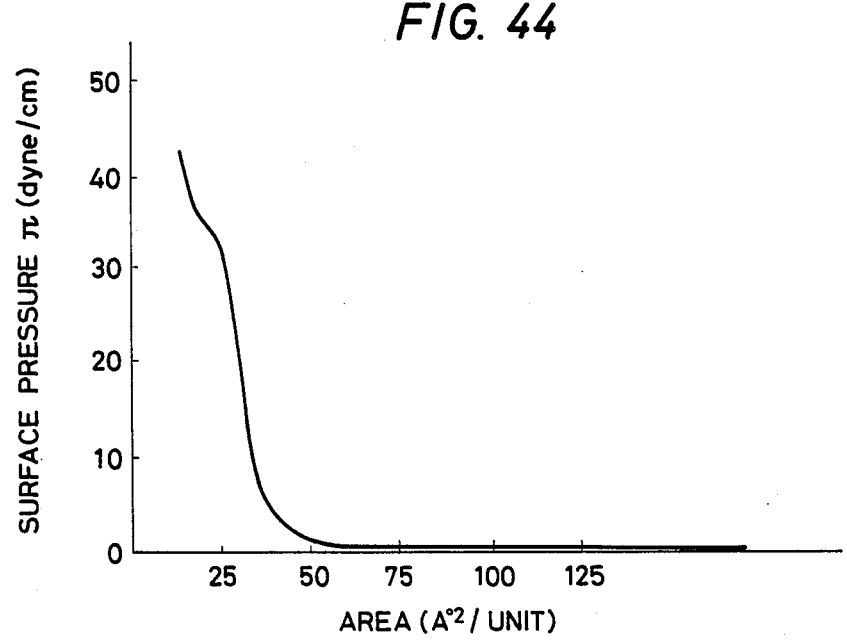
FIG. 44 shows the surface pressure-area curve of said high polymer mixed with an equimolar amount of stearyl alcohol.

The relationship between surface pressure and area per recurring unit was measured at 20° C. on the surface of redistilled water. The result obtained is shown in FIG. 43. The surface pressure rose steeply from ca. 50 Å$^2$/unit, forming a good condensed film. The collapse pressure was 30 dyne/cm. When stearyl alcohol was mixed in an equimolar amount, an extremely good surface pressure-area curve was obtained (FIG. 44).

It was brought to light that when the amphiphilic high polymer in this example mixed with an equimolar amount of stearyl alcohol is layered on the glass substrate on which aluminum was evaporated, a deposited film of Y-type was obtained.

In addition the 61 layers deposited film obtained in the above described way had a thickness of ca. 1800 Å, and the electrical insulation characteristic was found to be excellent by the measurement of capacitance.

Further, it was also confirmed from the peaks at 1790 cm$^{-1}$ and 1710 cm$^{-1}$ by FT-IR analysis that when said deposited film was heated at 450° C. for one hour a linkage resembling the imide linkage was formed.

EXAMPLE 20

10.91 g of pyrromellitic acid dianhydride and 27.05 g of stearyl alcohol were allowed to react at 120° C. for three hours, and the product was recrystallized from 200 ml of ethanol to give pyrromellitic acid distearyl ester of m.p. 133°–137° C.

SYNTHESIS OF AN AMPHIPHILIC HIGH POLYMER FROM PYRROMELLITIC ACID DISTEARYL ESTER AND 2,5-DIAMINOBENZAMIDE

In a 200 ml four neck flask, an acid chloride solution was prepared at room temperature from pyrromellitic acid distearyl ester (3.80 g, 5.00 millimoles), thionyl chloride (1.19 g, 10.0 millimoles), and HMPA (50 ml), and thereto was dropwise added 2,5-diaminobenzamide (0.765 g, 5.00 millimoles) dissolved in dimethylacetamide (30 ml) at about 5° C. with stirring by the use of a mechanical stirrer, and stirring was further continued for more than one hour, and then the temperature was slowly restored to room temperature. After the reaction liquid was filtered through Kiriyama filter, similar to Buchner funnel, the filtrate was poured in 500 ml of ethanol, in which a pale yellow precipitate was formed. The precipitate was filtered off, washed first with water and then with ethanol, and dried under a reduced pressure, whereby polyamide (3.55 g, yield 81%) was obtained as a yellow solid.

The results of the measurement of molecular weight by $^1$H-NMR, IR spectrum analysis, thermal analysis (TGA-DTA) and GPC are as follows.

$^1$H-NMR ANALYSIS

Figure 45:
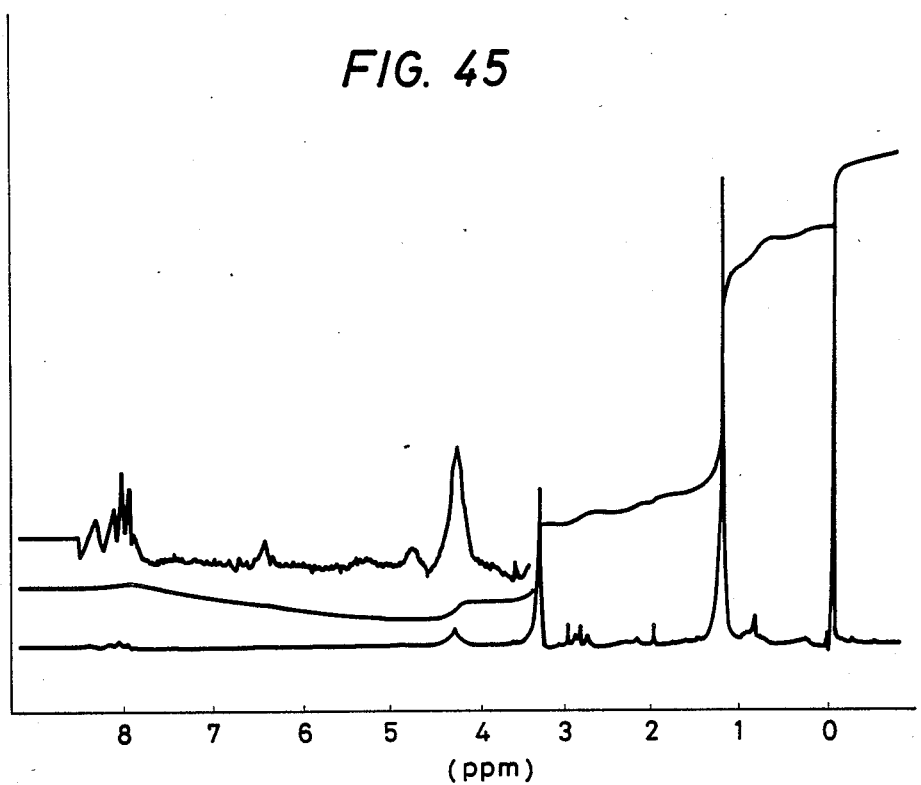
FIG. 45 and 46 show respectively the $^1$H-NMR and IR spectra of the amphiphilic high polymer obtained in Example 20.

The proton NMR spectrum obtained in a solution of DMF-d$_7$+CDCl$_3$ is as shown in FIG. 45.

IR SPECTRUM ANALYSIS

Figure 46:
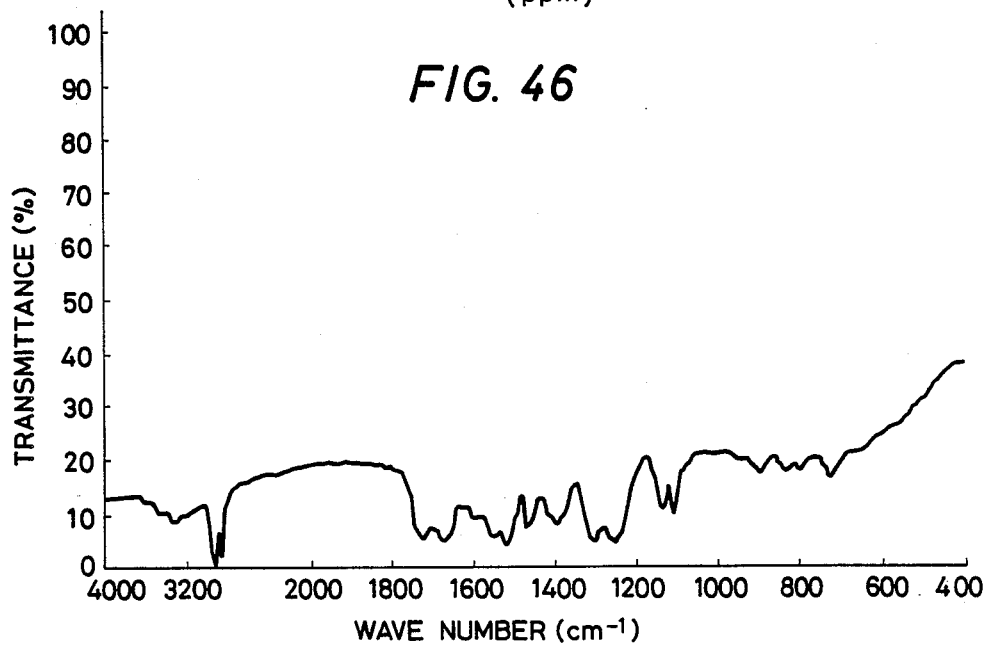

As the IR chart obtained by KBr disc method is shown in FIG. 46, there appeared the absorption peak characteristic of esters, amides I, II, and III, and alkyl chains.

THERMAL ANALYSIS (TGA-DTA)

Figure 47:
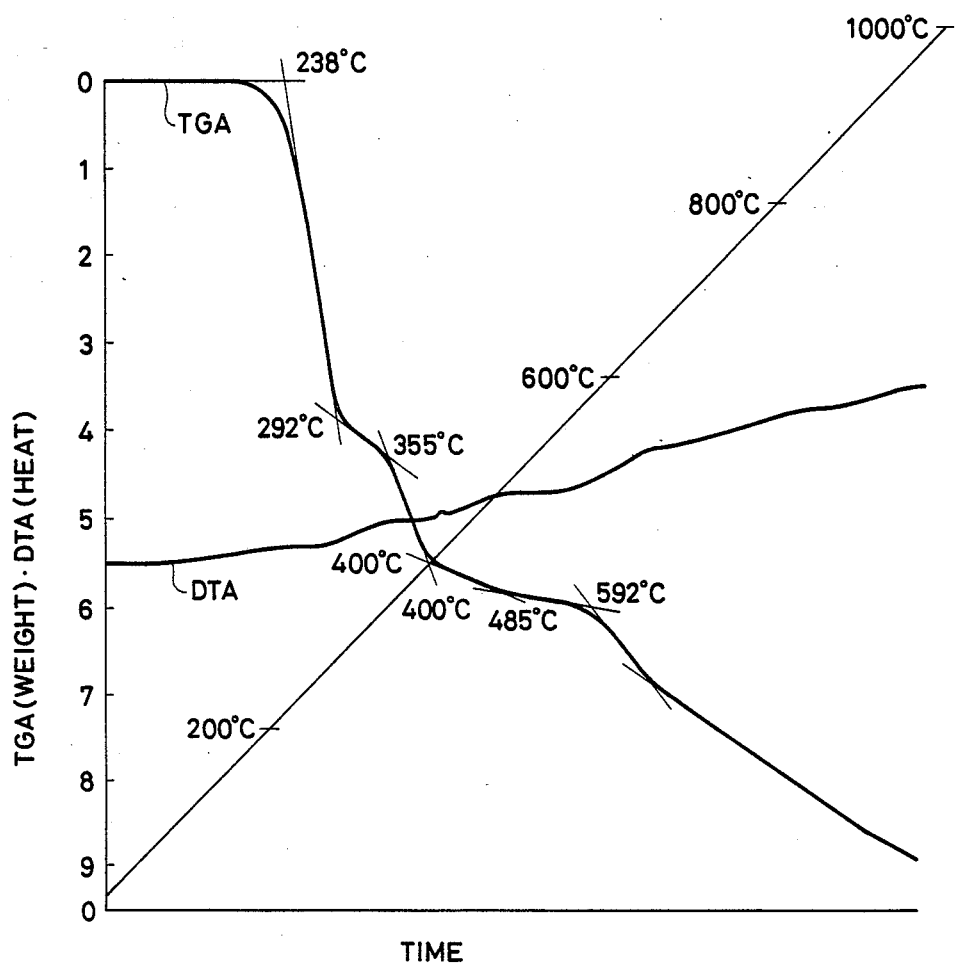
FIG. 47 shows the result of the thermogravimetric analysis.

The result obtained by measuring by the use of an RTG-DTA of type H, manufactured by Rigaku Denki Co., Ltd., under the conditions: TGA full scale, 10 mg; DTA full scale, 1000 μv; maximum temperature, 1000° C.; rate of heating, 10° C./min; and nitrogen stream of 30 ml/min is shown in FIG. 47.

In the TGA were observed inflection points at 238°, 292°, 355°, 400°, 485°, and 592° C., and in the DTA was observed no characteristic peak.

Figure 48:
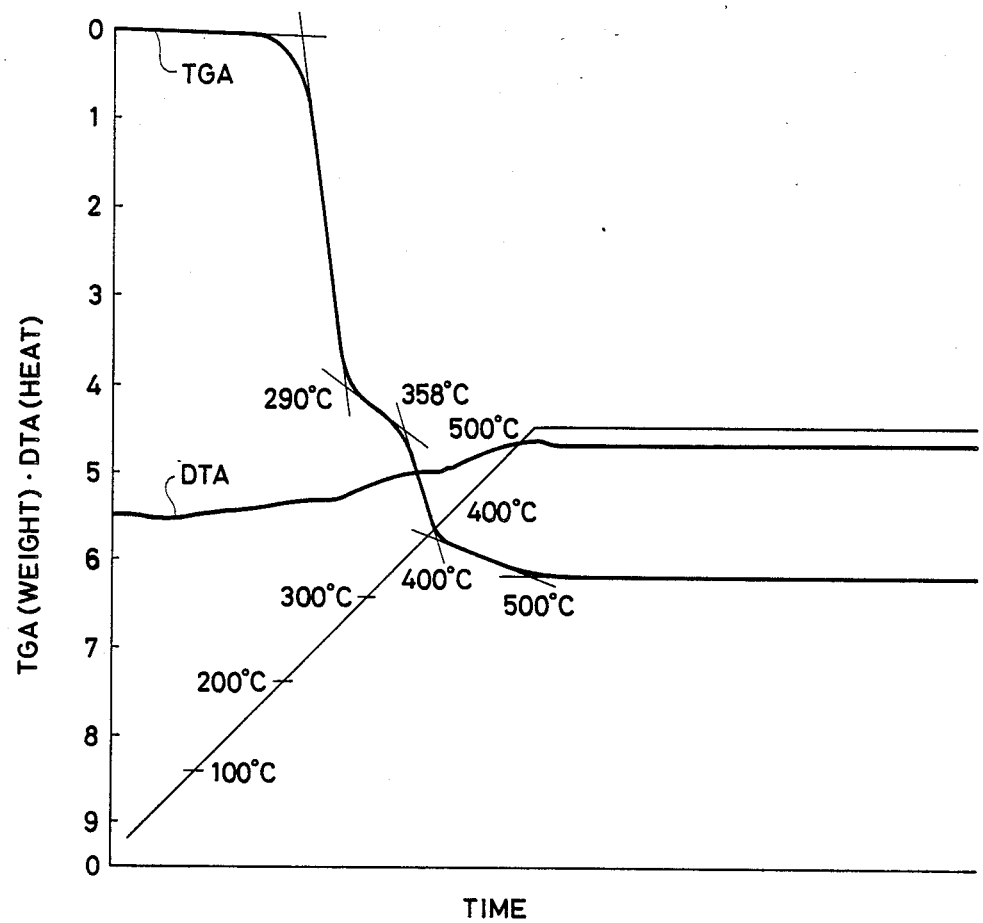
FIG. 48 shows the weight change (TGA) and the heat change (DTA) when said high polymer was heated from room temperature to 500° C. and maintained at that temperature for one hour.

On the other hand, FIG. 48 shows the result obtained when the product was heated up to 500° C. at a rate of 10° C./min, and maintained at 500° C. for one hour. Even when heating was made at 500° C. for one hour, there was found almost no decrease in the weight, indicating the heat stability, so that heat resistance can be expected at a temperature above 500° C.

Figure 49:
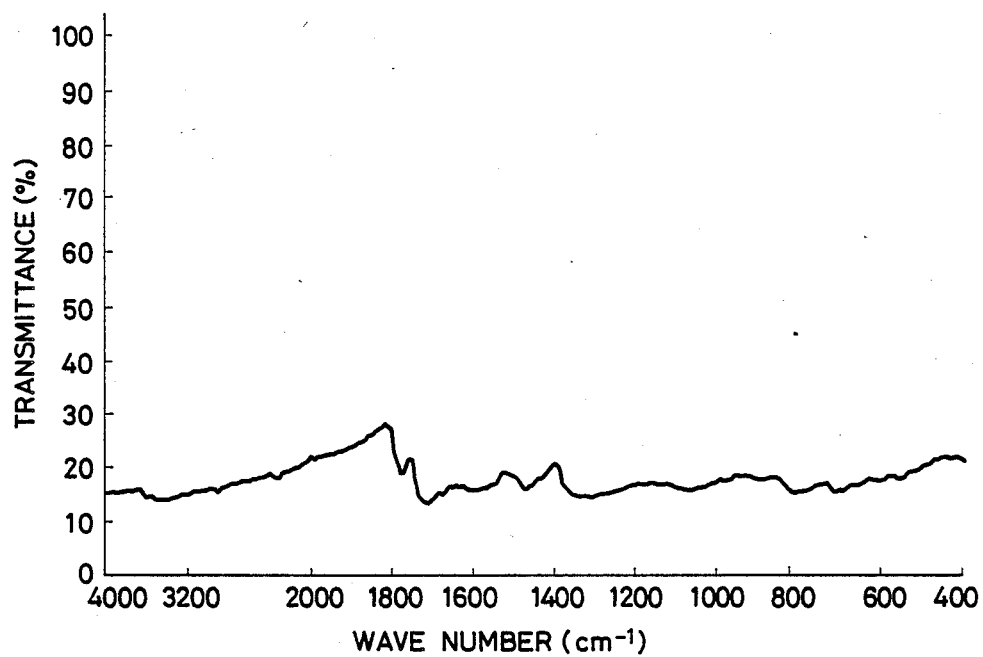
FIG. 49 shows the IR spectrum of the ring closure product obtained by heating at 500° C. for one hour.

Although the IR spectrum of the compound obtained by the ring closure of the amphiphilic high polymer in this example as above is low in the percent transmission as shown in FIG. 49, the absorption resembling that of the imide linkage can be observed. Also, the weight decrease observed after the heating at 500° C. for one hour is 64.7%, which is well in conformity with the theoretical decrease 64.1% in the case where polyimideisoindoloquinazolinedione is formed by the elimination of stearyl alcohol and water.

MEASUREMENT OF MOLECULAR WEIGHT BY GPC

By GPC measured in a mixture of N,N-dimethylacetamide and chloroform a number average molecular weight (reduced to polystyrene) of about 42,000 was obtained.

55.1 g of the product obtained in this example was dissolved in an 8:2 mixture (volume ratio) of distilled chloroform and distilled dimethylacetamide to prepare 25 ml of LB film spreading solution.

Figure 50:
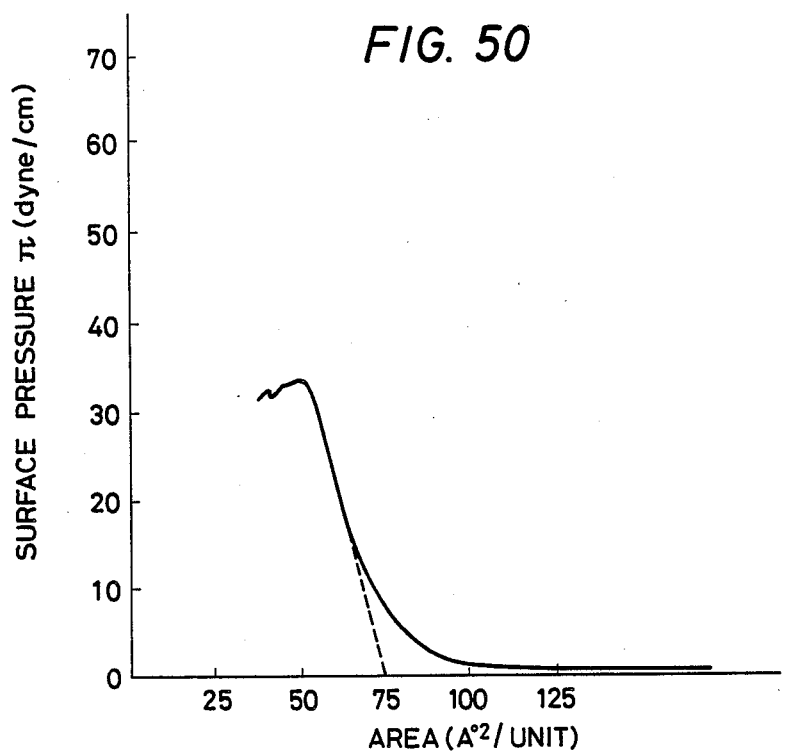
FIG. 50 shows the relationship between surface pressure and area per recurring unit in the case where the amphiphilic high polymer obtained in Example 20 was spread on the surface of water.

The relationship between surface pressure and area per recurring unit was measured at 20° C. on the surface of redistilled water. The result obtained is shown in FIG. 50. The surface pressure rose steeply from about 90 Å$^2$/unit, forming a good condensed film. The limiting area was 75 Å$^2$/unit, and the collapse pressure was 30 dyne/cm.

Figure 51:
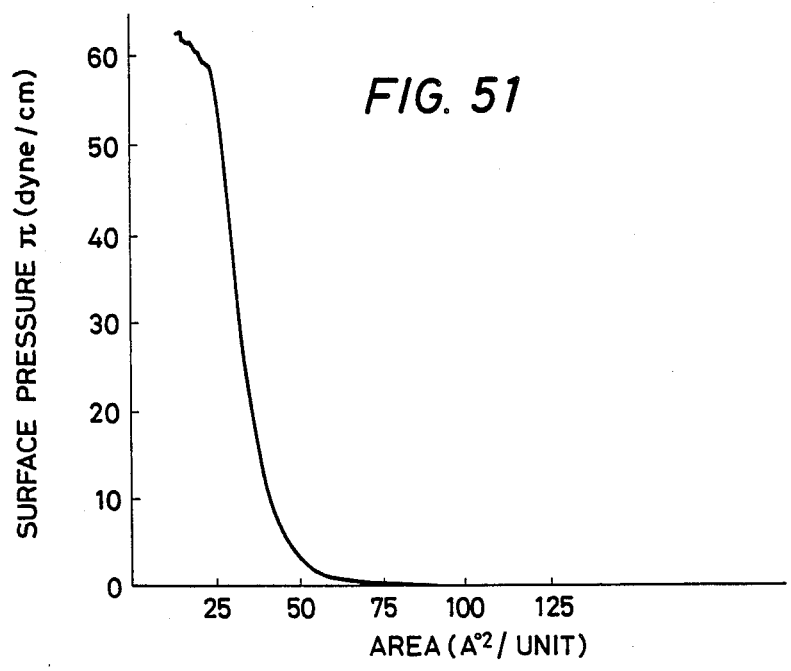
FIG. 51 shows the surface pressure-area curve of said high polymer mixed with an equimolar amount of stearyl alcohol.

When mixed with an equimolar amount of stearyl alcohol, there was obtained an extremely good surface pressure-area curve (FIG. 51).

It was brought to light that when the amphiphilic high polymer in this example mixed with an equimolar amount of stearyl alcohol was deposited on the glass substrate on which aluminum was vacuum evaporated a deposited film of Y-type was obtained.

In addition, the 61 layers accumulated film obtained in the above described way had a thickness of ca. 1800 Å, and the electric insulation characteristic was found to be excellent by the measurement of capacitance.

Further, it was also confirmed from the peaks at 1790 cm$^{-1}$ and 1710 cm$^{-1}$ by FT-IR analysis that when said accumulated film is heated at 500° C. for one hour, a linkage resembling the imide linkage is formed.

EXAMPLE 21

10.91 g of pyrromellitic acid dianhydride and 27.05 g of stearyl alcohol were allowed to react at 120° C. for three hours, and the product was recrystallized from 200 ml of ethanol to give pyrromellitic acid distearyl ester of m.p. 133°–137° C.

SYNTHESIS OF AN AMPHIPHILIC HIGH POLYMER FROM PYRROMELLITIC ACID DISTEARYL ESTER AND TETRAAMINOBENZIDIN

In a 200 ml four neck flask an amount (2.84 g, 3.74 millimoles) of pyrromellitic acid distearyl ester was weighed out and dissolved in hexamethylphosphoric triamide (HMPA, 30 ml). When thionyl chloride (0.87 g, 7.48 millimoles) was dropwise added at 5° C. under a stream of nitrogen with stirring by the use of a mechanical stirrer, and further the stirring was continued for one hour, a pale yellow pasty acid chloride was obtained. By adding 30 to 40 ml of methylene chloride (dried with calcium chloride) the solution was made homogeneous. In a separate 200 ml four neck flask, tetraaminobenzidin (0.860 g, 3.74 millimoles) was dissolved in dimethylacetamide (30 ml), and the above described solution of acid chloride was dropped in this solution over about 30 minutes at about 5° C. in a stream of nitrogen with stirring by the use of a mechanical stirrer. After stirring for an additional three hours the temperature was slowly restored to room temperature. After the reaction was complete, by pouring the reaction mixture in 500 ml of ethanol with stirring by the use of a mechanical stirrer, a pale yellow precipitate was deposited. When the precipitate was filtered through Kiriyama filter, washed with water and then with ethanol, and dried under a reduced pressure, 0.91 g (yield 26%) of amphiphilic high polymer was obtained.

The results of measurement of molecular weight by $^1$H-NMR, IR spectrum analysis, thermal analysis (TGA-DTA), and GPC are as follows.

$^1$H-NMR ANALYSIS

The proton NMR spectrum obtained in a solution of DMF-$d_7$+CDCl$_3$ was assigned as follows:

$\delta$1.20 (m, 70H CO$_2$CH$_2$C$_{17}$H$_{35}$)
$\delta$4.25 (t, 4H CO$_2$CH$_2$C$_{17}$H$_{35}$)
$\delta$7.95–8.25 (m, 8H Aromatic).

The proton of CONH could not be observed.

IR SPECTRUM ANALYSIS

Figure 52:
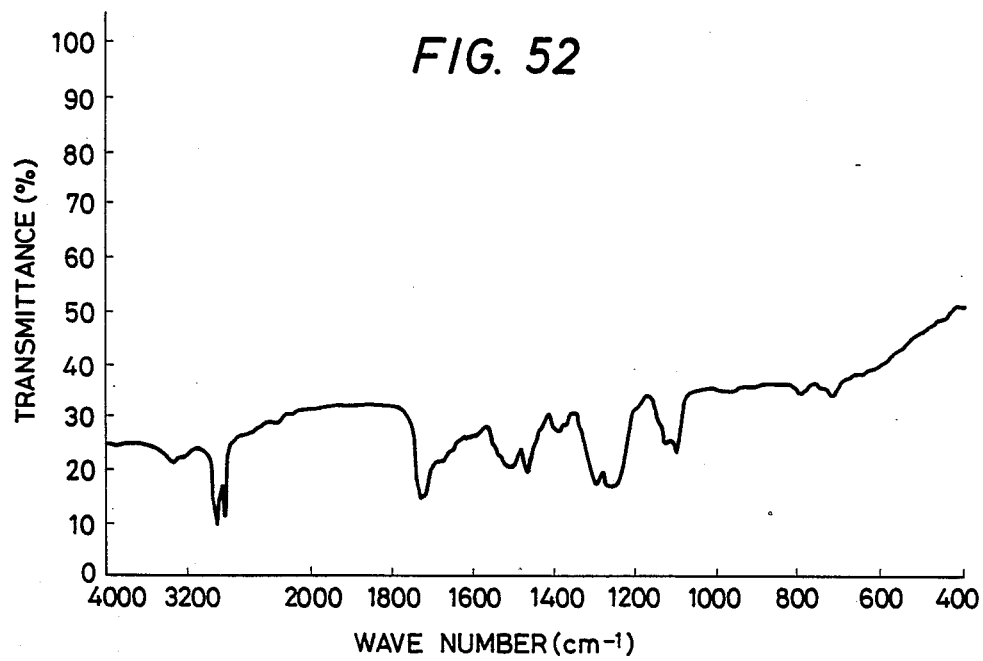
FIG. 52 shows the IR spectrum of the amphiphilic high polymer obtained in Example 21.

As the IR chart obtained by KBr disc method is shown in FIG. 52, there appeared the characteristic absorptions of esters, amides I, II, and III, and alkyl chains.

THERMAL ANALYSIS (TGA-DTA)

Figure 53:
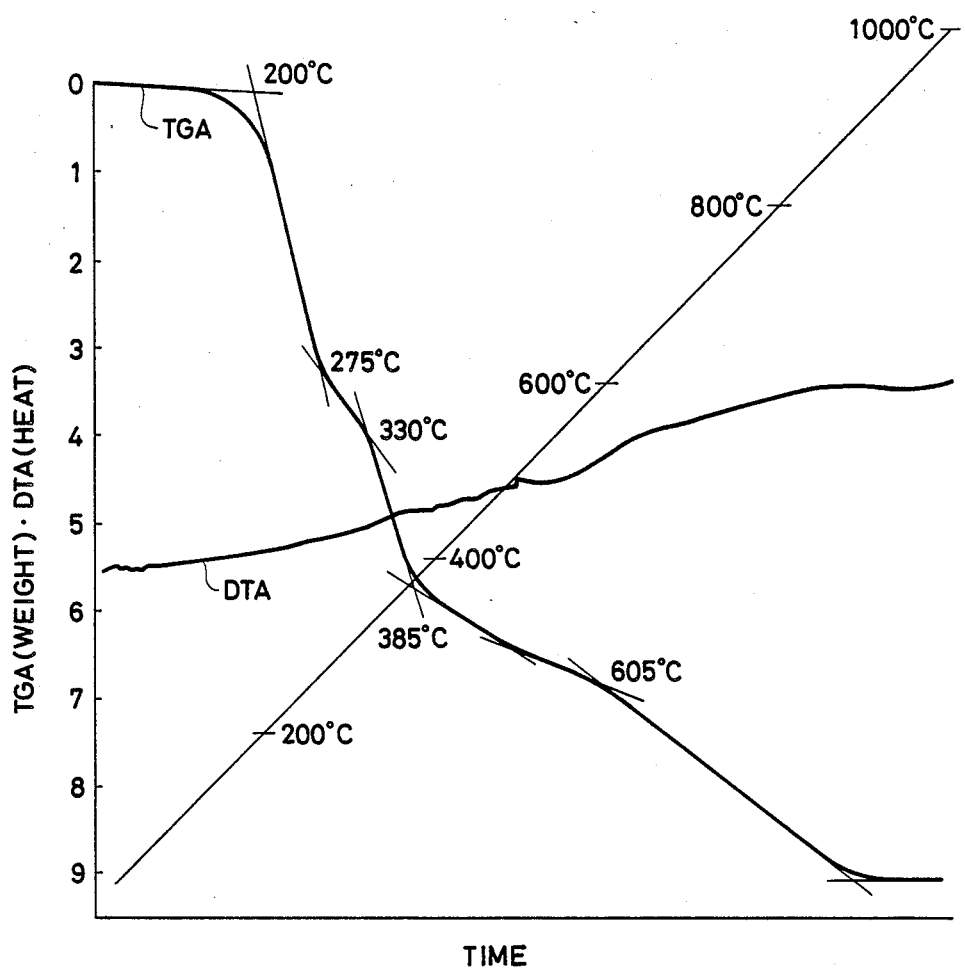
FIG. 53 shows the result of the thermogravimetric analysis.

The result obtained by measuring by the use of an RTG-DTA of type H, manufactured by Rigaku Denki Co., Ltd., under the conditions: TGA full scale, 10 mg; DTA full scale, 100 $\mu v$; maximum temperature, 1000° C.; rate of heating, 10° C./min; and nitrogen stream of 30 ml/min is as shown in FIG. 53.

In the TGA were observed inflection points at 200°, 275°, 330°, 385°, and 605° C., and in the DTA was observed no characteristic peak.

Figure 54:
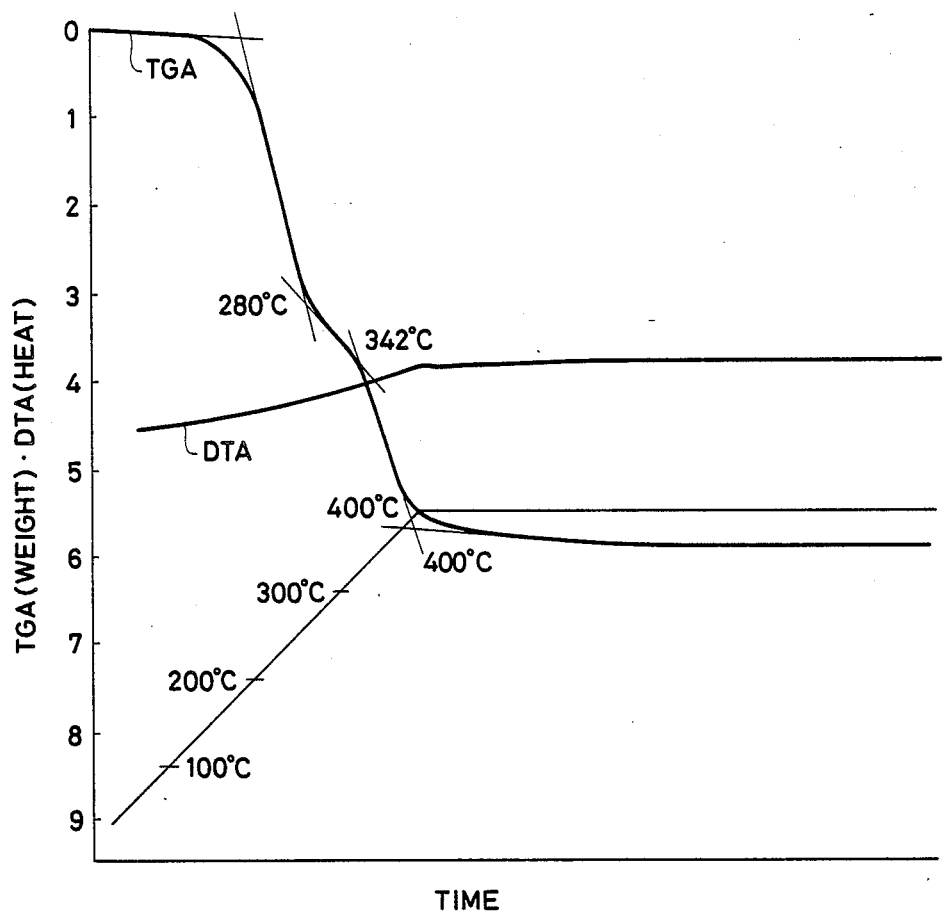
FIG. 54 shows the weight change (TGA) and the heat change (DTA) when said high polymer was heated from room temperature to 400° C. and maintained at that temperature for one hour.

On the other hand, FIG. 54 shows the result obtained when the product was heated up to 400° C. at a rate of 10° C./min, and maintained at 400° C. for one hour. By heating at 400° C. for one hour an almost constant weight was attained. Heat resistance may be expected up to about 400° to 450° C.

In the IR spectrum of the compound which was obtained by the ring closure of the amphiphilic high polymer in this example as above it was confirmed that the absorption resembling that of the imide linkage is observed and the alkyl group disappears. Also, the weight decrease after the heating at 400° C. for one hour is 65.0%, which is substantially in conformity with the theoretical decrease 61.7% in the case where a ring closure structure is formed by the elimination of stearyl alcohol and water.

MEASUREMENT OF MOLECULAR WEIGHT BY GPC

By GPC measured in a mixture of N,N-dimethylacetamide and chloroform a number average molecular weight (reduced to polystyrene) of about 28,000 was obtained.

The product obtained in this example was dissolved in an 8:2 mixture (volume ratio) of distilled chloroform and distilled dimethylacetamide to prepare 25 ml of LB film spreading solution.

Figure 55:
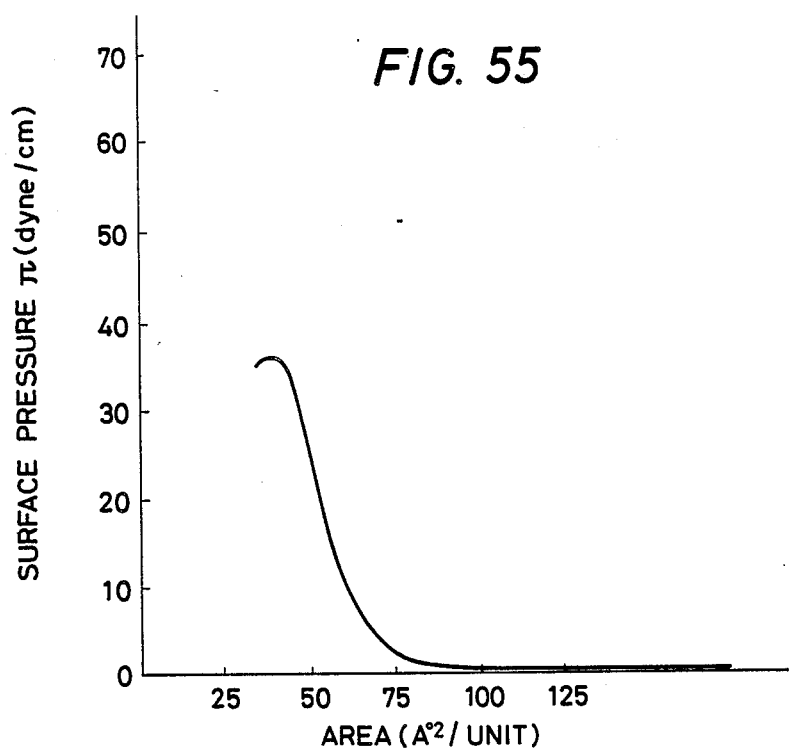
FIG. 55 shows the relationship between surface pressure and area per recurring unit in the case where the amphoteric high polymer obtained in Example 21 was spread on the surface of water.

The relationship between surface pressure and area per recurring unit was measured at 20° C. on the surface of twice-distilled water, and the result obtained is as shown in FIG. 55. The surface pressure rose steeply from about 75 Å$^2$/unit, forming a good condensed film. The limiting area was 63 Å$^2$/unit and the collapse pressure was 35 dyne/cm.

Figure 56:
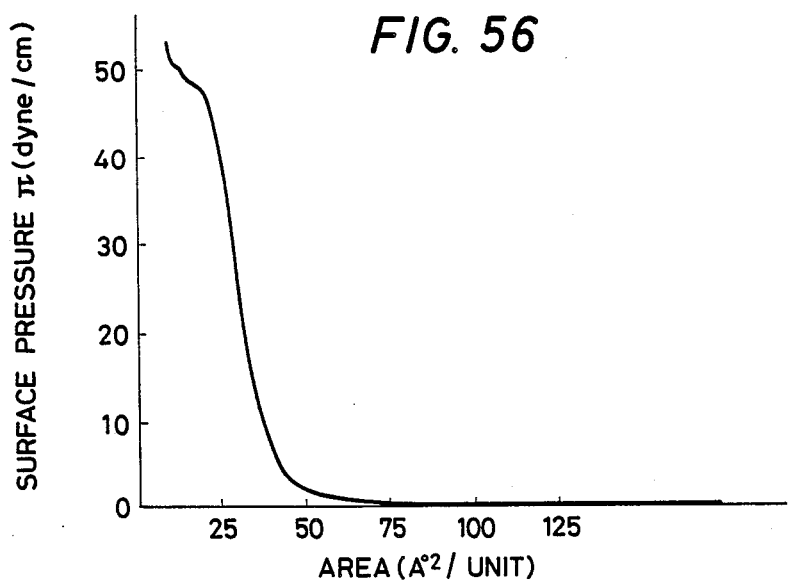
FIG. 56 shows the surface pressure-area curve of said high polymer mixed with an equimolar amount of stearyl alcohol.

When mixed with an equimolar amount of stearyl alcohol an extremely good surface pressure-area curve was obtained (FIG. 56).

It was brought to light that when the amphiphilic high polymer in this example mixed with an equimolar amount of stearyl alcohol was deposited on the glass substrate on which aluminum was vacuum evaporated an deposited film of Y-type was obtained.

In addition, the 61 layers accumulated film obtained in the above described way had a thickness of ca. 1800 Å, and the insulation characteristic was found to be excellent by the measurement of capacitance.

Further, it was also confirmed from the peaks at 1790 cm$^{-1}$ and 1710 cm$^{-1}$ by FT-IR analysis that when said accumulated film is heated at 400° C. for one hour, a linkage resembling the imide linkage is formed.

According to the present invention the high polymer whose film could not inherently be obtained by LB process can be formed into film through said process by modifying thereof. Furthermore, the high polymer may be formed into thin films having so thinner thickness of less than 10,000 Å, or if desired, into ultra thin film having thickness of 10 to 1000 Å, which is generally hardly attainable, by partially or completely cyclizing the polymer compounds if necessary. The thin films, thus formed, have an extremely excellent properties in heat resistance, chemical resistance as well as mechanical characteristics and are free from pin holes.

While the invention has been described in detail and with reference to specific embodiments thereof, it will be apparent to one skilled in the art that various changes and modifications can be made therein without departing from the spirit and scope thereof.

What is claimed is:

1. A monomolecular film prepared by the Langmuir-Blodgett technique from an amphiphilic high polymer, said polymer comprising a linear recurring unit containing at least a divalent organic group (R$_1$) having at least two carbon atoms, at least a divalent organic group (R$_2$) having at least two carbon atoms, and at least one C$_{10-30}$ hydrocarbon-containing group (R$_3$) which may have one or more substituent groups, said organic groups R$_1$ and R$_2$ being connected to each other by a divalent connecting group, and said hydrocarbon-containing group R$_3$ being convalently bonded to said recurring unit.

2. A monomolecular film as defined in claim 1, wherein at least one of organic groups R$_1$ and R$_2$ contains at least two hydrocarbon-containing groups R$_3$ per recurring unit.

3. A monomolecular film as defined in claim 1, wherein said hydrocarbon-containing group R$_3$ contains from 16 to 22 carbon atoms.

4. A monomolecular film as defined in claim 2, wherein said hydrocarbon-containing group R$_3$ contains from 16 to 22 carbon atoms.

5. A monomolecular film as defined in claim 1, wherein at least one of said organic groups R$_1$ and R$_2$ is a group comprising a benzenoid structure having at least 6 carbon atoms.

6. A monomolecular film as defined in claim 2, wherein said hydrocarbon-containing group $R_3$ contains from 16 to 22 carbon atoms, and at least one of organic groups $R_1$ and $R_2$ comprises a benzenoid structure having at least 6 carbon atoms.

7. A monomolecular film as defined in claim 1, wherein the hydrocarbon-containing group $R_3$ is selected from aliphatic groups, connecting groups of alicyclic group and aliphatic group, connecting groups of aromatic group and aliphatic group, or substituents thereof.

8. A monomolecular film as defined in claim 2, wherein the hydrocarbon-containing group $R_3$ is selected from aliphatic groups, connecting groups of alicyclic group and aliphatic group, connecting groups of aromatic group and aliphatic group, or substituents thereof.

9. A monomolecular film as defined in claim 3, wherein the hydrocarbon-containing group $R_3$ is selected from aliphatic groups, connecting groups of alicyclic group and aliphatic group, connecting groups of aromatic group and aliphatic group, or substituents thereof.

10. A monomolecular film as defined in claim 6, wherein the hydrocarbon-containing group $R_3$ is selected from aliphatic groups, connecting groups of alicyclic group and aliphatic group, connecting groups of aromatic group and aliphatic group, or substituents thereof.

11. A monomolecular film as defined in claim 1, wherein said recurring unit is provided with a precursor capable of forming a 5- or 6-membered ring containing at least one hetero atom.

12. A monomolecular film as defined in claim 2, wherein said recurring unit is provided with a precursor capable of forming a 5- or 6-membered ring containing at least one hetero atom.

* * * * *

UNITED STATES PATENT AND TRADEMARK OFFICE
CERTIFICATE OF CORRECTION

PATENT NO. : 4,910,293
DATED : March 20, 1990
INVENTOR(S) : Masakazu UEKITA et al.

It is certified that error appears in the above-identified patent and that said Letters Patent is hereby corrected as shown below:

Column 3, line 44, delete "amphoteric" and substitute therefor --amphiphilic--.

Column 13, line 12, delete "hereinabefore" and substitute therefor --hereinbefore--;

line 45, under the formula in right hand column add --Benzenoid--.

Column 14, line 20 delete " 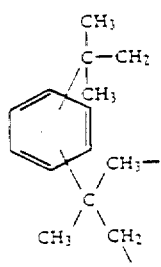 "

and substitute therefor -- 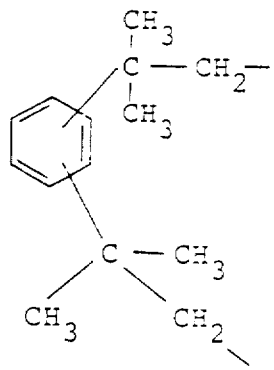 --;

UNITED STATES PATENT AND TRADEMARK OFFICE
CERTIFICATE OF CORRECTION

PATENT NO. : 4,910,293

DATED : March 20, 1990

INVENTOR(S) : Masakazu UEKITA et al.

It is certified that error appears in the above-identified patent and that said Letters Patent is hereby corrected as shown below:

line 65, delete "  "

and substitute therefor --

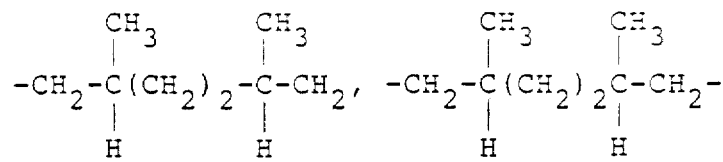

--.

Column 17, line 10, delete " 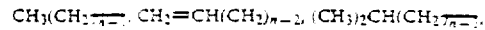 "

and substitute therefor 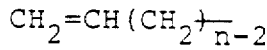

line 13, delete "  "

and substitute therefor 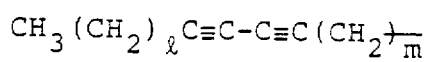

Column 27, Formula (118) delete "

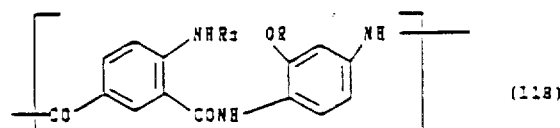

(118)

"

UNITED STATES PATENT AND TRADEMARK OFFICE
CERTIFICATE OF CORRECTION

PATENT NO. : 4,910,293

DATED : March 20, 1990

INVENTOR(S) : Masakazu UEKITA et al.

It is certified that error appears in the above-identified patent and that said Letters Patent is hereby corrected as shown below:

and substitute therefor --
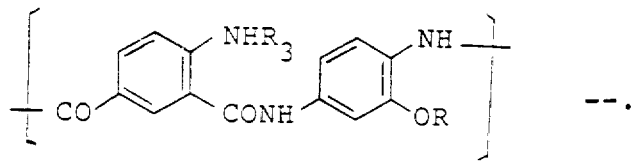
--.

Column 29, add the following formula after formula (129)

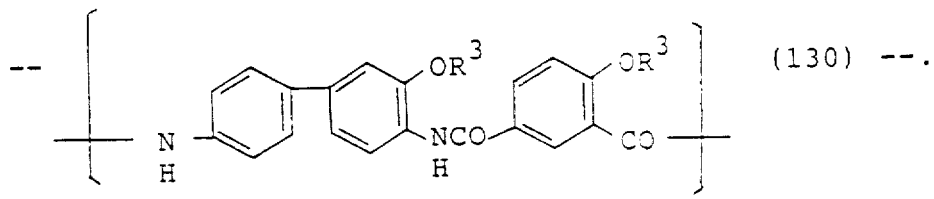 (130) --.

Column 53, equation (93), delete "

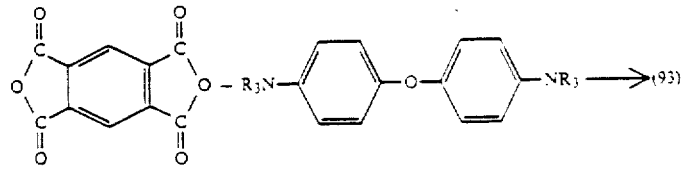

"

and substitute therefor --

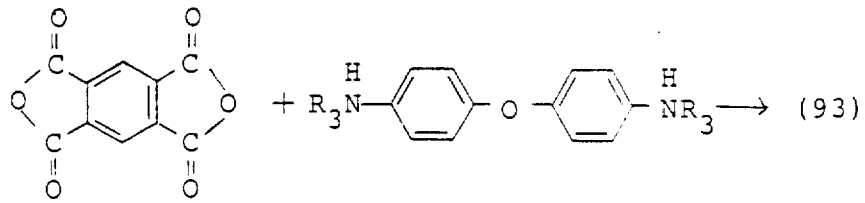 (93)

--.

UNITED STATES PATENT AND TRADEMARK OFFICE
CERTIFICATE OF CORRECTION

PATENT NO. : 4,910,293
DATED : March 20, 1990
INVENTOR(S) : Masakazu UEKITA et al.

It is certified that error appears in the above-identified patent and that said Letters Patent is hereby corrected as shown below:

Column 57, equation (118), delete "

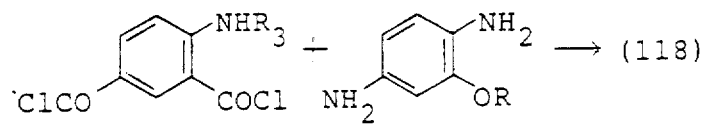

and substitute therefor --

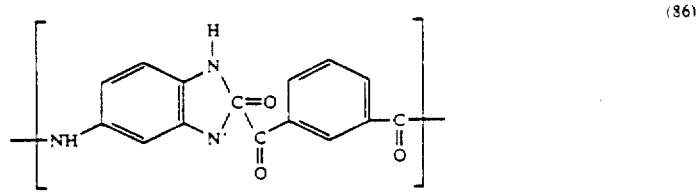

--.

Column 72, formula (86), delete "

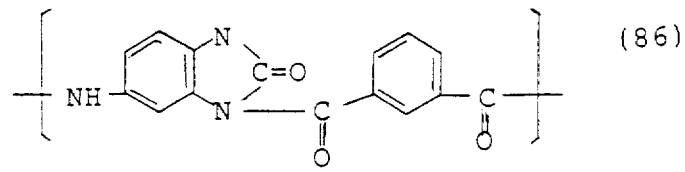

and substitute therefor --

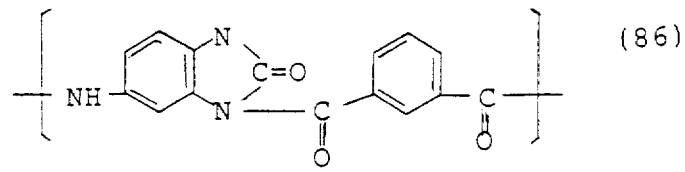

--.

UNITED STATES PATENT AND TRADEMARK OFFICE
CERTIFICATE OF CORRECTION

PATENT NO. : 4,910,293
DATED : March 20, 1990
INVENTOR(S) : Masakazu UEKITA et al.

It is certified that error appears in the above-identified patent and that said Letters Patent is hereby corrected as shown below:

Column 75, formula (107), delete "

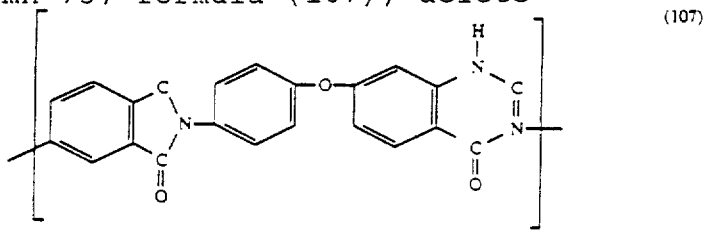

and substitute therefor --

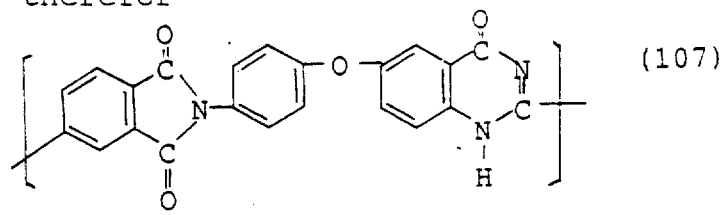

--.

formula (109), delete "

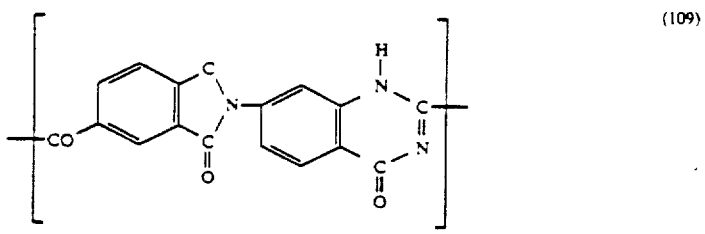

and substitute therefor --

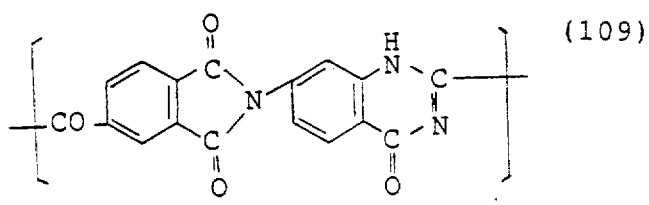

--.

UNITED STATES PATENT AND TRADEMARK OFFICE
CERTIFICATE OF CORRECTION

PATENT NO. : 4,910,293

DATED : March 20, 1990

INVENTOR(S) : Masakazu UEKITA et al.

It is certified that error appears in the above-identified patent and that said Letters Patent is hereby corrected as shown below:

Column 77, formula (110), delete "

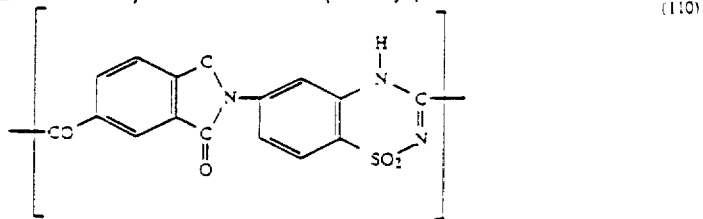

and substitute therefor --

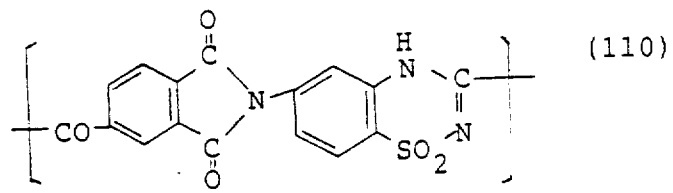

--.

formula (111), delete "

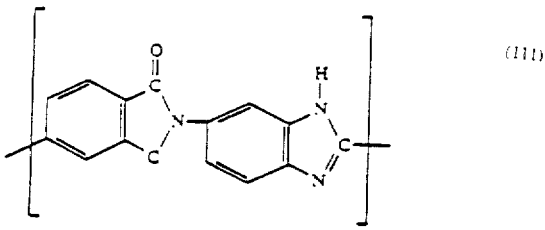

"

and substitute therefor --

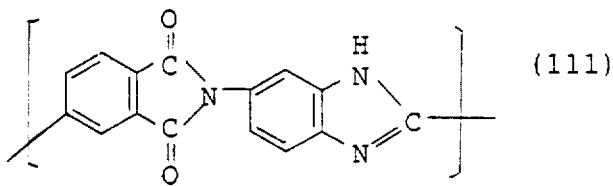

--.

UNITED STATES PATENT AND TRADEMARK OFFICE
CERTIFICATE OF CORRECTION

PATENT NO. : 4,910,293

DATED : March 20, 1990

INVENTOR(S) : Masakazu UEKITA et al.

Page 7 of 9

It is certified that error appears in the above-identified patent and that said Letters Patent is hereby corrected as shown below:

Column 79, delete "(123)" and substitute therefor --(125)--; and delete "(124)" and substitute therefor --126--.

Column 83, formula (135), delete "

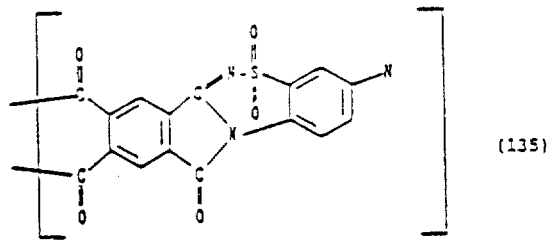

(135)

"

and substitute therefor --

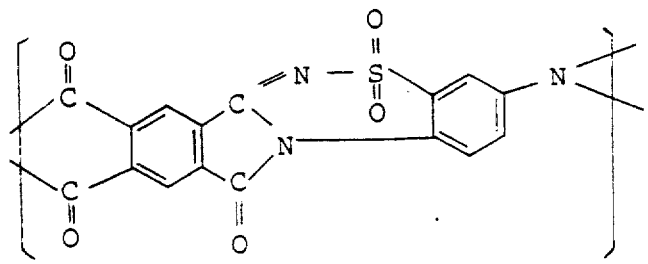

--.

UNITED STATES PATENT AND TRADEMARK OFFICE
CERTIFICATE OF CORRECTION

PATENT NO. : 4,910,293

DATED : March 20, 1990

INVENTOR(S) : Masakazu UEKITA et al.

It is certified that error appears in the above-identified patent and that said Letters Patent is hereby corrected as shown below:

Column 91, formula (173), delete "

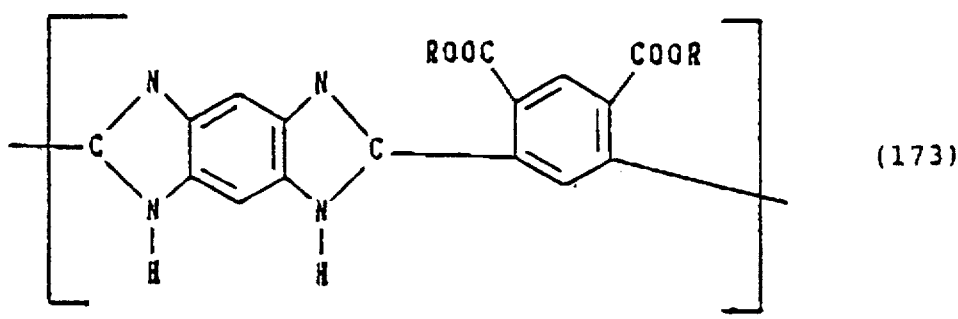

(173)

"

UNITED STATES PATENT AND TRADEMARK OFFICE
CERTIFICATE OF CORRECTION

PATENT NO.   : 4,910,293

DATED        : March 20, 1990

INVENTOR(S)  : Masakazu UEKITA, et al

It is certified that error appears in the above-identified patent and that said Letters Patent is hereby corrected as shown below:

and substitute therefor --

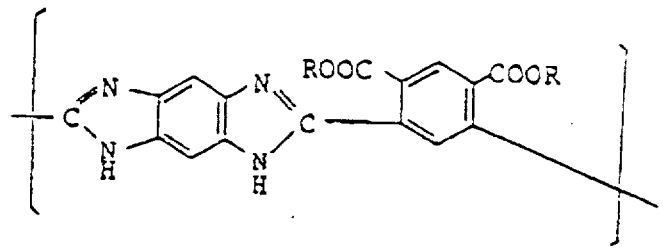

--.

Column 96, line 2, delete "Groups III-IV, II-V" and substitute therefor --Group III-V, II-VI--.

Signed and Sealed this

Fourteenth Day of July, 1992

Attest:

DOUGLAS B. COMER

*Attesting Officer*    Acting Commissioner of Patents and Trademarks